United States Patent
Jeong et al.

(10) Patent No.: US 11,882,307 B2
(45) Date of Patent: Jan. 23, 2024

(54) METHOD AND APPARATUS FOR DECODING VIDEO, AND METHOD AND APPARATUS FOR ENCODING VIDEO

(71) Applicant: SAMSUNG ELECTRONICS CO., LTD., Suwon-si (KR)

(72) Inventors: Seungsoo Jeong, Suwon-si (KR); Minwoo Park, Suwon-si (KR); Minsoo Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 122 days.

(21) Appl. No.: 17/561,303

(22) Filed: Dec. 23, 2021

(65) Prior Publication Data

US 2022/0124366 A1 Apr. 21, 2022

Related U.S. Application Data

(63) Continuation of application No. PCT/KR2020/008408, filed on Jun. 26, 2020.
(Continued)

(51) Int. Cl.
*H04N 19/53* (2014.01)
*H04N 19/139* (2014.01)
*H04N 19/176* (2014.01)

(52) U.S. Cl.
CPC ........... *H04N 19/53* (2014.11); *H04N 19/139* (2014.11); *H04N 19/176* (2014.11)

(58) Field of Classification Search
CPC .... H04N 19/53; H04N 19/139; H04N 19/176; H04N 19/119; H04N 19/57; H04N 19/82; H04N 19/513; H04N 19/70
See application file for complete search history.

(56) References Cited

U.S. PATENT DOCUMENTS 10,531,113 B2 1/2020 Lee et al.
2020/0177908 A1* 6/2020 Lee ..................... H04N 19/513
(Continued)

FOREIGN PATENT DOCUMENTS

CN 101416525 A * 4/2009
CN 107409225 A * 11/2017 ........... H04N 19/109
(Continued)

OTHER PUBLICATIONS

International Search Report (PCT/ISA/210) issued by the International Searching Authority dated Oct. 7, 2020 in application No. PCT/KR2020/008408.
(Continued)

*Primary Examiner* — Dramos Kalapodas
(74) *Attorney, Agent, or Firm* — Sughrue Mion, PLLC

(57) ABSTRACT

In a video encoding and decoding process, a video decoding method and a video decoding apparatus are provided to for determining whether a motion vector of an adjacent block at a location corresponding to one motion vector resolution among a plurality of motion vector resolutions is available, when the motion vector of the adjacent block is available, obtaining the motion vector of the adjacent block as a motion vector predictor of a current block, when the motion vector of the adjacent block is unavailable, obtaining a default motion vector by using a motion vector of one of two other adjacent blocks of the current block as a motion vector predictor of the current block, and performing prediction on the current block based on the motion vector predictor of the current block.

1 Claim, 27 Drawing Sheets

Related U.S. Application Data

(60) Provisional application No. 62/867,365, filed on Jun. 27, 2019.

(56) References Cited

U.S. PATENT DOCUMENTS

| | | | |
|---|---|---|---|
| 2020/0236395 A1 * | 7/2020 | Lee | H04N 19/13 |
| 2020/0351513 A1 | 11/2020 | Lee et al. | |
| 2021/0203945 A1 * | 7/2021 | Liu | H04N 19/70 |
| 2021/0250606 A1 * | 8/2021 | Choi | H04N 19/577 |
| 2022/0237373 A1 | 7/2022 | Singh Bawa et al. | |

FOREIGN PATENT DOCUMENTS

| | | | | |
|---|---|---|---|---|
| CN | 104247432 B | * | 6/2019 | H04N 13/128 |
| CN | 111953995 A | * | 11/2020 | H04N 19/105 |
| EP | 0984593 A1 | | 3/2000 | |
| EP | 3618435 A1 | | 3/2020 | |
| EP | 3 637 773 A1 | | 4/2020 | |
| EP | 3 691 274 A1 | | 8/2020 | |
| IN | 201727015057 | | 6/2017 | |
| KR | 1020170078673 A | | 7/2017 | |
| TW | 202025743 A | * | 7/2020 | |
| TW | 202025776 A | * | 7/2020 | |
| WO | 2019009504 A1 | | 1/2019 | |
| WO | WO-2019009504 A1 | * | 1/2019 | |
| WO | 2019054591 A1 | | 3/2019 | |
| WO | WO-2019054591 A1 | * | 3/2019 | |
| WO | 2019066514 A1 | | 4/2019 | |
| WO | WO-2019066514 A1 | * | 4/2019 | |
| WO | 2019093598 A1 | | 5/2019 | |
| WO | WO-2019235896 A1 | * | 12/2019 | |

OTHER PUBLICATIONS

Communication dated Apr. 5, 2021 issued by the Korean Intellectual Property Office in application No. 10-2021-0024231.
Communication dated Nov. 23, 2020 issued by the Korean Intellectual Property Office in application No. 10-2020-0078822.
Communication dated Aug. 11, 2020 issued by the Korean Intellectual Property Office in application No. 10-2020-0078822.
Communication dated Aug. 24, 2021 issued by the Korean Intellectual Property Office in application No. 10-2021-0024231.
The Extended European Search Report dated Jun. 19, 2023 by the European Patent Office for European Patent Application No. 20830518.5.
Communication dated Sep. 1, 2023 issued by the Indian Patent Office in counterpart Indian Application No. 202247002546.

* cited by examiner

FIG. 4
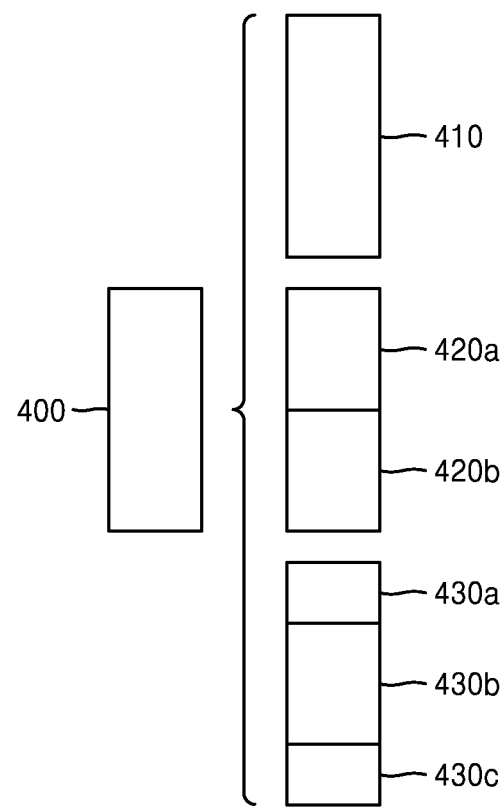
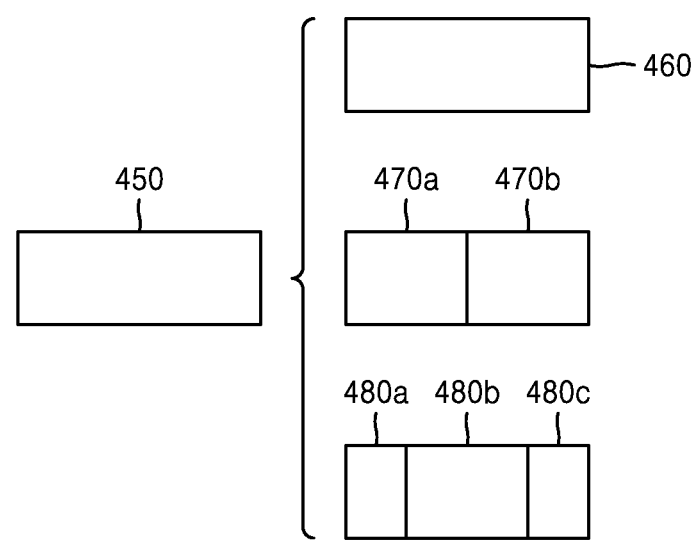

FIG. 13

| BLOCK SHAPE DEPTH | 0: SQUARE | 1: NS_VER | 2: NS_HOR |
|---|---|---|---|
| DEPTH D | □ ─1300 | ▯ ─1310 | ▭ ─1320 |
| DEPTH D+1 | □ ─1302 | ▯ ─1312 | ▭ ─1322 |
| DEPTH D+2 | □ ─1304 | ▯ ─1314 | ▭ ─1324 |
| ... | ... | ... | ... |

FIG. 25

| A1 | A2 | A3 a | A4 | A5 | A6 |

| B1 | B2 | B3 b | B4 | B5 | B6 |

| C1 | C2 | C3 n c | C4 | C5 | C6 |
|    |    |    o    |    |    |    |
| g  | h  | i m   j |    | k  | l  |
|    |    |    P    |    |    |    |
| D1 | D2 | D3 d | D4 | D5 | D6 |

| E1 | E2 | E3 e | E4 | E5 | E6 |

| F1 | F2 | F3 f | F4 | F5 | F6 |

1/4-PIXEL UNIT

1/2-PIXEL UNIT

1-PIXEL UNIT

2-PIXEL UNIT

METHOD AND APPARATUS FOR DECODING VIDEO, AND METHOD AND APPARATUS FOR ENCODING VIDEO

CROSS-REFERENCE TO RELATED APPLICATIONS

This application is a bypass continuation application of International Patent Application No. PCT/KR2020/008408, which claims priority from U.S. Provisional Patent Application No. 62/867,365 filed on Jun. 27, 2019, in the United States Patent and Trademark Office, the disclosures of which are incorporated herein by reference in their entireties.

BACKGROUND

1. Field

The disclosure relates to a video decoding method and a video decoding apparatus, and more particularly, to a video encoding method and apparatus and a video decoding method and apparatus, which involve identifying an adjacent block at a location corresponding to a motion vector resolution of a current block, and determining whether a motion vector of the identified adjacent block is available.

2. Description of the Related Art

Image data is encoded by a codec according to a predetermined data compression standard, for example, a moving picture expert group (MPEG) standard, and then is stored in the form of a bitstream in a recording medium or is transmitted via a communication channel.

With the development and supply of hardware capable of reproducing and storing high-resolution or high-definition image content, there is an increasing demand for a codec for effectively encoding or decoding the high-resolution or high-definition image content. Encoded image content may be reproduced by being decoded. Recently, methods for effectively compressing such high-resolution or high-definition image content are performed. For example, methods are proposed to effectively implement an image compression technology through a process of splitting an image to be encoded by a random method or through a process of rendering data.

SUMMARY

According to an aspect of the present disclosure, a video decoding method may include: determining whether a motion vector of an adjacent block at a location corresponding to a motion vector resolution among a plurality of motion vector resolutions is available; based on the motion vector of the adjacent block being available, obtaining the motion vector of the adjacent block as a motion vector predictor of a current block; based on the motion vector of the adjacent block being unavailable, obtaining a default motion vector by using a motion vector of one of two other adjacent blocks of the current block, as the motion vector predictor of the current block; and performing prediction on the current block based on the motion vector predictor of the current block.

Locations of adjacent blocks corresponding to the plurality of motion vector resolutions may be determined based on availability of adjacent motion information of the current block.

The two other adjacent blocks may include a first adjacent block and a second adjacent block, locations of the first adjacent block and the second adjacent block may be determined based on availability of adjacent motion information of the current block, when a motion vector of the first adjacent block is available and reference indexes of the first adjacent block and the current block are identical, the motion vector of the first adjacent block may be obtained as the default motion vector, when the default motion vector is not obtained, a motion vector of the second adjacent block is available, and reference indexes of the second adjacent block and the current block are identical, the motion vector of the second adjacent block may be obtained as the default motion vector, when the default motion vector is not obtained, the motion vector of the first adjacent block is available, and the reference indexes of the first adjacent block and the current block are not identical, the motion vector of the first adjacent block may be obtained as the default motion vector, and when the default motion vector is not obtained, the motion vector of the second adjacent block is available, and the reference indexes of the second adjacent block and the current block are not identical, the motion vector of the second adjacent block may be obtained as the default motion vector.

When motion information of both a left adjacent block and a right adjacent block of the current block is unavailable or when motion information of the left adjacent block of the current block is available, adjacent blocks corresponding to the plurality of motion vector resolutions may include an upper left adjacent block, the left adjacent block, a lower left adjacent block, an upper adjacent block, and an upper right adjacent block, the first adjacent block may be the left adjacent block, and the second adjacent block may be the upper adjacent block.

The left adjacent block may be an adjacent block corresponding to a ¼-pixel unit resolution among the plurality of motion vector resolutions, the upper adjacent block may be an adjacent block corresponding to a ½-pixel unit resolution among the plurality of motion vector resolutions, the upper right adjacent block may be an adjacent block corresponding to a 1-pixel unit resolution among the plurality of motion vector resolutions, the lower left adjacent block may be an adjacent block corresponding to a 2-pixel unit resolution among the plurality of motion vector resolutions, and the upper left adjacent block may be an adjacent block corresponding to a 4-pixel unit resolution among the plurality of motion vector resolutions.

When motion information of both a left adjacent block and a right adjacent block of the current block is available, adjacent blocks corresponding to the plurality of motion vector resolutions may include an upper left adjacent block, the left adjacent block, an upper adjacent block, an upper right adjacent block, and the right adjacent block, the first adjacent block may be the left adjacent block, and the second adjacent block may be the right adjacent block.

An adjacent block corresponding to a ¼-pixel unit resolution among the plurality of motion vector resolutions may be the left adjacent block, the right adjacent block may be an adjacent block corresponding to a ½-pixel unit resolution among the plurality of motion vector resolutions, the upper adjacent block may be an adjacent block corresponding to a 1-pixel unit resolution among the plurality of motion vector resolutions, the upper right adjacent block may be an adjacent block corresponding to a 2-pixel unit resolution among the plurality of motion vector resolutions, and the upper left adjacent block may be an adjacent block corresponding to a 4-pixel unit resolution among the plurality of motion vector resolutions.

When motion information of a right adjacent block of the current block is available, adjacent blocks corresponding to the plurality of motion vector resolutions may include an upper left adjacent block, an upper adjacent block, an upper right adjacent block, the right adjacent block, and a lower right adjacent block, the first adjacent block may be the right adjacent block, and the second adjacent block may be the upper adjacent block.

The right adjacent block may be an adjacent block corresponding to a ¼-pixel unit resolution among the plurality of motion vector resolutions, the upper adjacent block may be an adjacent block corresponding to a ½-pixel unit resolution among the plurality of motion vector resolutions, the upper left adjacent block may be an adjacent block corresponding to a 1-pixel unit resolution among the plurality of motion vector resolutions, the lower right adjacent block may be an adjacent block corresponding to a 2-pixel unit resolution among the plurality of motion vector resolutions, and the upper right adjacent block may be an adjacent block corresponding to a 4-pixel unit resolution among the plurality of motion vector resolutions.

The video decoding method may further include, when motion vectors of the two other adjacent blocks are unavailable, obtaining the default motion vector based on a history-based motion vector list including motion vectors of blocks decoded prior to the current block, and obtaining the default motion vector as the motion vector predictor of the current block.

The video decoding method may further include, when motion vectors of the two other adjacent blocks are unavailable, obtaining a zero motion vector as the default motion vector, and obtaining the default motion vector as the motion vector predictor of the current block.

Whether to use the motion vector predictor based on the adjacent block corresponding to the motion vector resolution of the plurality of motion vector resolutions may be determined based on information obtained from a bitstream.

The video decoding method may further include: when motion vectors of the two other adjacent blocks are unavailable, searching for remaining adjacent blocks of the current block, and obtaining the default motion vector by using motion vectors of the searched adjacent blocks.

According to another aspect of the present disclosure, a video encoding method may include: determining whether a motion vector of an adjacent block at a location corresponding to a motion vector resolution among a plurality of motion vector resolutions is available; based on the motion vector of the adjacent block being available, obtaining the motion vector of the adjacent block as a motion vector predictor of a current block; based on the motion vector of the adjacent block being unavailable, obtaining a default motion vector by using a motion vector of one of two other adjacent blocks of the current block as the motion vector predictor of the current block; and performing prediction on the current block based on the motion vector predictor of the current block.

According to another aspect of the present disclosure, a video decoding apparatus may include: a memory storing instructions; and at least one processor configured to execute the instructions to: determine whether a motion vector of an adjacent block at a location corresponding to a motion vector resolution among a plurality of motion vector resolutions is available; based on the motion vector of the adjacent block being available, obtain the motion vector of the adjacent block as a motion vector predictor of a current block; based on the motion vector of the adjacent block being unavailable, obtain a default motion vector by using a motion vector of one of two other adjacent blocks of the current block, as the motion vector predictor of the current block; and perform prediction on the current block based on the motion vector predictor of the current block.

In a video encoding and decoding process, it is determined whether a motion vector of an adjacent block at a location corresponding to one motion vector resolution among a plurality of motion vector resolutions is available, when the motion vector of the adjacent block corresponding to the one motion vector resolution is available, the motion vector of the adjacent block is obtained as a motion vector predictor of a current block, when the motion vector of the adjacent block corresponding to the one motion vector resolution is unavailable, a default motion vector for the one motion vector resolution is obtained by using a motion vector of one of two adjacent blocks of the current block and the default motion vector is obtained as a motion vector predictor of the current block, and prediction is performed on the current block based on the motion vector predictor of the current block, so that, when motion information of an adjacent block at a location corresponding to a motion vector resolution is unavailable, a motion vector of a reliable block may be inserted, thereby improving coding efficiency.

BRIEF DESCRIPTION OF THE DRAWINGS

The above and/or other aspects will be more apparent by describing certain example embodiments, with reference to the accompanying drawings, in which;

FIG. 4 illustrates a process, performed by an image decoding apparatus, of determining at least one coding unit by splitting a non-square coding unit, according to an embodiment;

FIG. 13 illustrates a process of determining a depth of a coding unit as a shape and a size of the coding unit change, when the coding unit is recursively split such that a plurality of coding units are determined, according to an embodiment;

FIG. 25 is a diagram for describing interpolation for determining a motion vector according to various MVRs;

DETAILED DESCRIPTION

Figure 1:
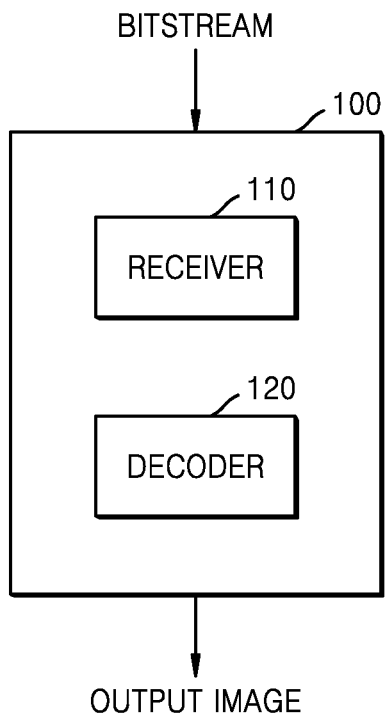
FIG. 1 illustrates a schematic block diagram of an image decoding apparatus according to an embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

The terms used in the specification will be briefly defined, and the embodiments will be described in detail.

All terms including descriptive or technical terms which are used in the specification should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description of the disclosure. Therefore, the terms used in the disclosure should not be interpreted based on only their names but have to be defined based on the meaning of the terms together with the descriptions throughout the specification.

In the following specification, the singular forms include plural forms unless the context clearly indicates otherwise.

When a part "includes" or "comprises" an element, unless there is a particular description contrary thereto, the part may further include other elements, not excluding the other elements.

In the following description, terms such as "unit" indicate a software or hardware component and the "unit" performs certain functions. However, the "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, and variables. A function provided by the components and "units" may be associated with a smaller number of components and "units", or may be divided into additional components and "units".

According to an embodiment of the disclosure, the "unit" may include a processor and a memory. The term "processor" should be interpreted broadly to include a general purpose processor, a central processing unit (CPU), a microprocessor, a digital signal processor (DSP), a controller, a microcontroller, a state machine, and the like. In some environments, the "processor" may refer to an application specific semiconductor (ASIC), a programmable logic device (PLD), a field programmable gate array (FPGA), or the like. The term "processor" may refer to a combination of processing devices such as, for example, a combination of a DSP and a microprocessor, a combination of a plurality of microprocessors, a combination of one or more microprocessors in conjunction with a DSP core, or a combination of any other such configurations.

The term "memory" should be interpreted broadly to include any electronic component capable of storing electronic information. The term "memory" may refer to various types of processor-readable media, such as a random access memory (RAM), a read-only memory (ROM), a non-volatile random access memory (NVRAM), a programmable read-only memory (PROM), an erase-programmable read-only memory (EPROM), an electrically erasable PROM (EEPROM), a flash memory, a magnetic or optical data storage device, registers, and the like. When the processor can read information from a memory and/or write information to the memory, the memory is said to be in an electronic communication state with the processor. The memory integrated in the processor is in an electronic communication state with the processor.

Hereinafter, an "image" may be a static image such as a still image of a video or may be a dynamic image such as a moving image, that is, the video itself.

Hereinafter, a "sample" denotes data assigned to a sampling location of an image, i.e., data to be processed. For example, pixel values of an image in a spatial domain and transform coefficients on a transform domain may be samples. A unit including at least one such sample may be defined as a block.

Also, in the present specification, a "current block" may denote a block of a largest coding unit, a coding unit, a prediction unit, or a transform unit of a current image to be encoded or decoded.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

While such terms as "first," "second," etc., may be used to describe various elements, such elements must not be limited to the above terms. The above terms may be used only to distinguish one element from another.

Hereinafter, an image encoding apparatus, an image decoding apparatus, an image encoding method, and an image decoding method, according to an embodiment, will be described with reference to FIGS. 1 to 16. A method of determining a data unit of an image, according to an embodiment, will be described with reference to FIGS. 3 to 16. A video encoding/decoding method according to an embodiment will be described below with reference to FIGS. 17 to 20 and FIGS. 22 to 27. The video encoding/decoding method involving determining whether a motion vector of an adjacent block at a location corresponding to one motion vector resolution (MVR) among a plurality of MVRs is available, when the motion vector of the adjacent block corresponding to the one MVR is available, obtaining the motion vector of the adjacent block as a motion vector predictor of a current block, when the motion vector of the adjacent block corresponding to the one MVR is unavailable, obtaining a default motion vector for the one MVR by using a motion vector of one of two adjacent blocks of the current block and obtaining the default motion vector as a motion vector predictor of the current block, and performing prediction on the current block based on the motion vector predictor of the current block, a coding order of coding units will be described below with reference to FIG. 21. A method of obtaining a default motion vector, according to another embodiment, will be described below with reference to FIGS. 28A to 28C.

Hereinafter, a method and apparatus for adaptively selecting a context model, based on various shapes of coding units, according to an embodiment of the disclosure, will be described with reference to FIGS. 1 and 2.

FIG. 1 illustrates a schematic block diagram of an image decoding apparatus according to an embodiment.

The image decoding apparatus 100 may include a receiver 110 and a decoder 120. The receiver 110 and the decoder 120 may include at least one processor. Also, the receiver 110 and the decoder 120 may include a memory storing instructions to be performed by the at least one processor.

The receiver 110 may receive a bitstream. The bitstream includes information of an image encoded by an image encoding apparatus 2200 described below. Also, the bitstream may be transmitted from the image encoding apparatus 2200. The image encoding apparatus 2200 and the image decoding apparatus 100 may be connected via wires or wirelessly, and the receiver 110 may receive the bitstream via wires or wirelessly. The receiver 110 may receive the bitstream from a storage medium, such as an optical medium or a hard disk. The decoder 120 may reconstruct an image based on information obtained from the received bitstream. The decoder 120 may obtain, from the bitstream, a syntax element for reconstructing the image. The decoder 120 may reconstruct the image based on the syntax element.

Operations of the image decoding apparatus 100 will be described in detail with reference to FIG. 2.

Figure 2:
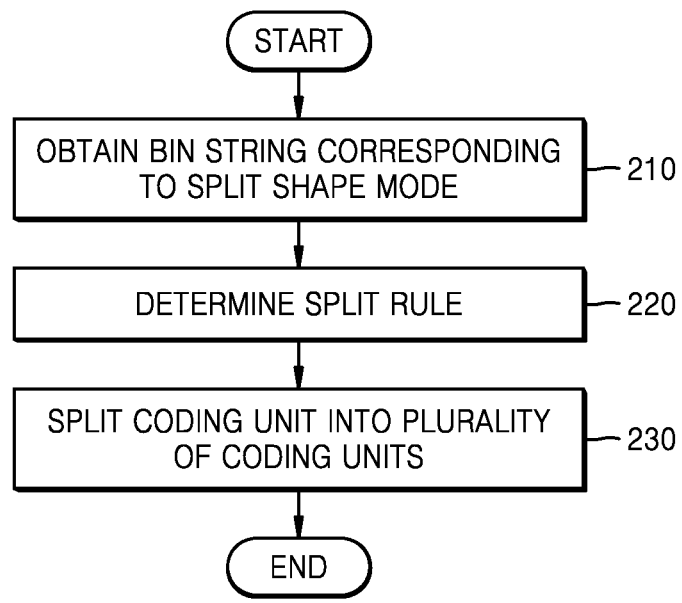
FIG. 2 illustrates a flowchart of an image decoding method according to an embodiment.

FIG. 2 illustrates a flowchart of an image decoding method according to an embodiment.

According to an embodiment of the disclosure, the receiver 110 receives a bitstream.

The image decoding apparatus 100 obtains, from a bitstream, a bin string corresponding to a split shape mode of a coding unit (operation 210). The image decoding apparatus 100 determines a split rule of coding units (operation 220). Also, the image decoding apparatus 100 splits the coding unit into a plurality of coding units, based on at least one of the bin string corresponding to the split shape mode and the split rule (operation 230). The image decoding apparatus 100 may determine an allowable first range of a size of the coding unit, according to a ratio of the width and the height of the coding unit, so as to determine the split rule. The image decoding apparatus 100 may determine an allowable second range of the size of the coding unit, according to the split shape mode of the coding unit, so as to determine the split rule.

Hereinafter, splitting of a coding unit will be described in detail according to an embodiment of the disclosure.

First, one picture may be split into one or more slices or one or more tiles. One slice or one tile may be a sequence of one or more largest coding units (coding tree units (CTUs)). There is a largest coding block (coding tree block (CTB)) conceptually compared to a largest coding unit (CTU).

The largest coding block (CTB) denotes an N×N block including N×N samples (where N is an integer). Each color component may be split into one or more largest coding blocks.

When a picture has three sample arrays (sample arrays for Y, Cr, and Cb components), a largest coding unit (CTU) includes a largest coding block of a luma sample, two corresponding largest coding blocks of chroma samples, and syntax structures used to encode the luma sample and the chroma samples. When a picture is a monochrome picture, a largest coding unit includes a largest coding block of a monochrome sample and syntax structures used to encode the monochrome samples. When a picture is a picture encoded in color planes separated according to color components, a largest coding unit includes syntax structures used to encode the picture and samples of the picture.

One largest coding block (CTB) may be split into M×N coding blocks including M×N samples (M and N are integers).

When a picture has sample arrays for Y, Cr, and Cb components, a coding unit (CU) includes a coding block of a luma sample, two corresponding coding blocks of chroma samples, and syntax structures used to encode the luma sample and the chroma samples. When a picture is a monochrome picture, a coding unit includes a coding block of a monochrome sample and syntax structures used to encode the monochrome samples. When a picture is a picture encoded in color planes separated according to color components, a coding unit includes syntax structures used to encode the picture and samples of the picture.

As described above, a largest coding block and a largest coding unit are conceptually distinguished from each other, and a coding block and a coding unit are conceptually distinguished from each other. That is, a (largest) coding unit refers to a data structure including a (largest) coding block including a corresponding sample and a syntax structure corresponding to the (largest) coding block. However, because it is understood by one of ordinary skill in the art that a (largest) coding unit or a (largest) coding block refers to a block of a predetermined size including a predetermined number of samples, a largest coding block and a largest coding unit, or a coding block and a coding unit are mentioned in the following specification without being distinguished unless otherwise described.

An image may be split into largest coding units (CTUs). A size of each largest coding unit may be determined based on information obtained from a bitstream. A shape of each largest coding unit may be a square shape of the same size. However, the embodiment is not limited thereto.

For example, information about a maximum size of a luma coding block may be obtained from a bitstream. For example, the maximum size of the luma coding block indicated by the information about the maximum size of the luma coding block may be one of 4×4, 8×8, 16×16, 32×32, 64×64, 128×128, and 256×256.

For example, information about a luma block size difference and a maximum size of a luma coding block that may be split into two may be obtained from a bitstream. The information about the luma block size difference may refer to a size difference between a luma largest coding unit and a largest luma coding block that may be split into two. Accordingly, when the information about the maximum size of the luma coding block that may be split into two and the information about the luma block size difference obtained from the bitstream are combined with each other, a size of the luma largest coding unit may be determined. A size of a chroma largest coding unit may be determined by using the size of the luma largest coding unit. For example, when a Y:Cb:Cr ratio is 4:2:0 according to a color format, a size of a chroma block may be half a size of a luma block, and a size of a chroma largest coding unit may be half a size of a luma largest coding unit.

According to an embodiment, because information about a maximum size of a luma coding block that is binary splittable is obtained from a bitstream, the maximum size of the luma coding block that is binary splittable may be variably determined. In contrast, a maximum size of a luma coding block that is ternary splittable may be fixed. For example, the maximum size of the luma coding block that is ternary splittable in an I-picture may be 32×32, and the maximum size of the luma coding block that is ternary splittable in a P-picture or a B-picture may be 64×64.

Also, a largest coding unit may be hierarchically split into coding units based on split shape mode information obtained from a bitstream. At least one of information indicating whether quad splitting is performed, information indicating whether multi-splitting is performed, split direction information, and split type information may be obtained as the split shape mode information from the bitstream.

For example, the information indicating whether quad splitting is performed may indicate whether a current coding unit is quad split (QUAD_SPLIT) or not.

When the current coding unit is not quad split, the information indicating whether multi-splitting is performed may indicate whether the current coding unit is no longer split (NO_SPLIT) or binary/ternary split.

When the current coding unit is binary split or ternary split, the split direction information indicates that the current coding unit is split in one of a horizontal direction and a vertical direction.

When the current coding unit is split in the horizontal direction or the vertical direction, the split type information indicates that the current coding unit is binary split or ternary split.

A split mode of the current coding unit may be determined according to the split direction information and the split type information. A split mode when the current coding unit is binary split in the horizontal direction may be determined to be a binary horizontal split mode (SPLIT_BT_HOR), a split mode when the current coding unit is ternary split in the horizontal direction may be determined to be a ternary horizontal split mode (SPLIT_TT_HOR), a split mode when the current coding unit is binary split in the vertical direction may be determined to be a binary vertical split mode (SPLIT_BT_VER), and a split mode when the current coding unit is ternary split in the vertical direction may be determined to be a ternary vertical split mode (SPLIT_TT_VER).

The image decoding apparatus 100 may obtain, from the bitstream, the split shape mode information from one bin string. A form of the bitstream received by the image decoding apparatus 100 may include fixed length binary code, unary code, truncated unary code, predetermined binary code, or the like. The bin string is information in a binary number. The bin string may include at least one bit. The image decoding apparatus 100 may obtain the split shape mode information corresponding to the bin string, based on the split rule. The image decoding apparatus 100 may determine whether to quad split a coding unit, whether not to split a coding unit, a split direction, and a split type, based on one bin string.

The coding unit may be smaller than or the same as the largest coding unit. For example, because a largest coding unit is a coding unit having a maximum size, the largest coding unit is one of coding units. When split shape mode information about a largest coding unit indicates that splitting is not performed, a coding unit determined in the largest coding unit has the same size as that of the largest coding unit. When split shape mode information about a largest coding unit indicates that splitting is performed, the largest coding unit may be split into coding units. Also, when split shape mode information about a coding unit indicates that splitting is performed, the coding unit may be split into smaller coding units. However, the splitting of the image is not limited thereto, and the largest coding unit and the coding unit may not be distinguished. The splitting of the coding unit will be described in detail with reference to FIGS. 3 to 16.

Also, one or more prediction blocks for prediction may be determined from a coding unit. The prediction block may be the same as or smaller than the coding unit. Also, one or more transform blocks for transformation may be determined from a coding unit. The transform block may be the same as or smaller than the coding unit.

The shapes and sizes of the transform block and prediction block may not be related to each other.

In another embodiment, prediction may be performed by using a coding unit as a prediction unit. Also, transformation may be performed by using a coding unit as a transform block.

The splitting of the coding unit will be described in detail with reference to FIGS. 3 to 16. A current block and an adjacent block of the disclosure may indicate one of the largest coding unit, the coding unit, the prediction block, and the transform block. Also, the current block of the current coding unit is a block that is currently being decoded or encoded or a block that is currently being split. The adjacent block may be a block reconstructed before the current block. The adjacent block may be adjacent to the current block spatially or temporally. The adjacent block may be located at one of the lower left, left, upper left, top, upper right, right, lower right of the current block.

Figure 3:
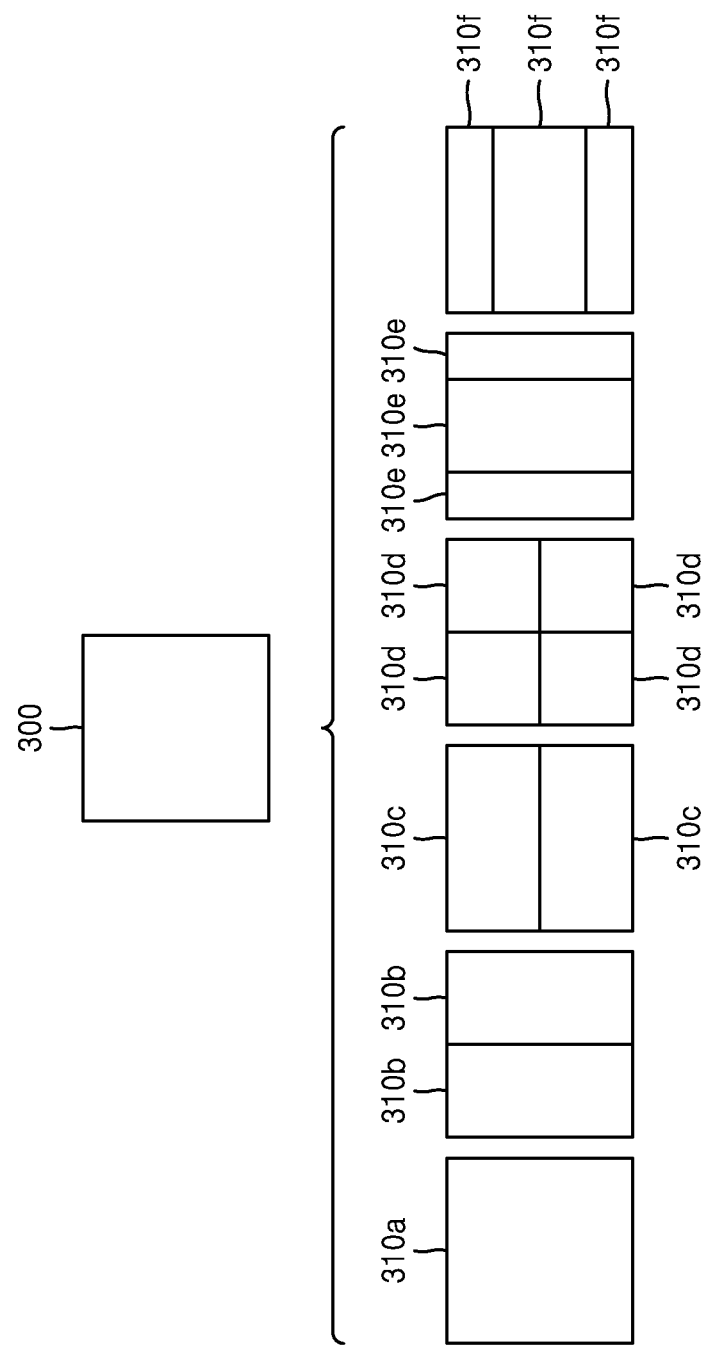
FIG. 3 illustrates a process, performed by an image decoding apparatus, of determining at least one coding unit by splitting a current coding unit, according to an embodiment.

FIG. 3 illustrates a process, performed by an image decoding apparatus, of determining at least one coding unit by splitting a current coding unit, according to an embodiment.

A block shape may include 4N×4N, 4N×2N, 2N×4N, 4N×N, N×4N, 32N×N, N×32N, 16N×N, N×16N, 8N×N, or N×8N. Here, N may be a positive integer. Block shape information is information indicating at least one of a shape, a direction, a ratio of width and height, or size of a coding unit.

The shape of the coding unit may include a square and a non-square. When the lengths of the width and height of the coding unit are the same (i.e., when the block shape of the coding unit is 4N×4N), the image decoding apparatus 100 may determine the block shape information of the coding unit as a square. The image decoding apparatus 100 may determine the shape of the coding unit to be a non-square.

When the width and the height of the coding unit are different from each other (i.e., when the block shape of the coding unit is 4N×2N, 2N×4N, 4N×N, N×4N, 32N×N, N×32N, 16N×N, N×16N, 8N×N, or N×8N), the image decoding apparatus 100 may determine the block shape information of the coding unit as a non-square shape. When the shape of the coding unit is non-square, the image decoding apparatus 100 may determine the ratio of the width and height among the block shape information of the coding unit to be at least one of 1:2, 2:1, 1:4, 4:1, 1:8, 8:1, 1:16, 16:1, 1:32, and 32:1. Also, the image decoding apparatus 100 may determine whether the coding unit is in a horizontal direction or a vertical direction, based on the length of the width and the length of the height of the coding unit. Also, the image decoding apparatus 100 may determine the size of the coding unit, based on at least one of the length of the width, the length of the height, or the area of the coding unit.

According to an embodiment, the image decoding apparatus 100 may determine the shape of the coding unit by using the block shape information, and may determine a splitting method of the coding unit by using the split shape mode information. That is, a coding unit splitting method indicated by the split shape mode information may be determined based on a block shape indicated by the block shape information used by the image decoding apparatus 100.

The image decoding apparatus 100 may obtain the split shape mode information from a bitstream. However, an embodiment is not limited thereto, and the image decoding apparatus 100 and the image encoding apparatus 2200 may determine pre-agreed split shape mode information, based on the block shape information. The image decoding apparatus 100 may determine the pre-agreed split shape mode information with respect to a largest coding unit or a minimum coding unit. For example, the image decoding apparatus 100 may determine split shape mode information with respect to the largest coding unit to be a quad split. Also, the image decoding apparatus 100 may determine split shape mode information regarding the smallest coding unit to be "not to perform splitting". In particular, the image decoding apparatus 100 may determine the size of the largest coding unit to be 256×256. The image decoding apparatus 100 may determine the pre-agreed split shape mode information to be a quad split. The quad split is a split shape mode in which the width and the height of the coding unit are both bisected. The image decoding apparatus 100 may obtain a coding unit of a 128×128 size from the largest coding unit of a 256×256 size, based on the split shape mode information. Also, the image decoding apparatus 100 may determine the size of the smallest coding unit to be 4×4. The image decoding apparatus 100 may obtain split shape mode information indicating "not to perform splitting" with respect to the smallest coding unit.

According to an embodiment, the image decoding apparatus 100 may use the block shape information indicating that the current coding unit has a square shape. For example, the image decoding apparatus 100 may determine whether not to split a square coding unit, whether to vertically split the square coding unit, whether to horizontally split the square coding unit, or whether to split the square coding unit into four coding units, based on the split shape mode information. Referring to FIG. 3, when the block shape information of a current coding unit 300 indicates a square shape, the decoder 120 may determine that a coding unit 310a having the same size as the current coding unit 300 is not split, based on the split shape mode information indicating not to perform splitting, or may determine coding units 310b, 310c, 310d, 310e, or 310f split based on the split shape mode information indicating a predetermined splitting method.

Referring to FIG. 3, according to an embodiment, the image decoding apparatus 100 may determine two coding units 310b obtained by splitting the current coding unit 300 in a vertical direction, based on the split shape mode information indicating to perform splitting in a vertical direction. The image decoding apparatus 100 may determine two coding units 310c obtained by splitting the current coding unit 300 in a horizontal direction, based on the split shape mode information indicating to perform splitting in a horizontal direction. The image decoding apparatus 100 may determine four coding units 310d obtained by splitting the current coding unit 300 in vertical and horizontal directions, based on the split shape mode information indicating to perform splitting in vertical and horizontal directions. According to an embodiment, the image decoding apparatus 100 may determine three coding units 310e obtained by splitting the current coding unit 300 in a vertical direction, based on the split shape mode information indicating to perform ternary splitting in a vertical direction. The image decoding apparatus 100 may determine three coding units 310f obtained by splitting the current coding unit 300 in a horizontal direction, based on the split shape mode information indicating to perform ternary splitting in a horizontal direction. However, splitting methods of the square coding unit are not limited to the above-described methods, and the split shape mode information may indicate various methods. Predetermined splitting methods of splitting the square coding unit will be described in detail below in relation to various embodiments.

FIG. 4 illustrates a process, performed by an image decoding apparatus, of determining at least one coding unit by splitting a non-square coding unit, according to an embodiment.

According to an embodiment, the image decoding apparatus 100 may use block shape information indicating that a current coding unit has a non-square shape. The image decoding apparatus 100 may determine whether not to split the non-square current coding unit or whether to split the non-square current coding unit by using a predetermined splitting method, based on split shape mode information. Referring to FIG. 4, when the block shape information of a current coding unit 400 or 450 indicates a non-square shape, the image decoding apparatus 100 may determine a coding unit 410 or 460 having the same size as the current coding unit 400 or 450, based on the split shape mode information indicating not to perform splitting, or may determine coding units 420a and 420b, 430a to 430c, 470a and 470b, or 480a to 480c split based on the split shape mode information indicating a predetermined splitting method. Predetermined splitting methods of splitting a non-square coding unit will be described in detail below in relation to various embodiments.

According to an embodiment, the image decoding apparatus 100 may determine a splitting method of a coding unit by using the split shape mode information and, in this case, the split shape mode information may indicate the number of one or more coding units generated by splitting a coding unit. Referring to FIG. 4, when the split shape mode information indicates to split the current coding unit 400 or 450 into two coding units, the image decoding apparatus 100 may determine two coding units 420a and 420b, or 470a and 470b included in the current coding unit 400 or 450, by splitting the current coding unit 400 or 450 based on the split shape mode information.

According to an embodiment, when the image decoding apparatus 100 splits the non-square current coding unit 400 or 450 based on the split shape mode information, the image decoding apparatus 100 may consider the location of a long side of the non-square current coding unit 400 or 450 to split a current coding unit. For example, the image decoding apparatus 100 may determine a plurality of coding units by splitting the current coding unit 400 or 450 in a direction of splitting a long side of the current coding unit 400 or 450, in consideration of the shape of the current coding unit 400 or 450.

According to an embodiment, when the split shape mode information indicates to split (ternary split) a coding unit into an odd number of blocks, the image decoding apparatus 100 may determine an odd number of coding units included in the current coding unit 400 or 450. For example, when the split shape mode information indicates to split the current coding unit 400 or 450 into three coding units, the image decoding apparatus 100 may split the current coding unit 400 or 450 into three coding units 430a, 430b, and 430c, or 480a, 480b, and 480c.

According to an embodiment, a ratio of the width and height of the current coding unit 400 or 450 may be 4:1 or 1:4. When the ratio of the width and height is 4:1, the block shape information may indicate a horizontal direction because the length of the width is longer than the length of the height. When the ratio of the width and height is 1:4, the block shape information may indicate a vertical direction because the length of the width is shorter than the length of the height. The image decoding apparatus 100 may determine to split a current coding unit into an odd number of blocks, based on the split shape mode information. Also, the image decoding apparatus 100 may determine a split direction of the current coding unit 400 or 450, based on the block shape information of the current coding unit 400 or 450. For example, when the current coding unit 400 is in the vertical direction, the image decoding apparatus 100 may determine the coding units 430a, 430b, and 430c by splitting the current coding unit 400 in the horizontal direction. Also, when the current coding unit 450 is in the horizontal direction, the image decoding apparatus 100 may determine the coding units 480a, 480b, and 480c by splitting the current coding unit 450 in the vertical direction.

According to an embodiment, the image decoding apparatus 100 may determine an odd number of coding units included in the current coding unit 400 or 450, and not all the determined coding units may have the same size. For example, a predetermined coding unit 430b or 480b from among the determined odd number of coding units 430a, 430b, and 430c, or 480a, 480b, and 480c may have a size different from the size of the other coding units 430a and 430c, or 480a and 480c. That is, coding units which may be determined by splitting the current coding unit 400 or 450 may have multiple sizes and, in some cases, all of the odd number of coding units 430a, 430b, and 430c, or 480a, 480b, and 480c may have different sizes.

According to an embodiment, when the split shape mode information indicates to split a coding unit into the odd number of blocks, the image decoding apparatus 100 may determine the odd number of coding units included in the current coding unit 400 or 450, and moreover, may put a predetermined restriction on at least one coding unit from among the odd number of coding units generated by splitting the current coding unit 400 or 450. Referring to FIG. 4, the image decoding apparatus 100 may set a decoding process regarding the coding unit 430b or 480b located at the center among the three coding units 430a, 430b, and 430c, or 480a, 480b, and 480c generated as the current coding unit 400 or 450 is split to be different from that of the other coding units 430a and 430c, or 480a and 480c. For example, the image decoding apparatus 100 may restrict the coding unit 430*b* or 480*b* at the center location to be no longer split or to be split only a predetermined number of times, unlike the other coding units 430*a* and 430*c*, or 480*a* and 480*c*.

Figure 5:
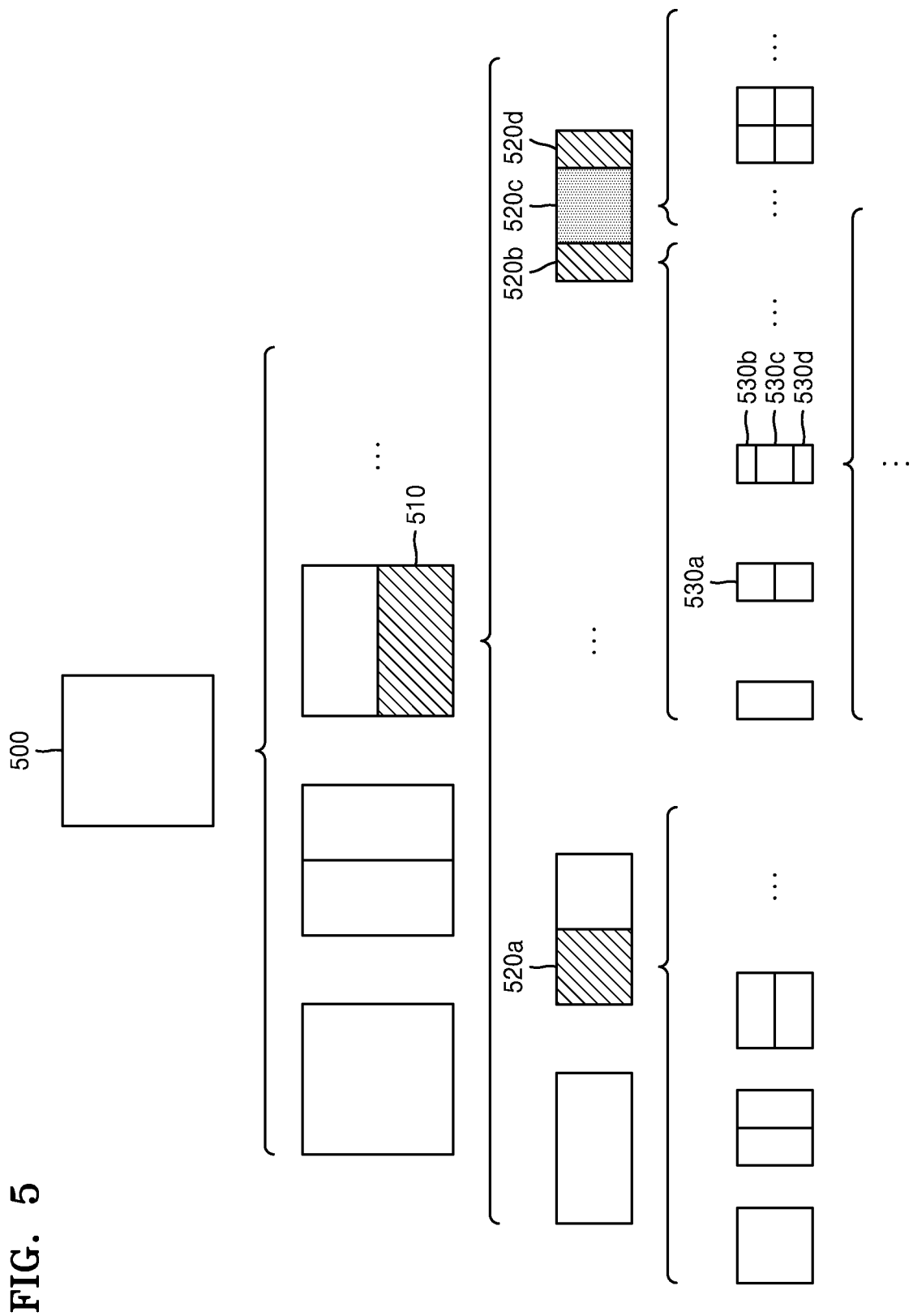
FIG. 5 illustrates a process, performed by an image decoding apparatus, of splitting a coding unit based on at least one of block shape information and split shape mode information, according to an embodiment.

FIG. 5 illustrates a process, performed by an image decoding apparatus, of splitting a coding unit based on at least one of block shape information and split shape mode information, according to an embodiment.

According to an embodiment, the image decoding apparatus 100 may determine to split or not to split a square first coding unit 500 into coding units, based on at least one of the block shape information and the split shape mode information. According to an embodiment, when the split shape mode information indicates to split the first coding unit 500 in a horizontal direction, the image decoding apparatus 100 may determine a second coding unit 510 by splitting the first coding unit 500 in a horizontal direction. A first coding unit, a second coding unit, and a third coding unit used according to an embodiment are terms used to understand a relation before and after splitting a coding unit. For example, a second coding unit may be determined by splitting a first coding unit, and a third coding unit may be determined by splitting the second coding unit. It will be understood that the relation of the first coding unit, the second coding unit, and the third coding unit follows the above descriptions.

According to an embodiment, the image decoding apparatus 100 may determine to split or not to split the determined second coding unit 510 into coding units, based on the split shape mode information. Referring to FIG. 5, the image decoding apparatus 100 may split the non-square second coding unit 510, which is determined by splitting the first coding unit 500, into one or more third coding units 520*a*, 520*b*, 520*c*, and 520*d* based on at least one of the split shape mode information and the split shape mode information, or may not split the non-square second coding unit 510. The image decoding apparatus 100 may obtain the split shape mode information, and may obtain a plurality of various-shaped second coding units (e.g., 510) by splitting the first coding unit 500, based on the obtained split shape mode information, and the second coding unit 510 may be split by using a splitting method of the first coding unit 500 based on the split shape mode information. According to an embodiment, when the first coding unit 500 is split into the second coding units 510 based on the split shape mode information of the first coding unit 500, the second coding unit 510 may also be split into the third coding units (e.g., 520*a*, or 520*b*, 520*c*, and 520*d*) based on the split shape mode information of the second coding unit 510. That is, a coding unit may be recursively split based on the split shape mode information of each coding unit. Therefore, a square coding unit may be determined by splitting a non-square coding unit, and a non-square coding unit may be determined by recursively splitting the square coding unit.

Referring to FIG. 5, a predetermined coding unit (e.g., a coding unit located at a center location, or a square coding unit) from among an odd number of third coding units 520*b*, 520*c*, and 520*d* determined by splitting the non-square second coding unit 510 may be recursively split. According to an embodiment, the square third coding unit 520*c* from among the odd number of third coding units 520*b*, 520*c*, and 520*d* may be split in a horizontal direction into a plurality of fourth coding units. A non-square fourth coding unit 530*b* or 530*d* from among the plurality of fourth coding units 530*a*, 530*b*, 530*c*, and 530*d* may be re-split into a plurality of coding units. For example, the non-square fourth coding unit 530*b* or 530*d* may be re-split into an odd number of coding units. A method that may be used to recursively split a coding unit will be described below in relation to various embodiments.

According to an embodiment, the image decoding apparatus 100 may split each of the third coding units 520*a*, or 520*b*, 520*c*, and 520*d* into coding units, based on the split shape mode information. Also, the image decoding apparatus 100 may determine not to split the second coding unit 510 based on the split shape mode information. According to an embodiment, the image decoding apparatus 100 may split the non-square second coding unit 510 into the odd number of third coding units 520*b*, 520*c*, and 520*d*. The image decoding apparatus 100 may put a predetermined restriction on a predetermined third coding unit from among the odd number of third coding units 520*b*, 520*c*, and 520*d*. For example, the image decoding apparatus 100 may restrict the third coding unit 520*c* at a center location from among the odd number of third coding units 520*b*, 520*c*, and 520*d* to be no longer split or to be split a settable number of times.

Referring to FIG. 5, the image decoding apparatus 100 may restrict the third coding unit 520*c*, which is at the center location from among the odd number of third coding units 520*b*, 520*c*, and 520*d* included in the non-square second coding unit 510, to be no longer split, to be split by using a predetermined splitting method (e.g., split into only four coding units or split by using a splitting method of the second coding unit 510), or to be split only a predetermined number of times (e.g., split only n times (where n>0)). However, the restrictions on the third coding unit 520*c* at the center location are not limited to the above-described examples, and may include various restrictions for decoding the third coding unit 520*c* at the center location differently from the other third coding units 520*b* and 520*d*.

According to an embodiment, the image decoding apparatus 100 may obtain the split shape mode information, which is used to split a current coding unit, from a predetermined location in the current coding unit.

Figure 6:
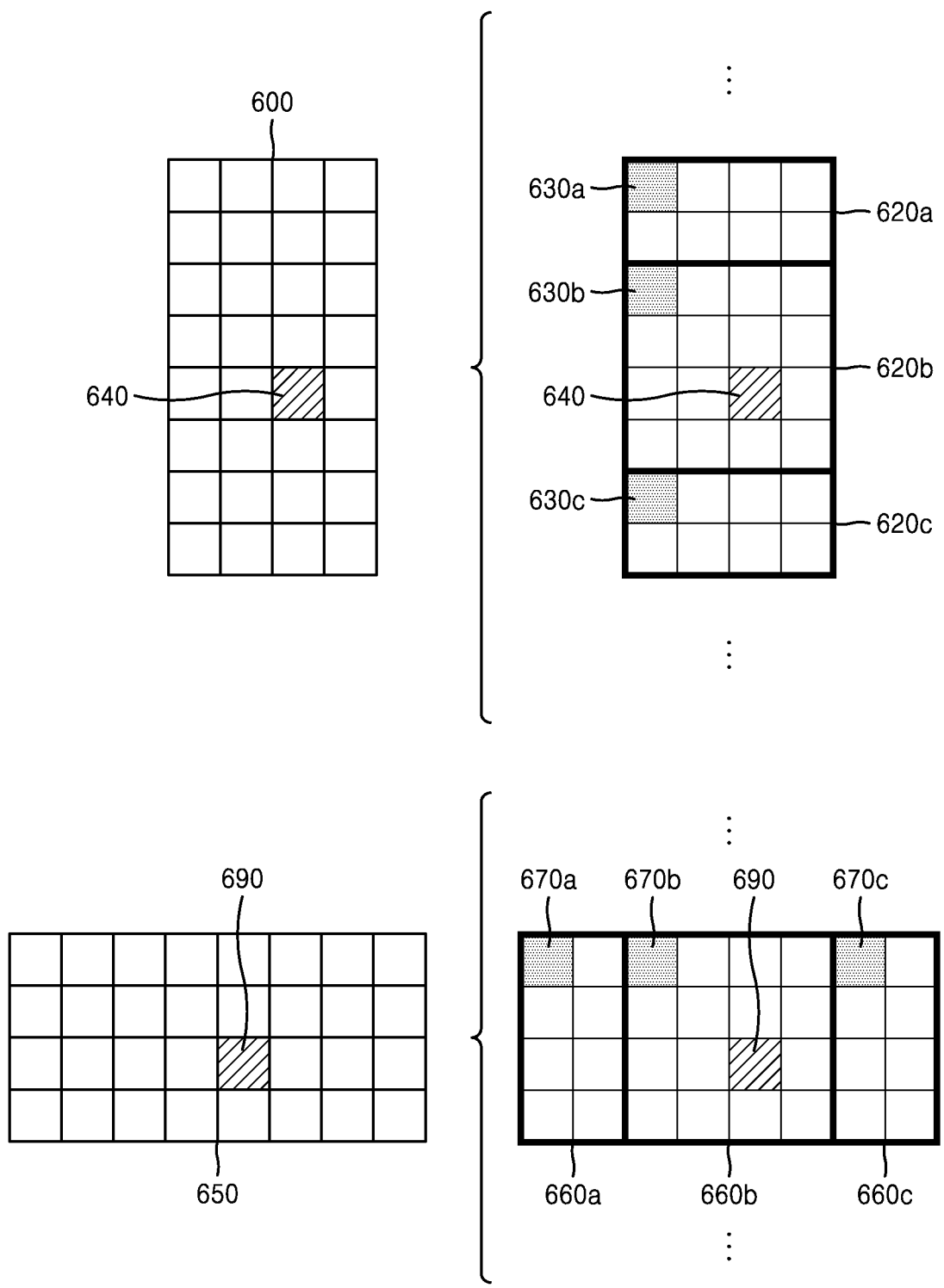
FIG. 6 illustrates a method, performed by an image decoding apparatus, of determining a predetermined coding unit from among an odd number of coding units, according to an embodiment.

FIG. 6 illustrates a method, performed by an image decoding apparatus, of determining a predetermined coding unit from among an odd number of coding units, according to an embodiment.

Referring to FIG. 6, split shape mode information of a current coding unit 600 or 650 may be obtained from a sample of a predetermined location (e.g., a sample 640 or 690 of a center location) from among a plurality of samples included in the current coding unit 600 or 650. However, the predetermined location in the current coding unit 600, from which at least one piece of the split shape mode information may be obtained, is not limited to the center location in FIG. 6, and may include various locations included in the current coding unit 600 (e.g., top, bottom, left, right, upper left, lower left, upper right, lower right locations, or the like). The image decoding apparatus 100 may obtain the split shape mode information from the predetermined location and may determine to split or not to split the current coding unit into various-shaped and various-sized coding units.

According to an embodiment, when the current coding unit is split into a predetermined number of coding units, the image decoding apparatus 100 may select one of the coding units. Various methods may be used to select one of a plurality of coding units, as will be described below in relation to various embodiments.

According to an embodiment, the image decoding apparatus 100 may split the current coding unit into a plurality of coding units, and may determine a coding unit at a predetermined location.

According to an embodiment, image decoding apparatus 100 may use information indicating locations of the odd number of coding units, to determine a coding unit at a center location from among the odd number of coding units. Referring to FIG. 6, the image decoding apparatus 100 may determine the odd number of coding units 620*a*, 620*b*, and 620*c* or the odd number of coding units 660*a*, 660*b*, and 660*c* by splitting the current coding unit 600 or the current coding unit 650. The image decoding apparatus 100 may determine the middle coding unit 620*b* or the middle coding unit 660*b* by using information about the locations of the odd number of coding units 620*a*, 620*b*, and 620*c* or the odd number of coding units 660*a*, 660*b*, and 660*c*. For example, the image decoding apparatus 100 may determine the coding unit 620*b* of the center location by determining the locations of the coding units 620*a*, 620*b*, and 620*c* based on information indicating locations of predetermined samples included in the coding units 620*a*, 620*b*, and 620*c*. In detail, the image decoding apparatus 100 may determine the coding unit 620*b* at the center location by determining the locations of the coding units 620*a*, 620*b*, and 620*c* based on information indicating locations of upper-left samples 630*a*, 630*b*, and 630*c* of the coding units 620*a*, 620*b*, and 620*c*.

According to an embodiment, the information indicating the locations of the upper-left samples 630*a*, 630*b*, and 630*c*, which are included in the coding units 620*a*, 620*b*, and 620*c*, respectively, may include information about locations or coordinates of the coding units 620*a*, 620*b*, and 620*c* in a picture. According to an embodiment, the information indicating the locations of the upper-left samples 630*a*, 630*b*, and 630*c*, which are included in the coding units 620*a*, 620*b*, and 620*c*, respectively, may include information indicating widths or heights of the coding units 620*a*, 620*b*, and 620*c* included in the current coding unit 600, and the widths or heights may correspond to information indicating differences between the coordinates of the coding units 620*a*, 620*b*, and 620*c* in the picture. That is, the image decoding apparatus 100 may determine the coding unit 620*b* at the center location by directly using the information about the locations or coordinates of the coding units 620*a*, 620*b*, and 620*c* in the picture, or by using the information about the widths or heights of the coding units, which correspond to the difference values between the coordinates.

According to an embodiment, information indicating the location of the upper-left sample 630*a* of the upper coding unit 620*a* may include coordinates (xa, ya), information indicating the location of the upper-left sample 630*b* of the center coding unit 620*b* may include coordinates (xb, yb), and information indicating the location of the upper-left sample 630*c* of the lower coding unit 620*c* may include coordinates (xc, yc). The image decoding apparatus 100 may determine the middle coding unit 620*b* by using the coordinates of the upper-left samples 630*a*, 630*b*, and 630*c* which are included in the coding units 620*a*, 620*b*, and 620*c*, respectively. For example, when the coordinates of the upper-left samples 630*a*, 630*b*, and 630*c* are sorted in an ascending or descending order, the coding unit 620*b* including the coordinates (xb, yb) of the sample 630*b* at a center location may be determined as a coding unit at a center location from among the coding units 620*a*, 620*b*, and 620*c* determined by splitting the current coding unit 600. However, the coordinates indicating the locations of the upper-left samples 630*a*, 630*b*, and 630*c* may include coordinates indicating absolute locations in the picture, or may use coordinates (dxb, dyb) indicating a relative location of the upper-left sample 630*b* of the middle coding unit 620*b* and coordinates (dxc, dyc) indicating a relative location of the upper-left sample 630*c* of the lower coding unit 620*c* with reference to the location of the upper-left sample 630*a* of the upper coding unit 620*a*. A method of determining a coding unit at a predetermined location by using coordinates of a sample included in the coding unit, as information indicating a location of the sample, is not limited to the above-described method, and may include various arithmetic methods capable of using the coordinates of the sample.

According to an embodiment, the image decoding apparatus 100 may split the current coding unit 600 into a plurality of coding units 620*a*, 620*b*, and 620*c*, and may select one of the coding units 620*a*, 620*b*, and 620*c* based on a predetermined criterion. For example, the image decoding apparatus 100 may select the coding unit 620*b*, which has a size different from that of the others, from among the coding units 620*a*, 620*b*, and 620*c*.

According to an embodiment, the image decoding apparatus 100 may determine the width or height of each of the coding units 620*a*, 620*b*, and 620*c* by using the coordinates (xa, ya) that is the information indicating the location of the upper-left sample 630*a* of the upper coding unit 620*a*, the coordinates (xb, yb) that is the information indicating the location of the upper-left sample 630*b* of the middle coding unit 620*b*, and the coordinates (xc, yc) that are the information indicating the location of the upper-left sample 630*c* of the lower coding unit 620*c*. The image decoding apparatus 100 may determine the respective sizes of the coding units 620*a*, 620*b*, and 620*c* by using the coordinates (xa, ya), (xb, yb), and (xc, yc) indicating the locations of the coding units 620*a*, 620*b*, and 620*c*. According to an embodiment, the image decoding apparatus 100 may determine the width of the upper coding unit 620*a* to be the width of the current coding unit 600. The image decoding apparatus 100 may determine the height of the upper coding unit 620*a* to be yb-ya. According to an embodiment, the image decoding apparatus 100 may determine the width of the middle coding unit 620*b* to be the width of the current coding unit 600. The image decoding apparatus 100 may determine the height of the middle coding unit 620*b* to be yc-yb. According to an embodiment, the image decoding apparatus 100 may determine the width or height of the lower coding unit 620*c* by using the width or height of the current coding unit 600 or the widths or heights of the upper and middle coding units 620*a* and 620*b*. The image decoding apparatus 100 may determine a coding unit, which has a size different from that of the others, based on the determined widths and heights of the coding units 620*a*, 620*b*, and 620*c*. Referring to FIG. 6, the image decoding apparatus 100 may determine the middle coding unit 620*b*, which has a size different from the size of the upper and lower coding units 620*a* and 620*c*, as the coding unit of the predetermined location. However, the above-described method, performed by the image decoding apparatus 100, of determining a coding unit having a size different from the size of the other coding units merely corresponds to an example of determining a coding unit at a predetermined location by using the sizes of coding units, which are determined based on coordinates of samples, and thus various methods of determining a coding unit at a predetermined location by comparing the sizes of coding units, which are determined based on coordinates of predetermined samples, may be used.

The image decoding apparatus 100 may determine the width or height of each of the coding units 660*a*, 660*b*, and 660*c* by using the coordinates (xd, yd) that are information indicating the location of an upper-left sample 670*a* of the left coding unit 660*a*, the coordinates (xe, ye) that are information indicating the location of an upper-left sample 670*b* of the middle coding unit 660*b*, and the coordinates (xf, yf) that are information indicating a location of the upper-left sample 670*c* of the right coding unit 660*c*. The image decoding apparatus 100 may determine the respective sizes of the coding units 660*a*, 660*b*, and 660*c* by using the coordinates (xd, yd), (xe, ye), and (xf, yf) indicating the locations of the coding units 660*a*, 660*b*, and 660*c*.

According to an embodiment, the image decoding apparatus 100 may determine the width of the left coding unit 660*a* to be xe-xd. The image decoding apparatus 100 may determine the height of the left coding unit 660*a* to be the height of the current coding unit 650. According to an embodiment, the image decoding apparatus 100 may determine the width of the middle coding unit 660*b* to be xf-xe. The image decoding apparatus 100 may determine the height of the middle coding unit 660*b* to be the height of the current coding unit 650. According to an embodiment, the image decoding apparatus 100 may determine the width or height of the right coding unit 660*c* by using the width or height of the current coding unit 650 or the widths or heights of the left and middle coding units 660*a* and 660*b*. The image decoding apparatus 100 may determine a coding unit, which has a size different from that of the others, based on the determined widths and heights of the coding units 660*a*, 660*b*, and 660*c*. Referring to FIG. 6, the image decoding apparatus 100 may determine the middle coding unit 660*b*, which has a size different from the sizes of the left and right coding units 660*a* and 660*c*, as the coding unit of the predetermined location. However, the above-described method, performed by the image decoding apparatus 100, of determining a coding unit having a size different from the size of the other coding units merely corresponds to an example of determining a coding unit at a predetermined location by using the sizes of coding units, which are determined based on coordinates of samples, and thus various methods of determining a coding unit at a predetermined location by comparing the sizes of coding units, which are determined based on coordinates of predetermined samples, may be used.

However, locations of samples considered to determine locations of coding units are not limited to the above-described upper left locations, and information about arbitrary locations of samples included in the coding units may be used.

According to an embodiment, the image decoding apparatus 100 may select a coding unit at a predetermined location from among an odd number of coding units determined by splitting the current coding unit, considering the shape of the current coding unit. For example, when the current coding unit has a non-square shape, a width of which is longer than a height, the image decoding apparatus 100 may determine the coding unit at the predetermined location in a horizontal direction. That is, the image decoding apparatus 100 may determine one of coding units at different locations in a horizontal direction and may put a restriction on the coding unit. When the current coding unit has a non-square shape, a height of which is longer than a width, the image decoding apparatus 100 may determine the coding unit at the predetermined location in a vertical direction. That is, the image decoding apparatus 100 may determine one of coding units at different locations in a vertical direction and may put a restriction on the coding unit.

According to an embodiment, the image decoding apparatus 100 may use information indicating respective locations of an even number of coding units, to determine the coding unit at the predetermined location from among the even number of coding units. The image decoding apparatus 100 may determine an even number of coding units by splitting (binary splitting) the current coding unit, and may determine the coding unit at the predetermined location by using the information about the locations of the even number of coding units. An operation related thereto may correspond to the operation of determining a coding unit at a predetermined location (e.g., a center location) from among an odd number of coding units, which has been described in detail above in relation to FIG. 6, and thus detailed descriptions thereof are not provided here.

According to an embodiment, when a non-square current coding unit is split into a plurality of coding units, predetermined information about a coding unit at a predetermined location may be used in a splitting operation to determine the coding unit at the predetermined location from among the plurality of coding units. For example, the image decoding apparatus 100 may use at least one of block shape information and split shape mode information, which is stored in a sample included in a middle coding unit, in a splitting operation to determine a coding unit at a center location from among the plurality of coding units determined by splitting the current coding unit.

Referring to FIG. 6, the image decoding apparatus 100 may split the current coding unit 600 into the plurality of coding units 620*a*, 620*b*, and 620*c* based on the split shape mode information, and may determine the coding unit 620*b* at a center location from among the plurality of the coding units 620*a*, 620*b*, and 620*c*. Furthermore, the image decoding apparatus 100 may determine the coding unit 620*b* at the center location, in consideration of a location from which the split shape mode information is obtained. That is, the split shape mode information of the current coding unit 600 may be obtained from the sample 640 at a center location of the current coding unit 600 and, when the current coding unit 600 is split into the plurality of coding units 620*a*, 620*b*, and 620*c* based on the split shape mode information, the coding unit 620*b* including the sample 640 may be determined as the coding unit at the center location. However, information used to determine the coding unit at the center location is not limited to the split shape mode information, and various types of information may be used to determine the coding unit at the center location.

According to an embodiment, predetermined information for identifying the coding unit at the predetermined location may be obtained from a predetermined sample included in a coding unit to be determined. Referring to FIG. 6, the image decoding apparatus 100 may use the split shape mode information, which is obtained from a sample at a predetermined location in the current coding unit 600 (e.g., a sample at a center location of the current coding unit 600) to determine a coding unit at a predetermined location from among the plurality of the coding units 620*a*, 620*b*, and 620*c* determined by splitting the current coding unit 600 (e.g., a coding unit at a center location from among a plurality of split coding units). That is, the image decoding apparatus 100 may determine the sample at the predetermined location by considering a block shape of the current coding unit 600, may determine the coding unit 620*b* including a sample, from which predetermined information (e.g., the split shape mode information) can be obtained, from among the plurality of coding units 620*a*, 620*b*, and 620*c* determined by splitting the current coding unit 600, and may put a predetermined restriction on the coding unit 620*b*. Referring to FIG. 6, according to an embodiment, the image decoding apparatus 100 may determine the sample 640 at the center location of the current coding unit 600 as the sample from which the predetermined information may be obtained, and may put a predetermined restriction on the coding unit 620*b* including the sample 640, in a decoding operation. However, the location of the sample from which the predetermined information can be obtained is not limited to the above-described location, and may include arbitrary locations of samples included in the coding unit 620*b* to be determined for a restriction.

According to an embodiment, the location of the sample from which the predetermined information may be obtained may be determined based on the shape of the current coding unit 600. According to an embodiment, the block shape information may indicate whether the current coding unit has a square or non-square shape, and the location of the sample from which the predetermined information may be obtained may be determined based on the shape. For example, the image decoding apparatus 100 may determine a sample located on a boundary for splitting at least one of a width and height of the current coding unit in half, as the sample from which the predetermined information can be obtained, by using at least one of information about the width of the current coding unit and information about the height of the current coding unit. As another example, when the block shape information of the current coding unit indicates a non-square shape, the image decoding apparatus 100 may determine one of samples adjacent to a boundary for splitting a long side of the current coding unit in half, as the sample from which the predetermined information can be obtained.

According to an embodiment, when the current coding unit is split into a plurality of coding units, the image decoding apparatus 100 may use the split shape mode information to determine a coding unit at a predetermined location from among the plurality of coding units. According to an embodiment, the image decoding apparatus 100 may obtain the split shape mode information from a sample at a predetermined location in a coding unit, and may split the plurality of coding units, which are generated by splitting the current coding unit, by using the split shape mode information, which is obtained from the sample of the predetermined location in each of the plurality of coding units. That is, a coding unit may be recursively split based on the split shape mode information, which is obtained from the sample at the predetermined location in each coding unit. An operation of recursively splitting a coding unit has been described above in relation to FIG. 5, and thus detailed descriptions thereof will not be provided here.

According to an embodiment, the image decoding apparatus 100 may determine one or more coding units by splitting the current coding unit, and may determine an order of decoding the one or more coding units, based on a predetermined block (e.g., the current coding unit).

Figure 7:
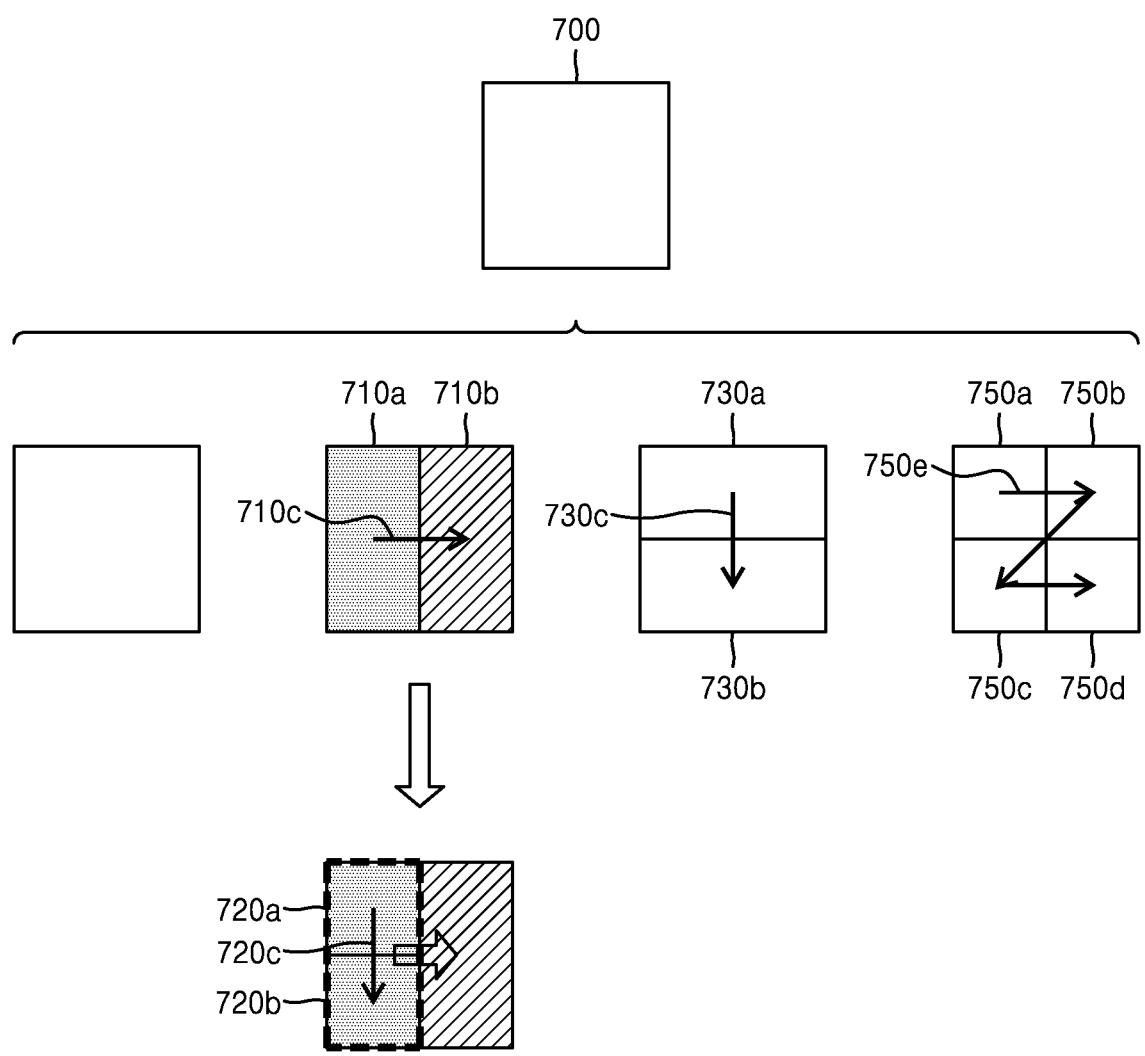
FIG. 7 illustrates an order of processing a plurality of coding units when an image decoding apparatus determines the plurality of coding units by splitting a current coding unit, according to an embodiment.

FIG. 7 illustrates an order of processing a plurality of coding units when an image decoding apparatus determines the plurality of coding units by splitting a current coding unit, according to an embodiment.

According to an embodiment, the image decoding apparatus 100 may determine second coding units 710*a* and 710*b* by splitting a first coding unit 700 in a vertical direction, may determine second coding units 730*a* and 730*b* by splitting the first coding unit 700 in a horizontal direction, or may determine second coding units 750*a*, 750*b*, 750*c*, and 750*d* by splitting the first coding unit 700 in vertical and horizontal directions, based on split shape mode information.

Referring to FIG. 7, the image decoding apparatus 100 may determine to process the second coding units 710*a* and 710*b*, which are determined by splitting the first coding unit 700 in a vertical direction, in a horizontal direction order 710*c*. The image decoding apparatus 100 may determine to process the second coding units 730*a* and 730*b*, which are determined by splitting the first coding unit 700 in a horizontal direction, in a vertical direction order 730*c*. The image decoding apparatus 100 may determine the second coding units 750*a*, 750*b*, 750*c*, and 750*d*, which are determined by splitting the first coding unit 700 in vertical and horizontal directions, according to a predetermined order (e.g., a raster scan order or Z-scan order 750*e*) by which coding units in a row are processed and then coding units in a next row are processed.

According to an embodiment, the image decoding apparatus 100 may recursively split coding units. Referring to FIG. 7, the image decoding apparatus 100 may determine the plurality of coding units 710*a* and 710*b*, 730*a* and 730*b*, or 750*a*, 750*b*, 750*c*, and 750*d* by splitting the first coding unit 700, and may recursively split each of the determined plurality of coding units 710*a*, 710*b*, 730*a*, 730*b*, 750*a*, 750*b*, 750*c*, and 750*d*. A splitting method of the plurality of coding units 710*a* and 710*b*, 730*a* and 730*b*, or 750*a*, 750*b*, 750*c*, and 750*d* may correspond to a splitting method of the first coding unit 700. Accordingly, each of the plurality of coding units 710*a* and 710*b*, 730*a* and 730*b*, or 750*a*, 750*b*, 750*c*, and 750*d* may be independently split into a plurality of coding units. Referring to FIG. 7, the image decoding apparatus 100 may determine the second coding units 710*a* and 710*b* by splitting the first coding unit 700 in a vertical direction, and may determine to independently split or not to split each of the second coding units 710*a* and 710*b*.

According to an embodiment, the image decoding apparatus 100 may determine third coding units 720*a* and 720*b* by splitting the left second coding unit 710*a* in a horizontal direction, and may not split the right second coding unit 710*b*.

According to an embodiment, a processing order of coding units may be determined based on an operation of splitting a coding unit. In other words, a processing order of split coding units may be determined based on a processing order of coding units immediately before being split. The image decoding apparatus 100 may determine a processing order of the third coding units 720*a* and 720*b* determined by splitting the left second coding unit 710*a*, independently of the right second coding unit 710*b*. Because the third coding units 720*a* and 720*b* are determined by splitting the left second coding unit 710*a* in a horizontal direction, the third coding units 720*a* and 720*b* may be processed in a vertical direction order 720*c*. Because the left and right second coding units 710*a* and 710*b* are processed in the horizontal direction order 710*c*, the right second coding unit 710*b* may be processed after the third coding units 720*a* and 720*b* included in the left second coding unit 710*a* are processed in the vertical direction order 720*c*. An operation of determining a processing order of coding units based on a coding unit before being split is not limited to the above-described example, and various methods may be used to independently process coding units, which are split and determined to various shapes, in a predetermined order.

Figure 8:
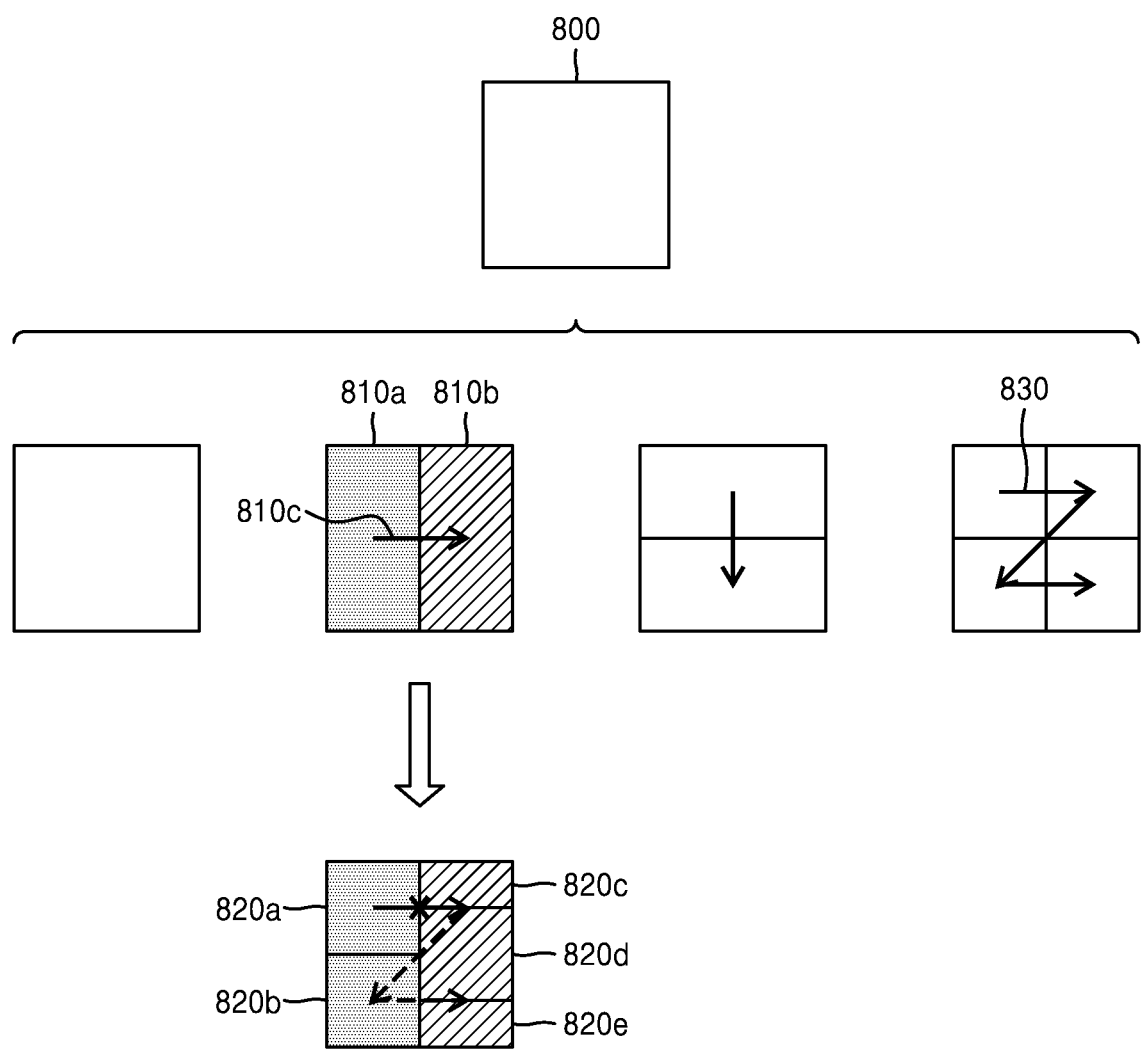
FIG. 8 illustrates a process, performed by an image decoding apparatus, of determining that a current coding unit is to be split into an odd number of coding units, when the coding units are not processable in a predetermined order, according to an embodiment.

FIG. 8 illustrates a process, performed by an image decoding apparatus, of determining that a current coding unit is to be split into an odd number of coding units, when the coding units are not processable in a predetermined order, according to an embodiment.

According to an embodiment, the image decoding apparatus 100 may determine that the current coding unit is split into an odd number of coding units, based on obtained split shape mode information. Referring to FIG. 8, a square first coding unit 800 may be split into non-square second coding units 810*a* and 810*b*. The image decoding apparatus 100 may determine to process the second coding units 810*a* and 810*b*, in a horizontal direction order 810*c*. The second coding units 810*a* and 810*b* may be independently split into third coding units 820*a* and 820*b*, and 820*c*, 820*d*, and 820*e*. According to an embodiment, the image decoding apparatus 100 may determine the plurality of third coding units 820*a* and 820*b* by splitting the left second coding unit 810*a* in a horizontal direction, and may split the right second coding unit 810*b* into the odd number of third coding units 820*c*, 820*d*, and 820*e*.

According to an embodiment, the video decoding apparatus 100 may determine whether any coding unit is split into an odd number of coding units, by determining whether the third coding units 820*a* and 820*b*, and 820*c*, 820*d*, and 820*e* are processable in a predetermined order. Referring to FIG. 8, the image decoding apparatus 100 may determine the third coding units 820*a* and 820*b*, and 820*c*, 820*d*, and 820*e* by recursively splitting the first coding unit 800. The image decoding apparatus 100 may determine whether any of the first coding unit 800, the second coding units 810*a* and 810*b*, or the third coding units 820*a* and 820*b*, and 820*c*, 820*d*, and 820*e* are split into an odd number of coding units, based on at least one of the block shape information and the split shape mode information. For example, a coding unit located in the right from among the second coding units 810*a* and 810*b* may be split into an odd number of third coding units 820*c*, 820*d*, and 820*e*. A processing order of a plurality of coding units included in the first coding unit 800 may be a predetermined order (e.g., a Z-scan order 830), and the image decoding apparatus 100 may determine whether the third coding units 820*c*, 820*d*, and 820*e*, which are determined by splitting the right second coding unit 810*b* into an odd number of coding units, satisfy a condition for processing in the predetermined order.

According to an embodiment, the image decoding apparatus 100 may determine whether the third coding units 820*a* and 820*b*, and 820*c*, 820*d*, and 820*e* included in the first coding unit 800 satisfy the condition for processing in the predetermined order, and the condition relates to whether at least one of a width and height of the second coding units 810*a* and 810*b* is to be split in half along a boundary of the third coding units 820*a* and 820*b*, and 820*c*, 820*d*, and 820*e*. For example, the third coding units 820*a* and 820*b* determined when the height of the left second coding unit 810*a* of the non-square shape is split in half may satisfy the condition. It may be determined that the third coding units 820*c*, 820*d*, and 820*e* do not satisfy the condition because the boundaries of the third coding units 820*c*, 820*d*, and 820*e* determined when the right second coding unit 810*b* is split into three coding units are unable to split the width or height of the right second coding unit 810*b* in half. When the condition is not satisfied as described above, the image decoding apparatus 100 may determine disconnection of a scan order, and may determine that the right second coding unit 810*b* is to be split into an odd number of coding units, based on a result of the determination. According to an embodiment, when a coding unit is split into an odd number of coding units, the image decoding apparatus 100 may put a predetermined restriction on a coding unit at a predetermined location from among the split coding units. The restriction or the predetermined location has been described above in relation to various embodiments, and thus detailed descriptions thereof will not be provided herein.

Figure 9:
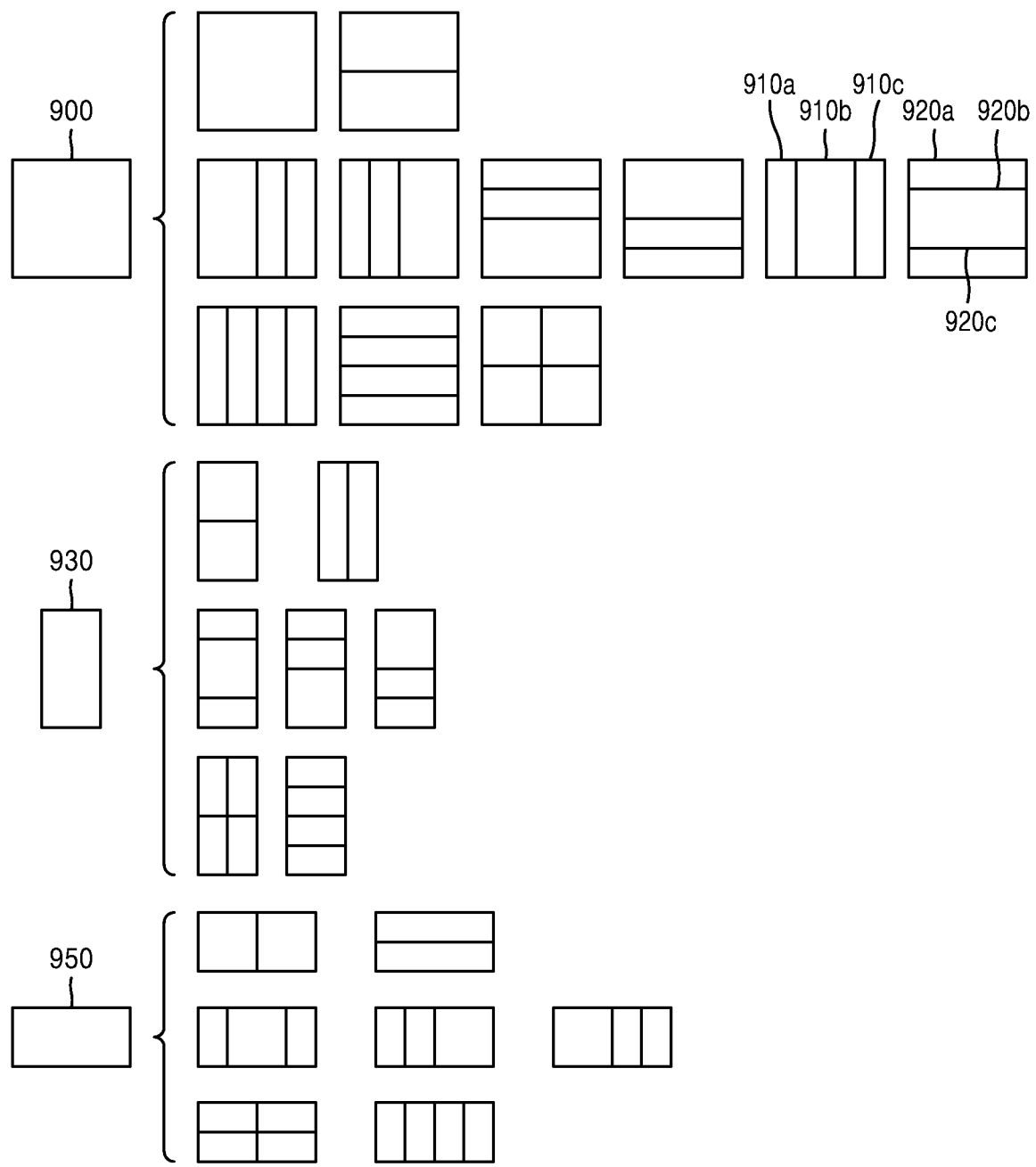
FIG. 9 illustrates a process, performed by an image decoding apparatus, of determining at least one coding unit by splitting a first coding unit, according to an embodiment.

FIG. 9 illustrates a process, performed by an image decoding apparatus, of determining at least one coding unit by splitting a first coding unit, according to an embodiment.

According to an embodiment, the image decoding apparatus 100 may split the first coding unit 900, based on split shape mode information, which is obtained through the receiver 110. The square first coding unit 900 may be split into four square coding units, or may be split into a plurality of non-square coding units. For example, referring to FIG. 9, when the first coding unit 900 has a square shape and the split shape mode information indicates to split the first coding unit 900 into non-square coding units, the image decoding apparatus 100 may split the first coding unit 900 into a plurality of non-square coding units. In detail, when the split shape mode information indicates to determine an odd number of coding units by splitting the first coding unit 900 in a horizontal direction or a vertical direction, the image decoding apparatus 100 may split the square first coding unit 900 into an odd number of coding units, e.g., second coding units 910*a*, 910*b*, and 910*c* determined by splitting the square first coding unit 900 in a vertical direction or second coding units 920*a*, 920*b*, and 920*c* determined by splitting the square first coding unit 900 in a horizontal direction.

According to an embodiment, the image decoding apparatus 100 may determine whether the second coding units 910*a*, 910*b*, 910*c*, 920*a*, 920*b*, and 920*c* included in the first coding unit 900 satisfy a condition for processing in a predetermined order, and the condition relates to whether at least one of a width and height of the first coding unit 900 is to be split in half along a boundary of the second coding units 910*a*, 910*b*, 910*c*, 920*a*, 920*b*, and 920*c*. Referring to FIG. 9, because boundaries of the second coding units 910*a*, 910*b*, and 910*c* determined by splitting the square first coding unit 900 in a vertical direction do not split the width of the first coding unit 900 in half, it may be determined that the first coding unit 900 does not satisfy the condition for processing in the predetermined order. Also, because boundaries of the second coding units 920*a*, 920*b*, and 920*c* determined by splitting the square first coding unit 900 in a horizontal direction do not split the height of the first coding unit 900 in half, it may be determined that the first coding unit 900 does not satisfy the condition for processing in the predetermined order. When the condition is not satisfied as described above, the image decoding apparatus 100 may decide disconnection of a scan order, and may determine that the first coding unit 900 is to be split into an odd number of coding units, based on a result of the decision. According to an embodiment, when a coding unit is split into an odd number of coding units, the image decoding apparatus 100 may put a predetermined restriction on a coding unit at a predetermined location from among the split coding units. The restriction or the predetermined location has been described above in relation to various embodiments, and thus detailed descriptions thereof will not be provided herein.

According to an embodiment, the image decoding apparatus 100 may determine various-shaped coding units by splitting a first coding unit.

Referring to FIG. 9, the image decoding apparatus 100 may split the square first coding unit 900 or a non-square first coding unit 930 or 950 into various-shaped coding units.

Figure 10:
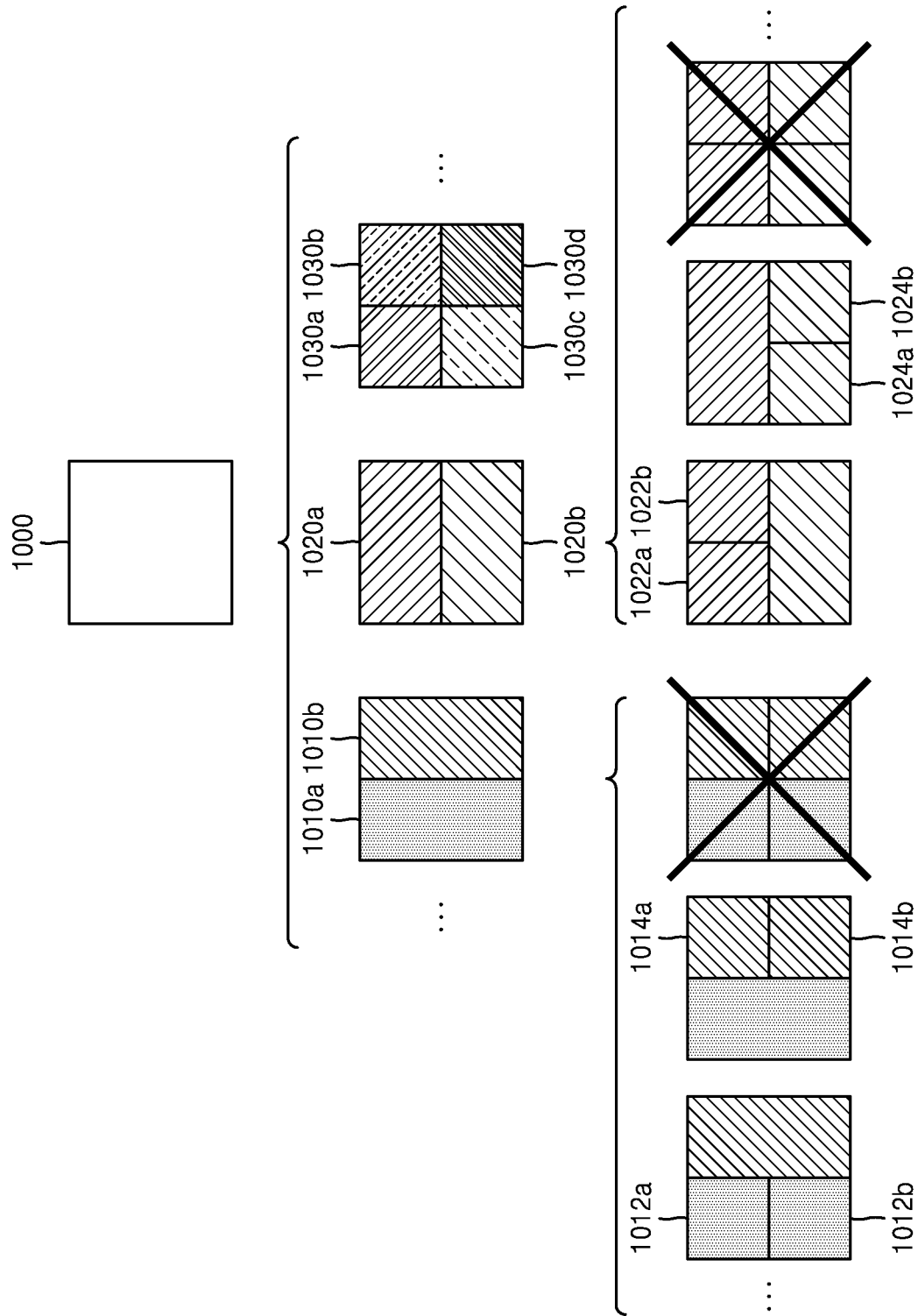
FIG. 10 illustrates that a shape into which a second coding unit is splittable is restricted when the second coding unit having a non-square shape, which is determined when an image decoding apparatus splits a first coding unit, satisfies a predetermined condition, according to an embodiment.

FIG. 10 illustrates that a shape into which a second coding unit is splittable is restricted when the second coding unit having a non-square shape, which is determined when an image decoding apparatus splits a first coding unit, satisfies a predetermined condition, according to an embodiment.

According to an embodiment, the image decoding apparatus 100 may determine to split the square first coding unit 1000 into non-square second coding units 1010*a*, and 1010*b* or 1020*a* and 1020*b*, based on split shape mode information, which is obtained by the receiver 110. The second coding units 1010*a* and 1010*b*, or 1020*a* and 1020*b* may be independently split. As such, the image decoding apparatus 100 may determine to split or not to split each of the second coding units 1010*a* and 1010*b*, or 1020*a* and 1020*b* into a plurality of coding units, based on the split shape mode information of each of the second coding units 1010*a* and 1010*b*, or 1020*a* and 1020*b*. According to an embodiment, the image decoding apparatus 100 may determine third coding units 1012*a* and 1012*b* by splitting the non-square left second coding unit 1010*a*, which is determined by splitting the first coding unit 1000 in a vertical direction, in a horizontal direction. However, when the left second coding unit 1010*a* is split in a horizontal direction, the image decoding apparatus 100 may restrict the right second coding unit 1010*b* not to be split in a horizontal direction in which the left second coding unit 1010*a* is split. When third coding units 1014*a* and 1014*b* are determined by splitting the right second coding unit 1010*b* in a same direction, because the left and right second coding units 1010*a* and 1010*b* are independently split in a horizontal direction, the third coding units 1012*a* and 1012*b*, or 1014*a* and 1014*b* may be determined. However, this case serves equally as a case in which the image decoding apparatus 100 splits the first coding unit 1000 into four square second coding units 1030*a*, 1030*b*, 1030*c*, and 1030*d*, based on the split shape mode information, and may be inefficient in terms of image decoding.

According to an embodiment, the image decoding apparatus 100 may determine third coding units 1022*a* and 1022*b*, or 1024*a* and 1024*b* by splitting the non-square second coding unit 1020*a* or 1020*b*, which is determined by splitting the first coding unit 1000 in a horizontal direction, in a vertical direction. However, when a second coding unit (e.g., the upper second coding unit 1020*a*) is split in a vertical direction, for the above-described reason, the image decoding apparatus 100 may restrict the other second coding unit (e.g., the lower second coding unit 1020*b*) not to be split in a vertical direction in which the upper second coding unit 1020*a* is split.

Figure 11:
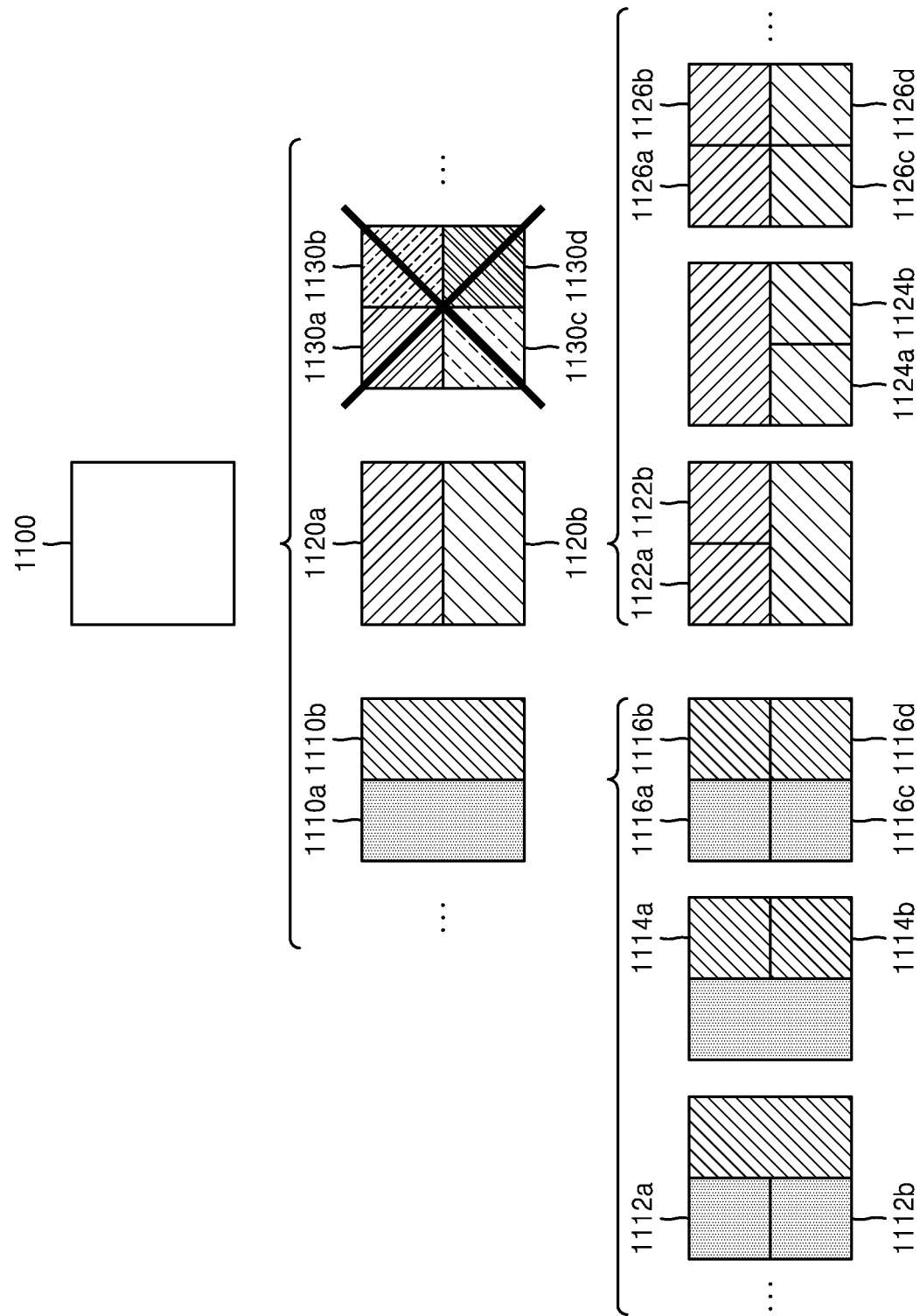
FIG. 11 illustrates a process, performed by an image decoding apparatus, of splitting a square coding unit when split shape mode information indicates that the square coding unit is not to be split into four square coding units, according to an embodiment.

FIG. 11 illustrates a process, performed by an image decoding apparatus, of splitting a square coding unit when split shape mode information indicates that the square coding unit is not to be split into four square coding units, according to an embodiment.

According to an embodiment, the image decoding apparatus 100 may determine second coding units 1110*a* and 1110*b*, or 1120*a* and 1120*b*, etc. by splitting a first coding unit 1100, based on split shape mode information. The split shape mode information may include information about various methods of splitting a coding unit but, the information about various splitting methods may not include information for splitting a coding unit into four square coding units. According to such split shape mode information, the image decoding apparatus 100 may not split the square first coding unit 1100 into four square second coding units 1130*a*, 1130*b*, 1130*c*, and 1130*d*. The image decoding apparatus 100 may determine the non-square second coding units 1110*a* and 1110*b*, or 1120*a* and 1120*b*, etc., based on the split shape mode information.

According to an embodiment, the image decoding apparatus 100 may independently split the non-square second coding units 1110*a* and 1110*b*, or 1120*a* and 1120*b*, etc. Each of the second coding units 1110*a* and 1110*b*, or 1120*a* and 1120*b*, etc. may be recursively split in a predetermined order, and this splitting method may correspond to a method of splitting the first coding unit 1100, based on the split shape mode information.

For example, the image decoding apparatus 100 may determine square third coding units 1112*a* and 1112*b* by splitting the left second coding unit 1110*a* in a horizontal direction, and may determine square third coding units 1114*a* and 1114*b* by splitting the right second coding unit 1110*b* in a horizontal direction. Furthermore, the image decoding apparatus 100 may determine square third coding units 1116*a*, 1116*b*, 1116*c*, and 1116*d* by splitting both of the left and right second coding units 1110*a* and 1110*b* in a horizontal direction. In this case, coding units having the same shape as the four square second coding units 1130*a*, 1130*b*, 1130*c*, and 1130*d* split from the first coding unit 1100 may be determined.

As another example, the image decoding apparatus 100 may determine square third coding units 1122*a* and 1122*b* by splitting the upper second coding unit 1120*a* in a vertical direction, and may determine square third coding units 1124*a* and 1124*b* by splitting the lower second coding unit 1120*b* in a vertical direction. Furthermore, the image decoding apparatus 100 may determine square third coding units 1126*a*, 1126*b*, 1126*c*, and 1126*d* by splitting both the upper and lower second coding units 1120*a* and 1120*b* in a vertical direction. In this case, coding units having the same shape as the four square second coding units 1130*a*, 1130*b*, 1130*c*, and 1130*d* split from the first coding unit 1100 may be determined.

Figure 12:
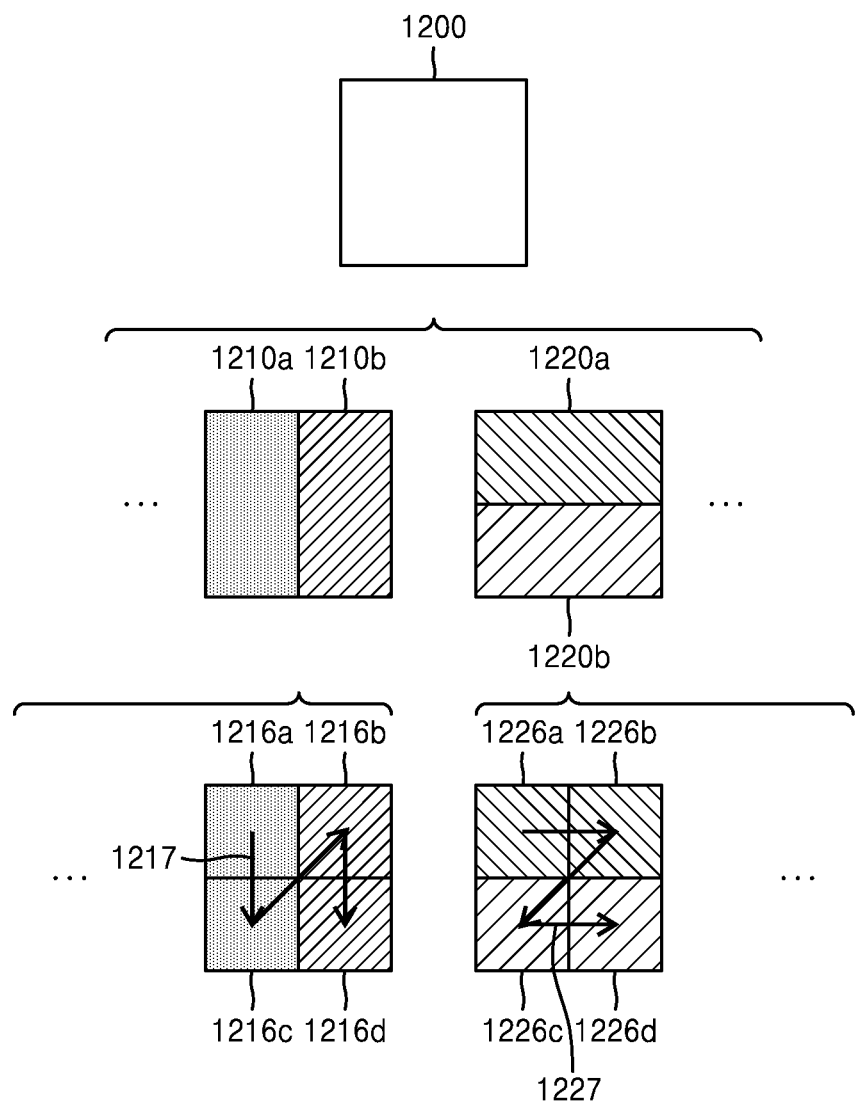
FIG. 12 illustrates that a processing order between a plurality of coding units may be changed depending on a process of splitting a coding unit, according to an embodiment.

FIG. 12 illustrates that a processing order between a plurality of coding units may be changed depending on a process of splitting a coding unit, according to an embodiment.

According to an embodiment, the image decoding apparatus 100 may split a first coding unit 1200, based on split shape mode information. When a block shape indicates a square shape and the split shape mode information indicates to split the first coding unit 1200 in at least one of horizontal and vertical directions, the image decoding apparatus 100 may determine second coding units 1210*a* and 1210*b*, or 1220*a* and 1220*b*, etc. by splitting the first coding unit 1200. Referring to FIG. 12, the non-square second coding units 1210*a* and 1210*b*, or 1220*a* and 1220*b* determined by splitting the first coding unit 1200 in only a horizontal direction or vertical direction may be independently split based on the split shape mode information of each coding unit. For example, the image decoding apparatus 100 may determine third coding units 1216*a*, 1216*b*, 1216*c*, and 1216*d* by splitting the second coding units 1210*a* and 1210*b*, which are generated by splitting the first coding unit 1200 in a vertical direction, in a horizontal direction, and may determine third coding units 1226*a*, 1226*b*, 1226*c*, and 1226*d* by splitting the second coding units 1220*a* and 1220*b*, which are generated by splitting the first coding unit 1200 in a horizontal direction, in a vertical direction. An operation of splitting the second coding units 1210*a* and 1210*b*, or 1220*a* and 1220*b* has been described above in relation to FIG. 11, and thus detailed descriptions thereof will not be provided herein.

According to an embodiment, the image decoding apparatus 100 may process coding units in a predetermined order. An operation of processing coding units in a predetermined order has been described above in relation to FIG. 7, and thus detailed descriptions thereof will not be provided herein. Referring to FIG. 12, the image decoding apparatus 100 may determine four square third coding units 1216*a*, 1216*b*, 1216*c*, and 1216*d*, and 1226*a*, 1226*b*, 1226*c*, and 1226*d* by splitting the square first coding unit 1200. According to an embodiment, the image decoding apparatus 100 may determine processing orders of the third coding units 1216*a*, 1216*b*, 1216*c*, and 1216*d*, and 1226*a*, 1226*b*, 1226*c*, and 1226*d* based on a split shape by which the first coding unit 1200 is split.

According to an embodiment, the image decoding apparatus 100 may determine the third coding units 1216*a*, 1216*b*, 1216*c*, and 1216*d* by splitting the second coding units 1210*a* and 1210*b* generated by splitting the first coding unit 1200 in a vertical direction, in a horizontal direction, and may process the third coding units 1216*a*, 1216*b*, 1216*c*, and 1216*d* in a processing order 1217 for initially processing the third coding units 1216*a* and 1216*c*, which are included in the left second coding unit 1210*a*, in a vertical direction and then processing the third coding unit 1216*b* and 1216*d*, which are included in the right second coding unit 1210*b*, in a vertical direction.

According to an embodiment, the image decoding apparatus 100 may determine the third coding units 1226*a*, 1226*b*, 1226*c*, and 1226*d* by splitting the second coding units 1220*a* and 1220*b* generated by splitting the first coding unit 1200 in a horizontal direction, in a vertical direction, and may process the third coding units 1226*a*, 1226*b*, 1226*c*, and 1226*d* in a processing order 1227 for initially processing the third coding units 1226*a* and 1226*b*, which are included in the upper second coding unit 1220*a*, in a horizontal direction and then processing the third coding unit 1226*c* and 1226*d*, which are included in the lower second coding unit 1220*b*, in a horizontal direction.

Referring to FIG. 12, the square third coding units 1216*a*, 1216*b*, 1216*c*, and 1216*d*, and 1226*a*, 1226*b*, 1226*c*, and 1226*d* may be determined by splitting the second coding units 1210*a* and 1210*b*, and 1220*a* and 1220*b*, respectively. Although the second coding units 1210*a* and 1210*b* are determined by splitting the first coding unit 1200 in a vertical direction differently from the second coding units 1220*a* and 1220*b* which are determined by splitting the first coding unit 1200 in a horizontal direction, the third coding units 1216*a*, 1216*b*, 1216*c*, and 1216*d*, and 1226*a*, 1226*b*, 1226*c*, and 1226*d* split therefrom eventually show same-shaped coding units split from the first coding unit 1200. As such, by recursively splitting a coding unit in different manners based on the split shape mode information, the image decoding apparatus 100 may process a plurality of coding units in different orders even when the coding units are eventually determined to be the same shape.

FIG. 13 illustrates a process of determining a depth of a coding unit as a shape and a size of the coding unit change, when the coding unit is recursively split such that a plurality of coding units are determined, according to an embodiment.

According to an embodiment, the image decoding apparatus 100 may determine the depth of the coding unit, based on a predetermined criterion. For example, the predetermined criterion may be the length of a long side of the coding unit. When the length of a long side of a coding unit before being split is 2n times (n>0) the length of a long side of a split current coding unit, the image decoding apparatus 100 may determine that a depth of the current coding unit is increased from a depth of the coding unit before being split, by n. In the following descriptions, a coding unit having an increased depth is expressed as a coding unit of a deeper depth.

Referring to FIG. 13, according to an embodiment, the image decoding apparatus 100 may determine a second coding unit 1302 and a third coding unit 1304 of deeper depths by splitting a square first coding unit 1300 based on block shape information indicating a square shape (e.g., the block shape information may be expressed as '0: SQUARE'). Assuming that the size of the square first coding unit 1300 is 2N×2N, the second coding unit 1302 determined by splitting a width and height of the first coding unit 1300 in ½ may have a size of N×N. Furthermore, the third coding unit 1304 determined by splitting a width and height of the second coding unit 1302 in ½ may have a size of N/2×N/2. In this case, a width and height of the third coding unit 1304 are ¼ times those of the first coding unit 1300. When a depth of the first coding unit 1300 is D, a depth of the second coding unit 1302, the width and height of which are ½ times those of the first coding unit 1300, may be D+1, and a depth of the third coding unit 1304, the width and height of which are ¼ times those of the first coding unit 1300, may be D+2.

According to an embodiment, the image decoding apparatus 100 may determine a second coding unit 1312 or 1322 and a third coding unit 1314 or 1324 of deeper depths by splitting a non-square first coding unit 1310 or 1320 based on block shape information indicating a non-square shape (e.g., the block shape information may be expressed as '1: NS_VER' indicating a non-square shape, a height of which is longer than a width, or as '2: NS_HOR' indicating a non-square shape, a width of which is longer than a height).

The image decoding apparatus 100 may determine a second coding unit 1302, 1312, or 1322 by splitting at least one of a width and height of the first coding unit 1310 having a size of N×2N. That is, the image decoding apparatus 100 may determine the second coding unit 1302 having a size of N×N or the second coding unit 1322 having a size of N×N/2 by splitting the first coding unit 1310 in a horizontal direction, or may determine the second coding unit 1312 having a size of N/2×N by splitting the first coding unit 1310 in horizontal and vertical directions.

According to an embodiment, the image decoding apparatus 100 may determine the second coding unit 1302, 1312, or 1322 by splitting at least one of a width and height of the first coding unit 1320 having a size of 2N×N. That is, the image decoding apparatus 100 may determine the second coding unit 1302 having a size of N×N or the second coding unit 1312 having a size of N/2×N by splitting the first coding unit 1320 in a vertical direction, or may determine the second coding unit 1322 having a size of N×N/2 by splitting the first coding unit 1320 in horizontal and vertical directions.

According to an embodiment, the image decoding apparatus 100 may determine a third coding unit 1304, 1314, or 1324 by splitting at least one of a width and height of the second coding unit 1302 having a size of N×N. That is, the image decoding apparatus 100 may determine the third coding unit 1304 having a size of N/2×N/2, the third coding unit 1314 having a size of N/4×N/2, or the third coding unit 1324 having a size of N/2×N/4 by splitting the second coding unit 1302 in vertical and horizontal directions.

According to an embodiment, the image decoding apparatus 100 may determine the third coding unit 1304, 1314, or 1324 by splitting at least one of a width and height of the second coding unit 1312 having a size of N/2×N. That is, the image decoding apparatus 100 may determine the third coding unit 1304 having a size of N/2×N/2 or the third coding unit 1324 having a size of N/2×N/4 by splitting the second coding unit 1312 in a horizontal direction, or may determine the third coding unit 1314 having a size of N/4×N/2 by splitting the second coding unit 1312 in vertical and horizontal directions.

According to an embodiment, the image decoding apparatus 100 may determine the third coding unit 1304, 1314, or 1324 by splitting at least one of a width and height of the second coding unit 1322 having a size of N×N/2. That is, the image decoding apparatus 100 may determine the third coding unit 1304 having a size of N/2×N/2 or the third coding unit 1314 having a size of N/4×N/2 by splitting the second coding unit 1322 in a vertical direction, or may determine the third coding unit 1324 having a size of N/2×N/4 by splitting the second coding unit 1322 in vertical and horizontal directions.

According to an embodiment, the image decoding apparatus 100 may split the square coding unit 1300, 1302, or 1304 in a horizontal or vertical direction. For example, the image decoding apparatus 100 may determine the first coding unit 1310 having a size of N×2N by splitting the first coding unit 1300 having a size of 2N×2N in a vertical direction, or may determine the first coding unit 1320 having a size of 2N×N by splitting the first coding unit 1300 in a horizontal direction. According to an embodiment, when a depth is determined based on the length of the longest side of a coding unit, a depth of a coding unit determined by splitting the first coding unit 1300 having a size of 2N×2N in a horizontal or vertical direction may be the same as the depth of the first coding unit 1300.

According to an embodiment, a width and height of the third coding unit 1314 or 1324 may be ¼ times those of the first coding unit 1310 or 1320. When a depth of the first coding unit 1310 or 1320 is D, a depth of the second coding unit 1312 or 1322, the width and height of which are ½ times those of the first coding unit 1310 or 1320, may be D+1, and a depth of the third coding unit 1314 or 1324, the width and height of which are ¼ times those of the first coding unit 1310 or 1320, may be D+2.

Figure 14:
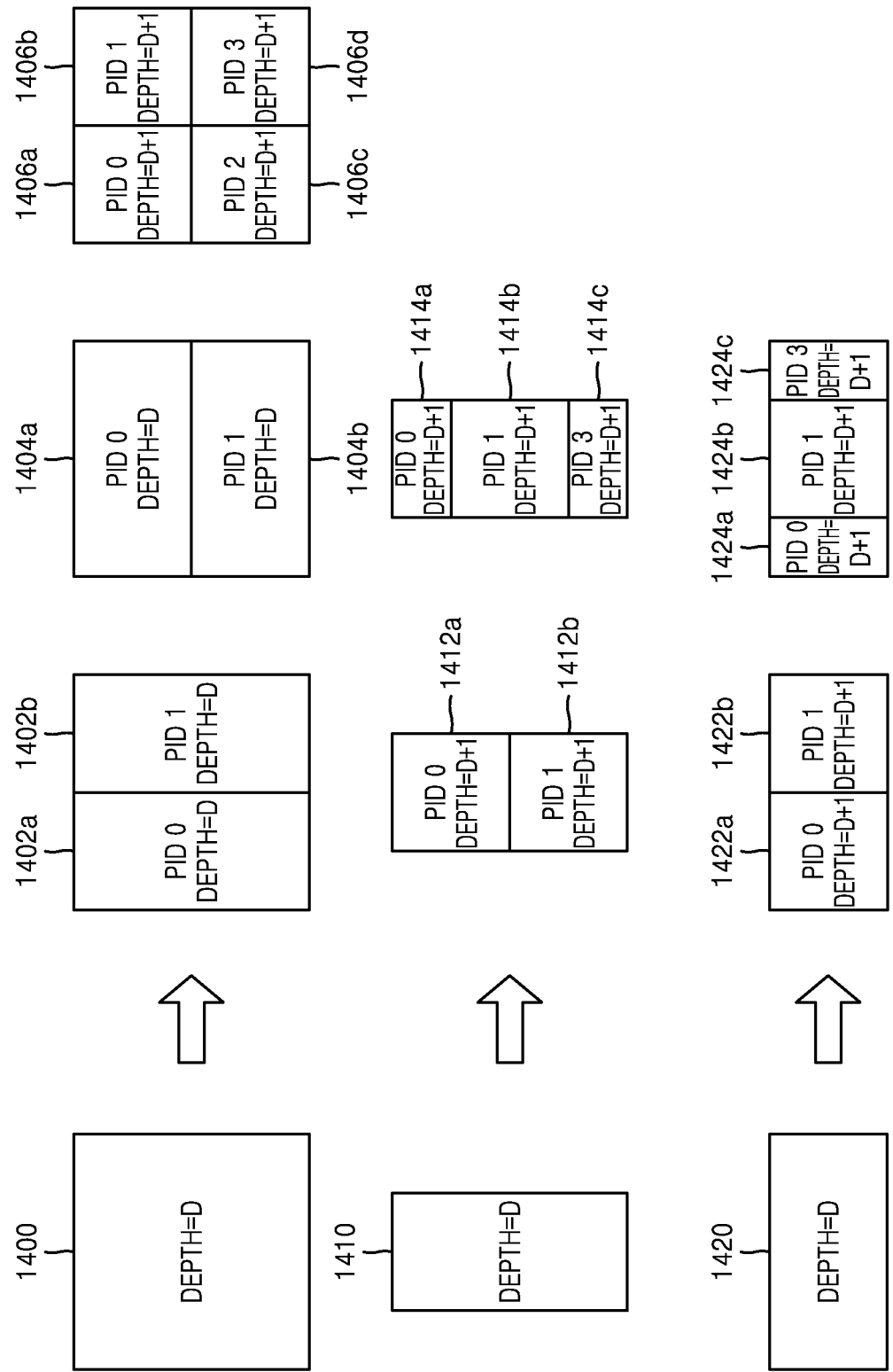
FIG. 14 illustrates depths that are determinable based on shapes and sizes of coding units, and part indexes (PIDs) that are for distinguishing the coding units, according to an embodiment.

FIG. 14 illustrates depths that are determinable based on shapes and sizes of coding units, and part indexes (PIDs) that are for distinguishing the coding units, according to an embodiment.

According to an embodiment, the image decoding apparatus 100 may determine various-shape second coding units by splitting a square first coding unit 1400. Referring to FIG. 14, the image decoding apparatus 100 may determine second coding units 1402a and 1402b, 1404a and 1404b, and 1406a, 1406b, 1406c, and 1406d by splitting the first coding unit 1400 in at least one of vertical and horizontal directions based on split shape mode information. That is, the image decoding apparatus 100 may determine the second coding units 1402a and 1402b, 1404a and 1404b, and 1406a, 1406b, 1406c, and 1406d, based on the split shape mode information of the first coding unit 1400.

According to an embodiment, depths of the second coding units 1402a and 1402b, 1404a and 1404b, and 1406a, 1406b, 1406c, and 1406d that are determined based on the split shape mode information of the square first coding unit 1400 may be determined based on the length of a long side thereof. For example, because the length of a side of the square first coding unit 1400 equals the length of a long side of the non-square second coding units 1402a and 1402b, and 1404a and 1404b, the first coding unit 1400 and the non-square second coding units 1402a and 1402b, and 1404a and 1404b may have the same depth, e.g., D. However, when the image decoding apparatus 100 splits the first coding unit 1400 into the four square second coding units 1406a, 1406b, 1406c, and 1406d based on the split shape mode information, because the length of a side of the square second coding units 1406a, 1406b, 1406c, and 1406d is ½ times the length of a side of the first coding unit 1400, a depth of the second coding units 1406a, 1406b, 1406c, and 1406d may be D+1 which is deeper than the depth D of the first coding unit 1400 by 1.

According to an embodiment, the image decoding apparatus 100 may determine a plurality of second coding units 1412a and 1412b, and 1414a, 1414b, and 1414c by splitting a first coding unit 1410, a height of which is longer than a width, in a horizontal direction based on the split shape mode information. According to an embodiment, the image decoding apparatus 100 may determine a plurality of second coding units 1422a and 1422b, and 1424a, 1424b, and 1424c by splitting a first coding unit 1420, a width of which is longer than a height, in a vertical direction based on the split shape mode information.

According to an embodiment, a depth of the second coding units 1412a and 1412b, and 1414a, 1414b, and 1414c, or 1422a and 1422b, and 1424a, 1424b, and 1424c, which are determined based on the split shape mode information of the non-square first coding unit 1410 or 1420, may be determined based on the length of a long side thereof. For example, because the length of a side of the square second coding units 1412a and 1412b is ½ times the length of a long side of the first coding unit 1410 having a non-square shape, a height of which is longer than a width, a depth of the square second coding units 1412a and 1412b is D+1 which is deeper than the depth D of the non-square first coding unit 1410 by 1.

Furthermore, the image decoding apparatus 100 may split the non-square first coding unit 1410 into an odd number of second coding units 1414a, 1414b, and 1414c based on the split shape mode information. The odd number of second coding units 1414a, 1414b, and 1414c may include the non-square second coding units 1414a and 1414c and the square second coding unit 1414b. In this case, because the length of a long side of the non-square second coding units 1414a and 1414c and the length of a side of the square second coding unit 1414b are ½ times the length of a long side of the first coding unit 1410, a depth of the second coding units 1414a, 1414b, and 1414c may be D+1 which is deeper than the depth D of the non-square first coding unit 1410 by 1. The image decoding apparatus 100 may determine depths of coding units split from the first coding unit 1420 having a non-square shape, a width of which is longer than a height, by using the above-described method of determining depths of coding units split from the first coding unit 1410.

According to an embodiment, the image decoding apparatus 100 may determine PIDs for identifying split coding units, based on a size ratio between the coding units when an odd number of split coding units do not have equal sizes. Referring to FIG. 14, a coding unit 1414b of a center location among an odd number of split coding units 1414a, 1414b, and 1414c may have a width equal to that of the other coding units 1414a and 1414c and a height which is two times that of the other coding units 1414a and 1414c. That is, in this case, the coding unit 1414b at the center location may include two of the other coding unit 1414a or 1414c. Therefore, when a PID of the coding unit 1414b at the center location is 1 based on a scan order, a PID of the coding unit 1414c located next to the coding unit 1414b may be increased by 2 and thus may be 3. That is, discontinuity in PID values may be present. According to an embodiment, the image decoding apparatus 100 may determine whether an odd number of split coding units do not have equal sizes, based on whether discontinuity is present in PIDs for identifying the split coding units.

According to an embodiment, the image decoding apparatus 100 may determine whether to use a specific splitting method, based on PID values for identifying a plurality of coding units determined by splitting a current coding unit. Referring to FIG. 14, the image decoding apparatus 100 may determine an even number of coding units 1412a and 1412b or an odd number of coding units 1414a, 1414b, and 1414c by splitting the first coding unit 1410 having a rectangular shape, a height of which is longer than a width. The image decoding apparatus 100 may use PIDs indicating respective coding units so as to identify the respective coding units. According to an embodiment, the PID may be obtained from a sample at a predetermined location of each coding unit (e.g., an upper-left sample).

According to an embodiment, the image decoding apparatus 100 may determine a coding unit at a predetermined location from among the split coding units, by using the PIDs for distinguishing the coding units. According to an embodiment, when the split shape mode information of the first coding unit 1410 having a rectangular shape, a height of which is longer than a width, indicates to split a coding unit into three coding units, the image decoding apparatus 100 may split the first coding unit 1410 into three coding units 1414a, 1414b, and 1414c. The image decoding apparatus 100 may assign a PID to each of the three coding units 1414a, 1414b, and 1414c. The image decoding apparatus 100 may compare PIDs of an odd number of split coding units to determine a coding unit at a center location from among the coding units. The image decoding apparatus 100 may determine the coding unit 1414b having a PID corresponding to a middle value among the PIDs of the coding units, as the coding unit at the center location from among the coding units determined by splitting the first coding unit 1410. According to an embodiment, the image decoding apparatus 100 may determine PIDs for distinguishing split coding units, based on a size ratio between the coding units when the split coding units do not have equal sizes. Referring to FIG. 14, the coding unit 1414b generated by splitting the first coding unit 1410 may have a width equal to that of the other coding units 1414a and 1414c and a height which is two times that of the other coding units 1414a and 1414c. In this case, when the PID of the coding unit 1414b at the center location is 1, the PID of the coding unit 1414c located next to the coding unit 1414b may be increased by 2 and thus may be 3. When the PID is not uniformly increased as described above, the image decoding apparatus 100 may determine that a coding unit is split into a plurality of coding units including a coding unit having a size different from that of the other coding units. According to an embodiment, when the split shape mode information indicates to split a coding unit into an odd number of coding units, the image decoding apparatus 100 may split a current coding unit in such a manner that a coding unit of a predetermined location among an odd number of coding units (e.g., a coding unit of a center location) has a size different from that of the other coding units. In this case, the image decoding apparatus 100 may determine the coding unit of the center location, which has a different size, by using PIDs of the coding units. However, the PIDs and the size or location of the coding unit of the predetermined location are not limited to the above-described examples, and various PIDs and various locations and sizes of coding units may be used.

According to an embodiment, the image decoding apparatus 100 may use a predetermined data unit where a coding unit starts to be recursively split.

Figure 15:
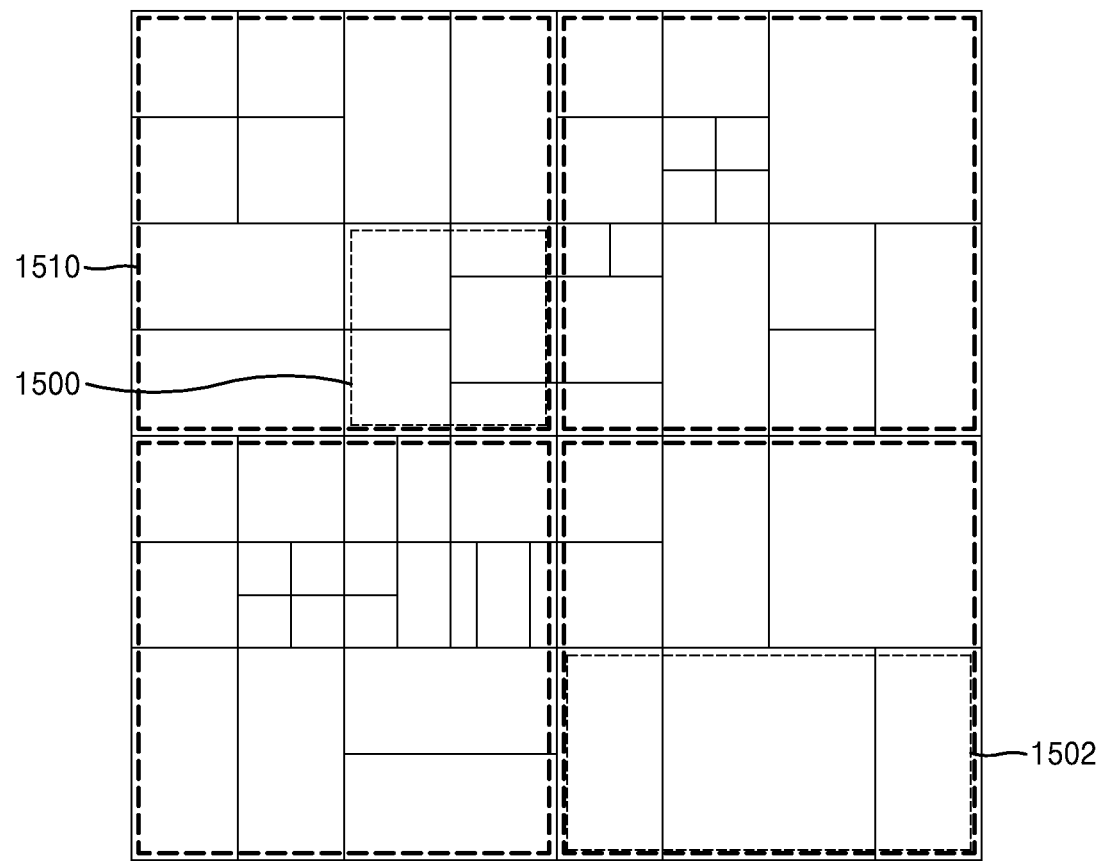
FIG. 15 illustrates that a plurality of coding units are determined based on a plurality of predetermined data units included in a picture, according to an embodiment.

FIG. 15 illustrates that a plurality of coding units are determined based on a plurality of predetermined data units included in a picture, according to an embodiment.

According to an embodiment, a predetermined data unit may be defined as a data unit where a coding unit starts to be recursively split by using split shape mode information. That is, the predetermined data unit may correspond to a coding unit of an uppermost depth, which is used to determine a plurality of coding units split from a current picture. In the following descriptions, for convenience of explanation, the predetermined data unit is referred to as a reference data unit.

According to an embodiment, the reference data unit may have a predetermined size and a predetermined shape. According to an embodiment, a reference coding unit may include M×N samples. Herein, M and N may be equal to each other, and may be integers expressed as powers of 2. That is, the reference data unit may have a square or non-square shape, and may be split into an integer number of coding units.

According to an embodiment, the image decoding apparatus 100 may split the current picture into a plurality of reference data units. According to an embodiment, the image decoding apparatus 100 may split the plurality of reference data units, which are split from the current picture, by using the split shape mode information of each reference data unit. The operation of splitting the reference data unit may correspond to a splitting operation using a quadtree structure.

According to an embodiment, the image decoding apparatus 100 may previously determine the minimum size allowed for the reference data units included in the current picture. Accordingly, the image decoding apparatus 100 may determine various reference data units having sizes equal to or greater than the minimum size, and may determine one or more coding units by using the split shape mode information with reference to the determined reference data unit.

Referring to FIG. 15, the image decoding apparatus 100 may use a square reference coding unit 1500 or a non-square reference coding unit 1502. According to an embodiment, the shape and size of reference coding units may be determined based on various data units capable of including one or more reference coding units (e.g., sequences, pictures, slices, slice segments, tiles, tile groups, largest coding units, or the like).

According to an embodiment, the receiver 110 of the image decoding apparatus 100 may obtain, from a bitstream, at least one of reference coding unit shape information and reference coding unit size information with respect to each of the various data units. An operation of splitting the square reference coding unit 1500 into one or more coding units has been described above in relation to the operation of splitting the current coding unit 300 of FIG. 3, and an operation of splitting the non-square reference coding unit 1502 into one or more coding units has been described above in relation to the operation of splitting the current coding unit 400 or 450 of FIG. 4. Thus, detailed descriptions thereof will not be provided herein.

According to an embodiment, the image decoding apparatus 100 may use a PID for identifying the size and shape of reference coding units, to determine the size and shape of reference coding units according to some data units previously determined based on a predetermined condition. That is, the receiver 110 may obtain, from the bitstream, only the PID for identifying the size and shape of reference coding units with respect to each slice, slice segment, tile, tile group, or largest coding unit which is a data unit satisfying a predetermined condition (e.g., a data unit having a size equal to or smaller than a slice) among the various data units (e.g., sequences, pictures, slices, slice segments, tiles, tile groups, largest coding units, or the like). The image decoding apparatus 100 may determine the size and shape of reference data units with respect to each data unit, which satisfies the predetermined condition, by using the PID. When the reference coding unit shape information and the reference coding unit size information are obtained and used from the bitstream according to each data unit having a relatively small size, efficiency of using the bitstream may not be high, and therefore, only the PID may be obtained and used instead of directly obtaining the reference coding unit shape information and the reference coding unit size information. In this case, at least one of the size and shape of reference coding units corresponding to the PID for identifying the size and shape of reference coding units may be previously determined. That is, the image decoding apparatus 100 may determine at least one of the size and shape of reference coding units included in a data unit serving as a unit for obtaining the PID, by selecting the previously determined at least one of the size and shape of reference coding units based on the PID.

According to an embodiment, the image decoding apparatus 100 may use one or more reference coding units included in a largest coding unit. That is, a largest coding unit split from a picture may include one or more reference coding units, and coding units may be determined by recursively splitting each reference coding unit. According to an embodiment, at least one of a width and height of the largest coding unit may be integer times at least one of the width and height of the reference coding units. According to an embodiment, the size of reference coding units may be obtained by splitting the largest coding unit n times based on a quadtree structure. That is, the image decoding apparatus 100 may determine the reference coding units by splitting the largest coding unit n times based on a quadtree structure, and may split the reference coding unit based on at least one of the block shape information and the split shape mode information according to various embodiments.

Figure 16:
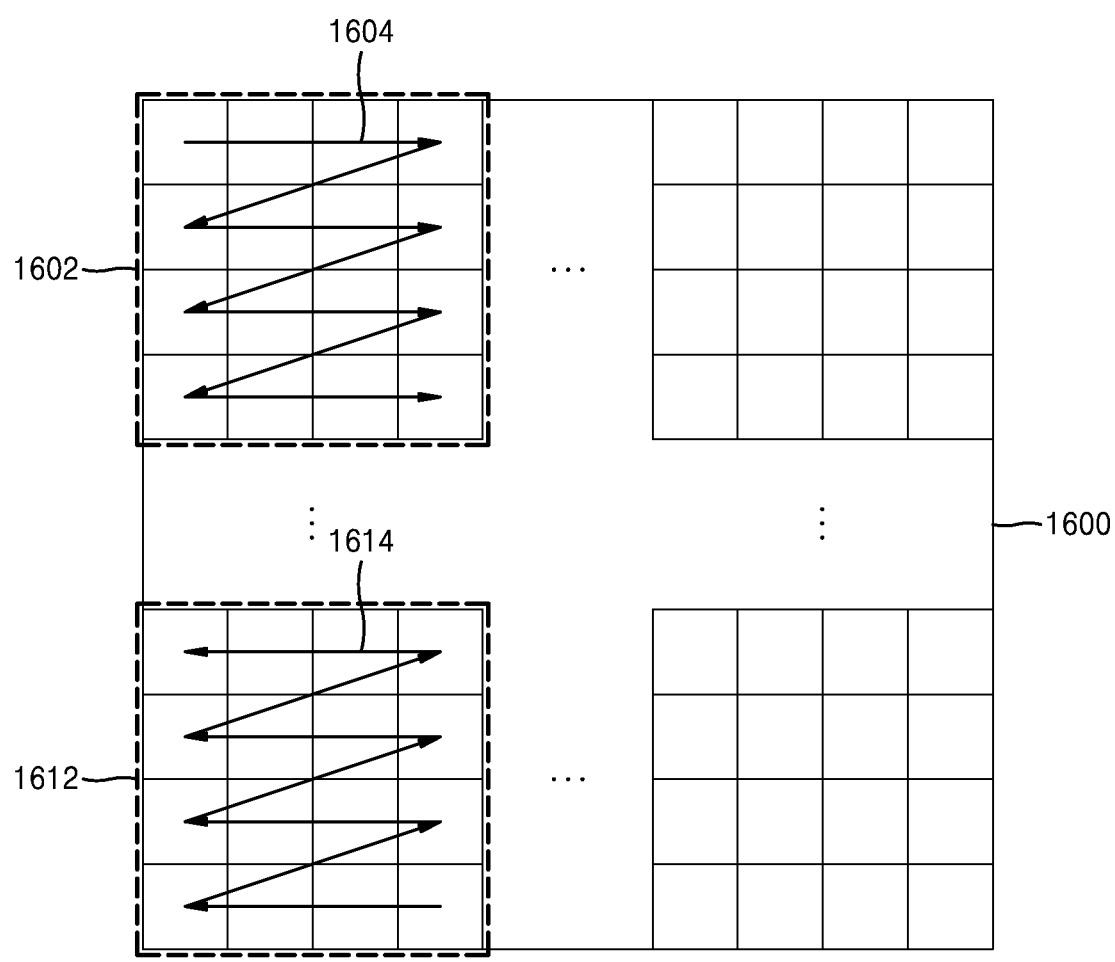
FIG. 16 illustrates a processing block serving as a unit for determining a determination order of reference coding units included in a picture, according to an embodiment.

FIG. 16 illustrates a processing block serving as a unit for determining a determination order of reference coding units included in a picture, according to an embodiment.

According to an embodiment, the image decoding apparatus 100 may determine one or more processing blocks split from a picture. The processing block is a data unit including one or more reference coding units split from a picture, and the one or more reference coding units included in the processing block may be determined according to a specific order. That is, a determination order of one or more reference coding units determined in each processing block may correspond to one of various types of orders for determining reference coding units, and may vary depending on the processing block. The determination order of reference coding units, which is determined with respect to each processing block, may be one of various orders, e.g., raster scan order, Z-scan, N-scan, up-right diagonal scan, horizontal scan, and vertical scan, but is not limited to the above-mentioned scan orders.

According to an embodiment, the image decoding apparatus 100 may obtain processing block size information and may determine the size of one or more processing blocks included in the picture. The image decoding apparatus 100 may obtain the processing block size information from a bitstream and may determine the size of one or more processing blocks included in the picture. The size of processing blocks may be a predetermined size of data units, which is indicated by the processing block size information.

According to an embodiment, the receiver 110 of the image decoding apparatus 100 may obtain the processing block size information from the bitstream according to each specific data unit. For example, the processing block size information may be obtained from the bitstream in a data unit such as an image, sequence, picture, slice, slice segment, tile, or tile group. That is, the receiver 110 may obtain the processing block size information from the bitstream according to each of the various data units, and the image decoding apparatus 100 may determine the size of one or more processing blocks, which are split from the picture, by using the obtained processing block size information. The size of the processing blocks may be integer times that of the reference coding units.

According to an embodiment, the image decoding apparatus 100 may determine the size of processing blocks 1602 and 1612 included in the picture 1600. For example, the image decoding apparatus 100 may determine the size of processing blocks based on the processing block size information obtained from the bitstream. Referring to FIG. 16, according to an embodiment, the image decoding apparatus 100 may determine a width of the processing blocks 1602 and 1612 to be four times the width of the reference coding units, and may determine a height of the processing blocks 1602 and 1612 to be four times the height of the reference coding units. The image decoding apparatus 100 may determine a determination order of one or more reference coding units in one or more processing blocks.

According to an embodiment, the image decoding apparatus 100 may determine the processing blocks 1602 and 1612, which are included in the picture 1600, based on the size of processing blocks, and may determine a determination order of one or more reference coding units in the processing blocks 1602 and 1612. According to an embodiment, determination of reference coding units may include determination of the size of the reference coding units.

According to an embodiment, the image decoding apparatus 100 may obtain, from the bitstream, determination order information of one or more reference coding units included in one or more processing blocks, and may determine a determination order with respect to one or more reference coding units based on the obtained determination order information. The determination order information may be defined as an order or direction for determining the reference coding units in the processing block. That is, the determination order of reference coding units may be independently determined with respect to each processing block.

According to an embodiment, the image decoding apparatus 100 may obtain, from the bitstream, the determination order information of reference coding units according to each specific data unit. For example, the receiver 110 may obtain the determination order information of reference coding units from the bitstream according to each data unit such as an image, sequence, picture, slice, slice segment, tile, tile group, or processing block. Because the determination order information of reference coding units indicates an order for determining reference coding units in a processing block, the determination order information may be obtained with respect to each specific data unit including an integer number of processing blocks.

According to an embodiment, the image decoding apparatus 100 may determine one or more reference coding units based on the determined determination order.

According to an embodiment, the receiver 110 may obtain the determination order information of reference coding units from the bitstream as information related to the processing blocks 1602 and 1612, and the image decoding apparatus 100 may determine a determination order of one or more reference coding units included in the processing blocks 1602 and 1612 and determine one or more reference coding units, which are included in the picture 1600, based on the determination order. Referring to FIG. 16, the image decoding apparatus 100 may determine determination orders 1604 and 1614 of one or more reference coding units in the processing blocks 1602 and 1612, respectively. For example, when the determination order information of reference coding units is obtained with respect to each processing block, different types of the determination order information of reference coding units may be obtained for the processing blocks 1602 and 1612. When the determination order 1604 of reference coding units in the processing block 1602 is a raster scan order, reference coding units included in the processing block 1602 may be determined according to a raster scan order. On the contrary, when the determination order 1614 of reference coding units in the other processing block 1612 is a backward raster scan order, reference coding units included in the processing block 1612 may be determined according to the backward raster scan order.

According to an embodiment, the image decoding apparatus 100 may decode the determined one or more reference coding units. The image decoding apparatus 100 may decode an image, based on the reference coding units determined as described above. A method of decoding the reference coding units may include various image decoding methods.

According to an embodiment, the image decoding apparatus 100 may obtain block shape information indicating the shape of a current coding unit or split shape mode information indicating a splitting method of the current coding unit, from the bitstream, and may use the obtained information. The split shape mode information may be included in the bitstream related to various data units. For example, the image decoding apparatus 100 may use the split shape mode information included in a sequence parameter set, a picture parameter set, a video parameter set, a slice header, a slice segment header, a tile header, or a tile group header. Furthermore, the image decoding apparatus 100 may obtain, from the bitstream, a syntax element corresponding to the block shape information or the split shape mode information according to each largest coding unit, each reference coding unit, or each processing block, and may use the obtained syntax element.

Hereinafter, a method of determining a split rule, according to an embodiment of the disclosure will be described in detail.

The image decoding apparatus 100 may determine a split rule of an image. The split rule may be predetermined between the image decoding apparatus 100 and the image encoding apparatus 2200. The image decoding apparatus 100 may determine the split rule of the image, based on information obtained from a bitstream. The image decoding apparatus 100 may determine the split rule based on the information obtained from at least one of a sequence parameter set, a picture parameter set, a video parameter set, a slice header, a slice segment header, a tile header, and a tile group header. The image decoding apparatus 100 may determine the split rule differently according to frames, slices, tiles, temporal layers, largest coding units, or coding units.

The image decoding apparatus 100 may determine the split rule based on a block shape of a coding unit. The block shape may include a size, shape, a ratio of width and height, and a direction of the coding unit. The image encoding apparatus 2200 and the image decoding apparatus 100 may pre-determine to determine the split rule based on the block shape of the coding unit. However, the embodiment is not limited thereto. The image decoding apparatus 100 may determine the split rule based on the information obtained from the bitstream received from the image encoding apparatus 2200.

The shape of the coding unit may include a square and a non-square. When the lengths of the width and height of the coding unit are the same, the image decoding apparatus 100 may determine the shape of the coding unit to be a square. Also, when the lengths of the width and height of the coding unit are not the same, the image decoding apparatus 100 may determine the shape of the coding unit to be a non-square.

The size of the coding unit may include various sizes, such as 4×4, 8×4, 4×8, 8×8, 16×4, 16×8, and 256×256. The size of the coding unit may be classified based on the length of a long side of the coding unit, the length of a short side, or the area. The image decoding apparatus 100 may apply the same split rule to coding units classified as the same group. For example, the image decoding apparatus 100 may classify coding units having the same lengths of the long sides as having the same size. Also, the image decoding apparatus 100 may apply the same split rule to coding units having the same lengths of long sides.

The ratio of the width and height of the coding unit may include 1:2, 2:1, 1:4, 4:1, 1:8, 8:1, 1:16, 16:1, 32:1, 1:32, or the like. Also, a direction of the coding unit may include a horizontal direction and a vertical direction. The horizontal direction may indicate a case in which the length of the width of the coding unit is longer than the length of the height thereof. The vertical direction may indicate a case in which the length of the width of the coding unit is shorter than the length of the height thereof.

The image decoding apparatus 100 may adaptively determine the split rule based on the size of the coding unit. The image decoding apparatus 100 may differently determine an allowable split shape mode based on the size of the coding unit. For example, the image decoding apparatus 100 may determine whether splitting is allowed based on the size of the coding unit. The image decoding apparatus 100 may determine a split direction according to the size of the coding unit. The image decoding apparatus 100 may determine an allowable split type according to the size of the coding unit.

The split rule determined based on the size of the coding unit may be a split rule predetermined between the image encoding apparatus 2200 and the image decoding apparatus 100. Also, the image decoding apparatus 100 may determine the split rule based on the information obtained from the bitstream.

The image decoding apparatus 100 may adaptively determine the split rule based on a location of the coding unit. The image decoding apparatus 100 may adaptively determine the split rule based on the location of the coding unit in the image.

Also, the image decoding apparatus 100 may determine the split rule such that coding units generated via different splitting paths do not have the same block shape. However, an embodiment is not limited thereto, and the coding units generated via different splitting paths have the same block shape. The coding units generated via the different splitting paths may have different decoding processing orders. Because the decoding processing orders are described above with reference to FIG. 12, details thereof are not provided again.

Hereinafter, a method and apparatus for encoding or decoding a video, according to an embodiment of the present specification, will now be described with reference to FIGS. 17 to 20, the method and apparatus involving determining whether a motion vector of an adjacent block at a location corresponding to one MVR among a plurality of MVRs is available, when the motion vector of the adjacent block corresponding to the one MVR is available, obtaining the motion vector of the adjacent block as a motion vector predictor of a current block, when the motion vector of the adjacent block corresponding to the one MVR is unavailable, obtaining a default motion vector for the one MVR by using a motion vector of one of two adjacent blocks of the current block and obtaining the default motion vector as a motion vector predictor of the current block, and performing prediction on the current block based on the motion vector predictor of the current block.

Figure 17:
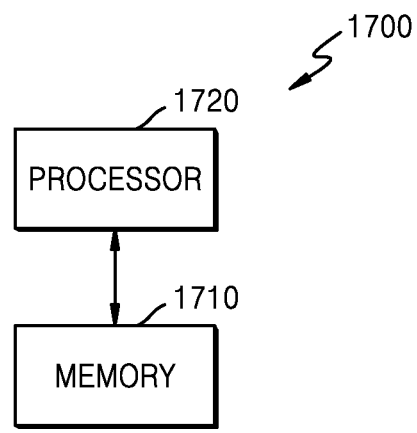
FIG. 17 is a block diagram of a video encoding apparatus according to an embodiment.

FIG. 17 is a block diagram of a video encoding apparatus according to an embodiment.

A video encoding apparatus 1700 according to an embodiment may include a memory 1710, and at least one processor 1720 connected to the memory 1710. Operations of the video encoding apparatus 1700 according to an embodiment may be performed by individual processors or under a control by a central processor. Also, the memory 1710 of the video encoding device 1700 may store data received from the outside and data generated by a processor, for example, a motion vector of an adjacent block corresponding to one MVR among a plurality of MVRs, a default motion vector, a motion vector predictor of a current block, etc.

The processor 1720 of the video encoding apparatus 1700 may determine whether a motion vector of an adjacent block at a location corresponding to one MVR among a plurality of MVRs is available, when the motion vector of the adjacent block corresponding to the one MVR is available, obtain the motion vector of the adjacent block as a motion vector predictor of a current block, when the motion vector of the adjacent block corresponding to the one MVR is unavailable, obtain a default motion vector for the one MVR by using a motion vector of one of two adjacent blocks of the current block and obtain the default motion vector as a motion vector predictor of the current block, and perform prediction on the current block based on the motion vector predictor of the current block.

Hereinafter, detailed operations of a video encoding method, according to an embodiment, will now be described with reference to FIG. 18, in which the video encoding apparatus 1700 determines whether a motion vector of an adjacent block at a location corresponding to one MVR among a plurality of MVRs is available, when the motion vector of the adjacent block corresponding to the one MVR is available, obtains the motion vector of the adjacent block as a motion vector predictor of a current block, when the motion vector of the adjacent block corresponding to the one MVR is unavailable, obtains a default motion vector for the one MVR by using a motion vector of one of two adjacent blocks of the current block and obtains the default motion vector as a motion vector predictor of the current block, and performs prediction on the current block based on the motion vector predictor of the current block.

Figure 18:
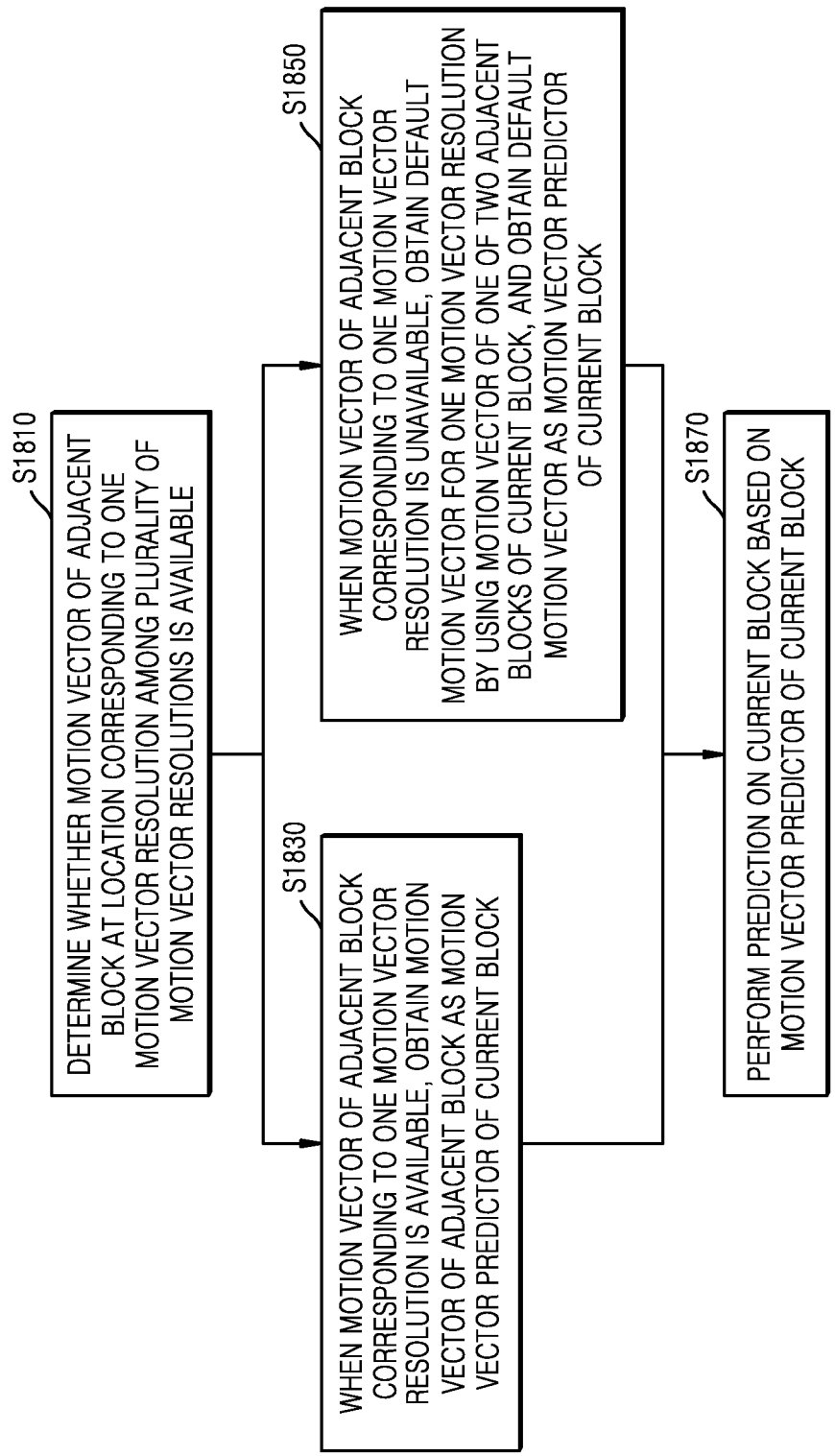
FIG. 18 is a flowchart illustrating a video encoding method according to an embodiment.

FIG. 18 is a flowchart illustrating a video encoding method according to an embodiment.

Referring to FIG. 18, in operation S1810, the video encoding apparatus 1700 may identify an adjacent block of a current block at a location corresponding to one of a plurality of MVRs, and may determine whether a motion vector of the identified adjacent block is available. The video encoding apparatus 1700 may perform encoding based on an adaptive MVR scheme that supports the plurality of MVRs (e.g., a ¼-pixel unit resolution, a ½-pixel unit resolution, a 1-pixel unit resolution, a 2-pixel unit resolution, and a 4-pixel unit resolution). The one of the plurality of MVRs may be one of the plurality of MVRs that is applied to the adjacent block.

According to an embodiment, locations of adjacent blocks corresponding to the plurality of MVRs may be determined based on the availability of adjacent motion information of the current block.

According to an embodiment, whether to use a motion vector predictor based on the adjacent block corresponding to the MVR among the plurality of MVRs may be determined by calculating a sum of transform difference (SATD) or a rate-distortion optimization (RDO), so that information about whether to use the motion vector predictor based on the adjacent block corresponding to the MVR among the plurality of MVRs may be encoded and signaled.

In operation S1830, when the motion vector of the adjacent block corresponding to the one MVR is available, the video encoding apparatus 1700 may obtain the motion vector of the adjacent block as a motion vector predictor of the current block.

In operation S1850, when the motion vector of the adjacent block corresponding to the one MVR is unavailable, the video encoding apparatus 1700 may obtain a default motion vector for the one MVR by using a motion vector of one of two adjacent blocks of the current block and obtain the default motion vector as a motion vector predictor of the current block.

According to an embodiment, the two adjacent blocks may include a first adjacent block and a second adjacent block, and locations of the first adjacent block and the second adjacent block may be determined based on the availability of adjacent motion information of the current block.

According to an embodiment, when the motion vector of the first adjacent block is available and reference indexes of the first adjacent block and the current block are the same, the motion vector of the first adjacent block may be obtained as the default motion vector. When the default motion vector is not obtained, the motion vector of the second adjacent block is available, and reference indexes of the second adjacent block and the current block are the same, the motion vector of the second adjacent block may be obtained as the default motion vector. When the default motion vector is not obtained, the motion vector of the first adjacent block is available, and the reference indexes of the first adjacent block and the current block are not the same, the motion vector of the first adjacent block may be obtained as the default motion vector. When the default motion vector is not obtained, the motion vector of the second adjacent block is available, and the reference indexes of the second adjacent block and the current block are not the same, the motion vector of the second adjacent block may be obtained as the default motion vector.

According to an embodiment, when motion information of both left and right adjacent blocks of the current block is unavailable or when motion information of the left adjacent block of the current block is available, the adjacent blocks corresponding to the plurality of MVRs may include an upper left adjacent block, a left adjacent block, a lower left adjacent block, an upper adjacent block, and an upper right adjacent block, the first adjacent block may be the left adjacent block, and the second adjacent block may be the upper adjacent block.

According to an embodiment, when motion information of both left and right adjacent blocks of the current block is unavailable or when motion information of the left adjacent block of the current block is available, an adjacent block corresponding a ¼-pixel unit resolution among the plurality of MVRs may be a left adjacent block, an adjacent block corresponding to a ½-pixel unit resolution among the plurality of MVRs is an upper adjacent block, an adjacent block corresponding to a 1-pixel unit resolution among the plurality of MVRs may be an upper right adjacent block, an adjacent block corresponding to a 2-pixel unit resolution among the plurality of MVRs may be a lower left adjacent block, and an adjacent block corresponding to a 4-pixel unit resolution among the plurality of MVRs may be an upper left adjacent block.

According to an embodiment, when motion information of both left and right adjacent blocks of the current block is available, the adjacent blocks corresponding to the plurality of MVRs may include an upper left adjacent block, a left adjacent block, an upper adjacent block, an upper right adjacent block, and a right adjacent block, the first adjacent block may be the left adjacent block, and the second adjacent block may be the right adjacent block.

According to an embodiment, when motion information of both left and right adjacent blocks of the current block is available, an adjacent block corresponding to a ¼-pixel unit resolution among the plurality of MVRs may be a left adjacent block, an adjacent block corresponding to a ½-pixel unit resolution among the plurality of MVRs may be a right adjacent block, an adjacent block corresponding to a 1-pixel unit resolution among the plurality of MVRs may be an upper adjacent block, an adjacent block corresponding to a 2-pixel unit resolution among the plurality of MVRs may be an upper right adjacent block, and an adjacent block corresponding to a 4-pixel unit resolution among the plurality of MVRs may be an upper left adjacent block.

According to an embodiment, when the right motion information of the current block is available, the adjacent block corresponding to the plurality of MVRs may include an upper left adjacent block, an upper adjacent block, an upper right adjacent block, a right adjacent block, and a lower right adjacent block, the first adjacent block may be the right adjacent block, and the second adjacent block may be the upper adjacent block.

According to an embodiment, when the right motion information of the current block is available, an adjacent block corresponding to a ¼-pixel unit resolution among the plurality of MVRs may be a right adjacent block, an adjacent block corresponding to a ½-pixel unit resolution among the plurality of MVRs may be an upper adjacent block, an adjacent block corresponding to a 1-pixel unit resolution among the plurality of MVRs may be an upper left adjacent block, an adjacent block corresponding to a 2-pixel unit resolution among the plurality of MVRs may be a lower right adjacent block, and an adjacent block corresponding to a 4-pixel unit resolution among the plurality of MVRs may be an upper right adjacent block.

A method of obtaining a motion vector of an adjacent block at a location corresponding to an MVR as a motion vector predictor of a current block and a method of obtaining a default motion vector for the one MVR when there is no motion vector of the adjacent block at the corresponding location, and obtaining the default motion vector as a motion vector predictor of the current block will be described below with reference to FIGS. 22 to 24B.

According to an embodiment, the video encoding method may further include, when motion vectors of the two adjacent blocks are unavailable, obtaining a default motion vector based on a history-based motion vector list including motion vectors of blocks encoded prior to the current block and obtaining the default motion vector as a motion vector predictor of the current block.

According to an embodiment, in a case where motion information of the two adjacent blocks is unavailable, when motion information stored in a history-based motion vector candidate list is available, a motion vector stored in the history-based motion vector candidate list may be obtained as a default motion vector. In detail, when a reference frame (or a reference index) of the motion vector in the history-based motion vector candidate list is the same as a reference frame (or a reference index) of the current block, the motion vector may be selected and obtained as a default motion vector, and even though the reference frame (or the reference index) of the motion vector in the history-based motion vector candidate list is not the same as the reference frame (or the reference index) of the current block, the motion vector may be selected and obtained as a default motion vector to end a default motion vector obtaining process. Also, using the history-based motion vector candidate list may be one option. That is, information about whether to use the history-based motion vector candidate list may be encoded and signaled.

A method of obtaining motion information by using a history-based motion vector list will be described below with reference to FIG. 27.

According to an embodiment, the video encoding method may further include, when a motion vector in the history-based motion vector list is unavailable, obtaining a zero motion vector as a default motion vector and obtaining the default motion vector as a motion vector predictor of the current block.

According to an embodiment, the video encoding method may further include, when the history-based motion vector list is not used and the motion vectors of the two adjacent blocks are unavailable, obtaining a zero motion vector as a default motion vector and obtaining the default motion vector as a motion vector predictor of the current block.

According to an embodiment, when the motion vectors of the two adjacent blocks are unavailable, remaining adjacent blocks of the current block may be searched, and a default motion vector may be obtained by using motion vectors of the searched adjacent blocks.

In operation S1870, the video encoding apparatus 1700 may perform prediction on the current block based on the motion vector predictor of the current block.

According to an embodiment, in order to perform prediction on the current block, a motion vector difference between the motion vector predictor of the current block and an original motion vector of the current block may be encoded.

Figure 19:
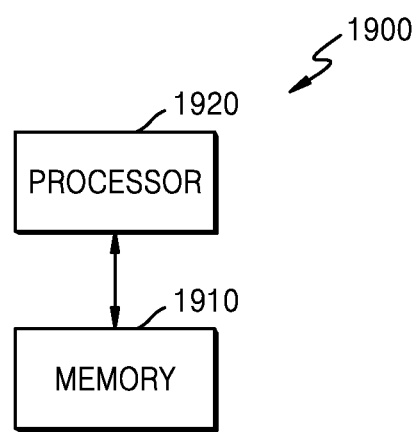
FIG. 19 illustrates a block diagram of a video decoding apparatus according to an embodiment.
Figure 20:
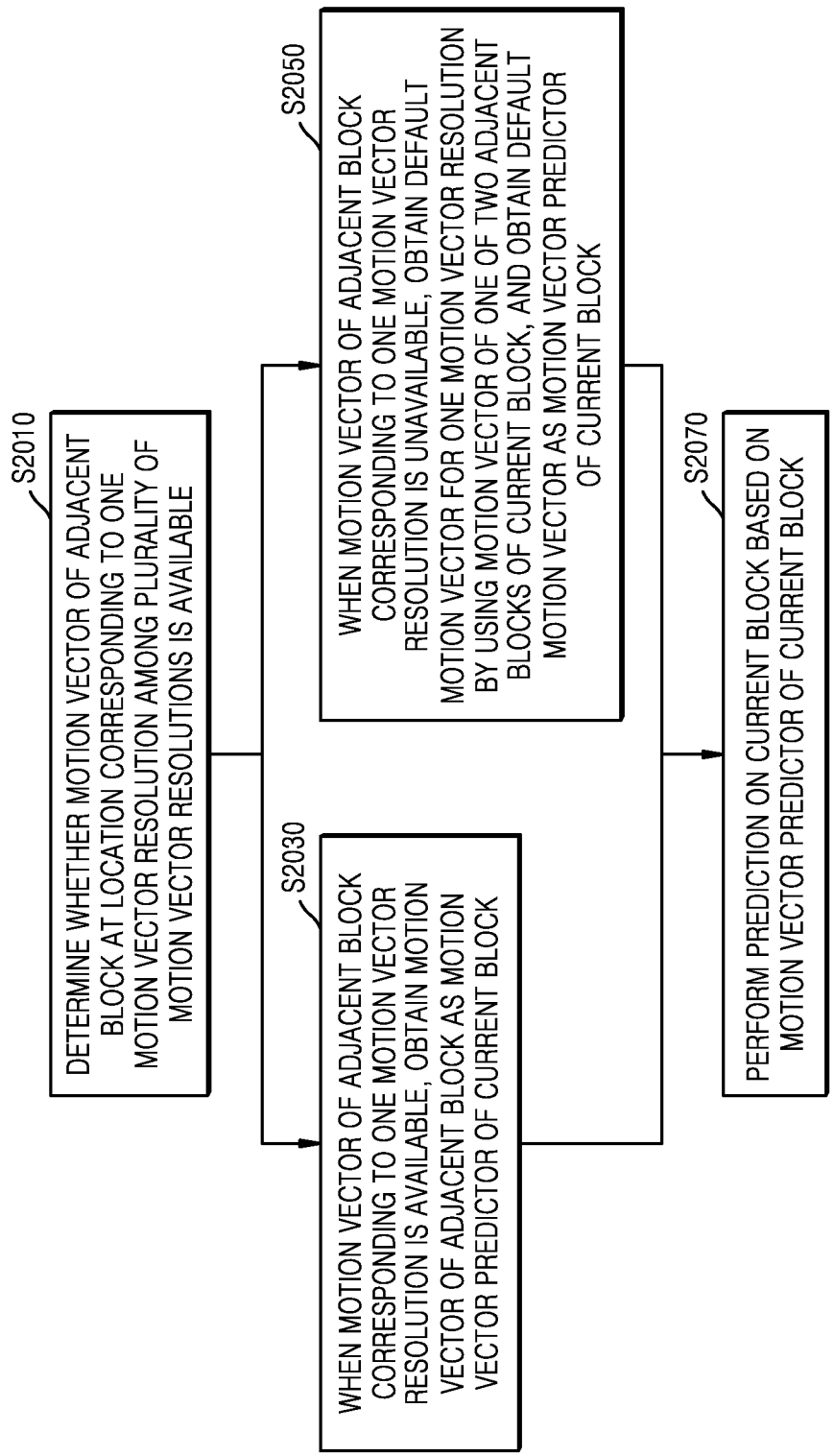
FIG. 20 illustrates a flowchart of a video decoding method according to an embodiment.

FIGS. 19 and 20 illustrate a block diagram of a video decoding apparatus according to an embodiment and a flowchart of a video decoding method according to an embodiment, respectively corresponding to the video encoding apparatus and the video encoding method described above.

FIG. 19 illustrates a block diagram of the video decoding apparatus according to an embodiment.

A video decoding apparatus 1900 according to an embodiment may include a memory 1910, and at least one processor 1920 connected to the memory 1910. Operations of the video decoding apparatus 1900 according to an embodiment may be performed by individual processors or under a control by a central processor. Also, the memory 1910 of the video decoding device 1900 may store data received from the outside and data generated by a processor, for example, a motion vector of an adjacent block corresponding to one MVR among a plurality of MVRs, a default motion vector, a motion vector predictor of a current block, etc.

The processor 1920 of the video decoding device 1900 may identify an adjacent block of a current block at a location corresponding to one of a plurality of MVRs, and may determine whether a motion vector of the identified adjacent block is available. When the motion vector of the adjacent block corresponding to the MVR is available, the processor 1920 may obtain the motion vector of the adjacent block as a motion vector predictor of a current block. When the motion vector of the adjacent block corresponding to the MVR is unavailable, the processor 1920 may obtain a default motion vector for the one MVR by using a motion vector of one of two adjacent blocks of the current block and obtain the default motion vector as a motion vector predictor of the current block. The processor 1920 may perform prediction on the current block based on the motion vector predictor of the current block.

Hereinafter, detailed operations of a video decoding method, according to an embodiment, will now be described with reference to FIG. 20, in which the video decoding apparatus 1900 determines whether a motion vector of an adjacent block at a location corresponding to one MVR among a plurality of MVRs is available, when the motion vector of the adjacent block corresponding to the one MVR is available, obtains the motion vector of the adjacent block as a motion vector predictor of a current block, when the motion vector of the adjacent block corresponding to the one MVR is unavailable, obtains a default motion vector for the one MVR by using a motion vector of one of two adjacent blocks of the current block and obtains the default motion vector as a motion vector predictor of the current block, and performs prediction on the current block based on the motion vector predictor of the current block.

FIG. 20 illustrates a flowchart of the video decoding method according to an embodiment.

Referring to FIG. 20, in operation S2010, the video decoding apparatus 1900 may determine whether a motion vector of an adjacent block at a location corresponding to one MVR among a plurality of MVRs is available.

According to an embodiment, locations of adjacent blocks corresponding to the plurality of MVRs may be determined based on the availability of adjacent motion information of the current block.

According to an embodiment, whether to use a motion vector predictor based on the adjacent block corresponding to the MVR among the plurality of MVRs may be determined based on information obtained from a bitstream.

In operation S2030, when the motion vector of the adjacent block corresponding to the one MVR is available, the video decoding apparatus 1900 may obtain the motion vector of the adjacent block as a motion vector predictor of the current block.

In operation S2050, when the motion vector of the adjacent block corresponding to the one MVR is unavailable, the video decoding apparatus 1900 may obtain a default motion vector for the one MVR by using a motion vector of one of two adjacent blocks of the current block and obtain the default motion vector as a motion vector predictor of the current block.

According to an embodiment, the two adjacent blocks may include a first adjacent block and a second adjacent block, locations of the first adjacent block and the second adjacent block may be determined based on the availability of the adjacent motion information of the current block, and when a motion vector of the first adjacent block is available and reference indexes of the first adjacent block and the current block are the same, the motion vector of the first adjacent block may be obtained as the default motion vector. When the default motion vector is not obtained, the motion vector of the second adjacent block is available, and reference indexes of the second adjacent block and the current block are the same, the motion vector of the second adjacent block may be obtained as the default motion vector. When the default motion vector is not obtained, the motion vector of the first adjacent block is available, and the reference indexes of the first adjacent block and the current block are not the same, the motion vector of the first adjacent block may be obtained as the default motion vector. When the default motion vector is not obtained, the motion vector of the second adjacent block is available, and the reference indexes of the second adjacent block and the current block are not the same, the motion vector of the second adjacent block may be obtained as the default motion vector.

According to an embodiment, when motion information of both left and right adjacent blocks of the current block is unavailable or when motion information of the left adjacent block of the current block is available, the adjacent blocks corresponding to the plurality of MVRs may include an upper left adjacent block, a left adjacent block, a lower left adjacent block, an upper adjacent block, and an upper right adjacent block, the first adjacent block may be the left adjacent block, and the second adjacent block may be the upper adjacent block.

According to an embodiment, when motion information of both left and right adjacent blocks of the current block is unavailable or when motion information of the left adjacent block of the current block is available, an adjacent block corresponding a ¼-pixel unit resolution among the plurality of MVRs may be a left adjacent block, an adjacent block corresponding to a ½-pixel unit resolution among the plurality of MVRs is an upper adjacent block, an adjacent block corresponding to a 1-pixel unit resolution among the plurality of MVRs may be an upper right adjacent block, an adjacent block corresponding to a 2-pixel unit resolution among the plurality of MVRs may be a lower left adjacent block, and an adjacent block corresponding to a 4-pixel unit resolution among the plurality of MVRs may be an upper left adjacent block.

According to an embodiment, when motion information of both left and right adjacent blocks of the current block is available, the adjacent blocks corresponding to the plurality of MVRs may include an upper left adjacent block, a left adjacent block, an upper adjacent block, an upper right adjacent block, and a right adjacent block, the first adjacent block may be the left adjacent block, and the second adjacent block may be the right adjacent block.

According to an embodiment, when motion information of both left and right adjacent blocks of the current block is available, an adjacent block corresponding to a ¼-pixel unit resolution among the plurality of MVRs may be a left adjacent block, an adjacent block corresponding to a ½-pixel unit resolution among the plurality of MVRs may be a right adjacent block, an adjacent block corresponding to a 1-pixel unit resolution among the plurality of MVRs may be an upper adjacent block, an adjacent block corresponding to a 2-pixel unit resolution among the plurality of MVRs may be an upper right adjacent block, and an adjacent block corresponding to a 4-pixel unit resolution among the plurality of MVRs may be an upper left adjacent block.

According to an embodiment, when the right motion information of the current block is available, the adjacent block corresponding to the plurality of MVRs may include an upper left adjacent block, an upper adjacent block, an upper right adjacent block, a right adjacent block, and a lower right adjacent block, the first adjacent block may be the right adjacent block, and the second adjacent block may be the upper adjacent block.

According to an embodiment, when the right motion information of the current block is available, an adjacent block corresponding to a ¼-pixel unit resolution among the plurality of MVRs may be a right adjacent block, an adjacent block corresponding to a ½-pixel unit resolution among the plurality of MVRs may be an upper adjacent block, an adjacent block corresponding to a 1-pixel unit resolution among the plurality of MVRs may be an upper left adjacent block, an adjacent block corresponding to a 2-pixel unit resolution among the plurality of MVRs may be a lower right adjacent block, and an adjacent block corresponding to a 4-pixel unit resolution among the plurality of MVRs may be an upper right adjacent block.

According to an embodiment, the video encoding method may further include, when motion vectors of the two adjacent blocks are unavailable, obtaining a default motion vector based on a history-based motion vector list including motion vectors of blocks decoded prior to the current block and obtaining the default motion vector as a motion vector predictor of the current block. Also, whether to use the history-based motion vector list may be determined based on information about whether to use a history-based motion vector obtained from a bitstream.

According to an embodiment, the video encoding method may further include, when the information about whether to use the history-based motion vector indicates that the history-based motion vector list is used, and a motion vector in the history-based motion vector list is unavailable, obtaining a zero motion vector as a default motion vector and obtaining the default motion vector as a motion vector predictor of the current block.

According to an embodiment, the video encoding method may further include, when the information about whether to use the history-based motion vector indicates that the history-based motion vector list is not used, and the motion vectors of the two adjacent blocks are unavailable, obtaining a zero motion vector as a default motion vector and obtaining the default motion vector as a motion vector predictor of the current block.

According to an embodiment, when the motion vectors of the two adjacent blocks are unavailable, remaining adjacent blocks of the current block may be searched, and a default motion vector may be obtained by using motion vectors of the searched adjacent blocks.

In operation S2070, the video decoding apparatus 1900 may perform prediction on the current block based on the motion vector predictor of the current block.

According to an embodiment, a motion vector difference of the current block may be obtained, and a motion vector of the current block may be reconstructed based on the motion vector predictor of the current block and the motion vector difference of the current block.

Figure 21:
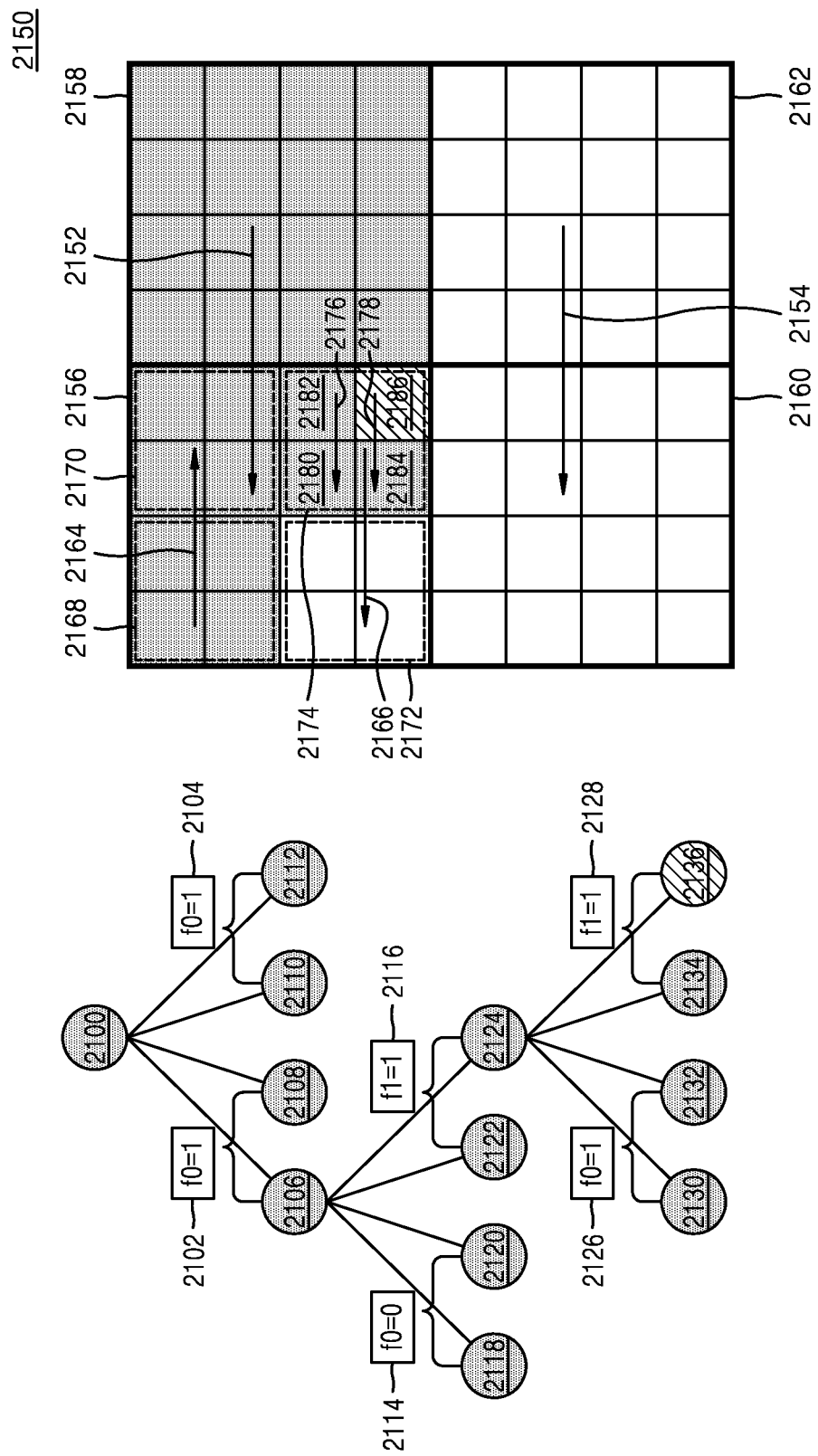
FIG. 21 is a diagram for describing a coding order of a largest coding unit and coding units included in the largest coding unit.

FIG. 21 is a diagram for describing a coding order of a largest coding unit and coding units included in the largest coding unit.

A largest coding unit 2150 is split into a plurality of first coding units 2156, 2158, 2160, and 2162. Each of the plurality of first coding units 2156, 2158, 2160, and 2162 may be split into smaller coding units. For example, the first coding unit 2156 is split into a plurality of second coding units 2168, 2170, 2172, and 2174. The plurality of second coding units 2168, 2170, 2172, and 2174 may be split into smaller coding units. For example, the second coding unit 2174 is split into a plurality of third coding units 2180, 2182, 2184, and 2186. The largest coding unit 2150 corresponds to an uppermost node (e.g., a root node) 2100 of a tree structure. In addition, the plurality of first, second, and third coding units 2156, 2158, 2160, 2162, 2168, 2170, 2172, 2174, 2180, 2182, 2184, and 2186 correspond to a plurality of nodes 2106, 2108, 2110, 2112, 2118, 2120, 2122, 2124, 2130, 2132, 2134, and 2136, respectively. Specifically, the plurality of first coding units 2156, 2158, and 2160, 2162 may correspond to parent nodes 2106, 2108, 2110, 2112 of the tree structure, the plurality of second coding units 2168, 2170, 2172, and 2174 may correspond to child nodes 2118, 2120, 2122, 2124 of the tree structure, and the plurality of third coding units 2180, 2182, 2184, and 2186 may correspond to grandchild nodes 2130, 2132, 2134, and 2136 of the tree structure. In the tree structure, upper coding order flags 2102, 2114, and 2126 indicating a coding order correspond to arrows 2152, 2164, and 2176, and lower coding order flags 2104, 2116, and 2128 may correspond to arrows 2154, 2166, and 2178.

An upper coding order flag indicates a coding order of two coding units at an upper location among four coding units split from one coding unit. When the upper coding order flag is 0, coding is performed in a forward direction (e.g., a right direction). In contrast, when the upper coding order flag is 1, coding is performed in an inverse direction (e.g., a left direction).

Similarly, a lower coding order flag indicates a coding order of two coding units at a lower location among four coding units split from one coding unit. When the lower coding order flag is 0, coding is performed in the forward direction. In contrast, when the lower coding order flag is 1, coding is performed in the inverse direction.

For example, because the upper coding order flag 2114 is 0, a coding order between the coding units 2168 and 2170 is determined in a direction from left to right, which is the forward direction. Also, because the lower coding order flag 2116 is 1, a coding order between the coding units 2172 and 2174 is determined in a direction from right to left, which is the inverse direction.

According to an embodiment, the upper coding order flag and the lower coding order flag may be set to have the same value. For example, when the upper coding order flag 2102 is determined to be 1, the lower coding order flag 2104 corresponding to the upper coding order flag 2102 may be determined to be 1. Because values of the upper coding order flag and the lower coding order flag are determined to be 1 bit, the amount of information in coding order information is reduced.

According to an embodiment, the upper coding order flag and the lower coding order flag of the current coding unit may be determined by referring to at least one of an upper coding order flag and a lower coding order flag applied to a coding unit greater than the current coding unit. For example, the upper coding order flag 2126 and the lower coding order flag 2128 applied to the coding units 2180, 2182, 2184, and 2186 may be determined based on the lower coding order flag 2116 applied to the coding units 2172 and 2174. Accordingly, the upper coding order flag 2126 and the lower coding order flag 2128 may be determined to have the same value as the lower coding order flag 2116. Because the values of the upper coding order flag and the lower coding order flag are determined from an upper coding unit, the coding order information is not obtained from a bitstream. Accordingly, the amount of information in the coding order information is reduced.

According to an embodiment, whether a coding order flag for a block is obtained may be determined according to a size or a depth of a block. For example, a coding order flag may be obtained only for a block having a predetermined size, and a coding order flag may not be obtained for blocks having different sizes. When the current block is greater than the block having a predetermined size, the coding order may be determined in the forward direction without obtaining the coding order flag. When the current block is smaller than the block having a predetermined size, the coding order may be determined according to an upper block of the current block without obtaining the coding order flag. A size of a block for which the coding order flag is obtained may be arbitrarily determined. For example, the size of the block for which the coding order flag is obtained may be determined as 16×16 and 32×32.

A location of an adjacent block available in the current block may vary according to the coding order described above in FIG. 21. Locations of currently available left and right adjacent blocks may be classified through an availability check. In detail, when adjacent blocks of the current block are not encoded or decoded, it may be determined that the adjacent blocks are unavailable. When the adjacent block of the current block is located outside a boundary of a tile including the current block, that is, when the adjacent block is included in the tile including the current block and another tile, it may be determined that the adjacent block included in the other tile is unavailable. Also, even when the adjacent block is located outside a boundary of a picture including the current block, it may be determined that the adjacent block is unavailable. When all conditions in which the adjacent block is unavailable are not met, it may be determined that the adjacent blocks are available. Also, information about the availability check of the currently available left and right adjacent blocks may be expressed as AvailLR, and L indicates the left, R indicates the right, and 0 or 1 indicates whether referencing is possible, so that a value of AvailLR may be classified into LR_10, LR_01, LR_11, and LR_00.

A method of obtaining a motion vector predictor by using a motion vector of an adjacent block at a location corresponding to one MVR among a plurality of MVRs is expressed as an adaptive motion vector resolution (AMVR). The AMVR may improve coding efficiency by transmitting motion information at various MVRs. Because the AMVR uses motion information of an adjacent block fixed at a predetermined location for each MVR, a motion vector predictor may be determined even though an MVR index indicating an MVR or a motion vector predictor index indicating a motion vector of an adjacent block is transmitted. Moreover, when there is no motion vector at the predetermined location, it is necessary to insert another reliable motion vector. To this end, a default motion vector may be obtained by identifying two adjacent blocks at a predetermined location. For example, in a case where the MVR is a 2-pixel unit resolution, when a motion vector of an adjacent block at a location corresponding to the 2-pixel unit resolution is unavailable, the default motion vector may be obtained by using motion vectors of the two adjacent blocks at the predetermined location, and the obtained default motion vector is a motion vector corresponding to the 2-pixel unit resolution (amvr_idx=3) and thus may be expressed as a value corresponding to the 2-pixel unit resolution.

Locations of adjacent blocks corresponding to a plurality of MVRs of the AMVR according to the availability of the adjacent blocks of the current block and a method of searching for another reliable motion vector when there is no motion vector in adjacent blocks will be described below with reference to FIGS. 22 to 24B.

Figure 22:
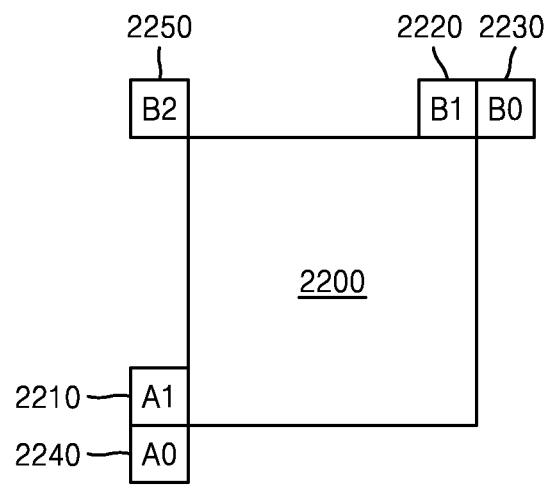
FIG. 22 is a diagram for describing locations of a plurality adjacent blocks corresponding to a plurality of motion vector resolutions (MVRs) and locations of two adjacent blocks used to obtain a default motion vector, when motion information of a left adjacent block and a right adjacent block of a current block is unavailable or when motion information of the left adjacent block of the current block is available, according to an embodiment.

FIG. 22 is a diagram for describing locations of a plurality adjacent blocks corresponding to a plurality of MVRs and locations of two adjacent blocks used to obtain a default motion vector, when motion information of a left adjacent block and a right adjacent block of a current block is unavailable or when motion information of the left adjacent block of the current block is available, according to an embodiment.

Referring to FIG. 22, when motion information of both a left adjacent block and a right adjacent block of a current block 2200 is unavailable (LR_00) or when motion information of a left adjacent block of the current block is available (LR_10), motion vectors of a left adjacent block A1 2210, an upper adjacent block B1 2220, an upper right adjacent block B0 2230, a lower left adjacent block A0 2240, and an upper left adjacent block B2 2250 of the current block 2200 may be used.

When a location of an upper left sample of the current block 2200 is (xCb, yCb), a right direction of xCb is a positive direction of an x-axis, a lower direction of yCb is a positive direction of a y-axis, and a width and a height of the current block 2200 are nCbW and nCbH, respectively, the left adjacent block A1 2210 is an adjacent block including a pixel located at (xCb−1, yCb+nCbH−1), the upper adjacent block B1 2220 is an adjacent block including a pixel located at (xCb+nCbW−1, yCb−1), the upper right adjacent block B0 2230 is an adjacent block including a pixel located at (xCb+nCbW, yCb−1), the lower left adjacent block A0 2240 is an adjacent block including a pixel located at (xCb−1, yCb+nCbH), and the upper right adjacent block B2 2250 is an adjacent block including a pixel located at (xCb−1, yCb−1).

When the plurality of MVRs include a ¼-pixel unit resolution, a ½-pixel unit resolution, a 1-pixel unit resolution, a 2-pixel unit resolution, and a 4-pixel unit resolution, in the case of the ¼-pixel unit resolution, the motion vector of the left adjacent block A1 2210 may be obtained as a motion vector predictor of the current block, in the case of the ½-pixel unit resolution, the motion vector of the upper adjacent block B1 2220 may be obtained as a motion vector predictor of the current block, in the case of the 1-pixel unit resolution, the motion vector of the upper right adjacent block B0 2230 may be obtained as a motion vector predictor of the current block, in the case of the 2-pixel unit resolution, the motion vector of the lower left adjacent block A0 2240 may be obtained as a motion vector predictor of the current block, and in the case of the 4-pixel unit resolution, the motion vector of the upper right adjacent block B2 2250 may be obtained as a motion vector predictor of the current block.

The plurality of MVRs may be expressed as MVR indexes. In detail, the MVR indexes may be expressed as amvr_idx, a value of amvr_idx for the ¼-pixel unit resolution may be 0, a value of amvr_idx for the ½-pixel unit resolution may be 1, a value of amvr_idx for the 1-pixel unit resolution may be 2, a value of amvr_idx for the 2-pixel unit resolution may be 3, and a value of amvr_idx for the 4-pixel unit resolution may be 4.

Also, when the MVR is ¼, a motion vector of an adjacent block corresponding to the ¼-pixel unit resolution is obtained as a motion vector predictor of the current block as it is, but in the cases of the ½-, 1-, 2-, and 4-pixel unit resolutions, a motion vector of an adjacent block corresponding to each pixel unit resolution, which is determined according to Equations 1 and 2 below, is obtained as a motion vector predictor of the current block.

$$mvpLX[0]=mvpLX[0]>=0?((mvpLX[0]+(1<<(amvr\_idx-1)))>>amvr\_idx)<<amvr\_idx: -(((-mvpLX[0]+(1<<(amvr\_idx-1)))>>amvr\_idx)<<amvr\_idx \quad \text{[Equation 1]}$$

$$mvpLX[1]=mvpLX[1]>=0?((mvpLX[1]+(1<<(amvr\_idx-1)))>>amvr\_idx)<<amvr\_idx: -(((-mvpLX[1]+(1<<(amvr\_idx-1)))>>amvr\_idx)<<amvr\_idx \quad \text{[Equation 2]}$$

In Equations 1 and 2, mvpLX[0] and mvpLX[1] are an x component and a y component of a motion vector predictor in a reference list of X (X is 0 or 1), respectively. The x component and the y component of the motion vector predictor are round according to the MVR.

A method of determining a motion vector according to a plurality of MVRs and a method of expressing a motion vector having a ¼-pixel unit resolution at different pixel unit resolutions will be described below with reference to FIGS. 25 and 26.

The availability of an adjacent block at a location corresponding to one MVR among the plurality of MVRs may be determined according to the following conditions. In detail, when the adjacent block of the current block is not encoded or decoded, it may be determined that the adjacent block is unavailable. When the adjacent block of the current block is located outside a boundary of a tile including the current block, that is, when the adjacent block is included in the tile including the current block and another tile, it may be determined that the adjacent block included in the other tile is unavailable. Also, even when the adjacent block is located outside a boundary of a picture including the current block, it may be determined that the adjacent block is unavailable. Even when the adjacent block is encoded or decoded in an intra mode or an intra block copy mode, it may be determined that the adjacent block is unavailable. When all conditions in which the adjacent block is unavailable are not met, it may be determined that the adjacent blocks are available. This also applies to the cases of FIGS. 23, 24A, and 24B which will be described below.

Moreover, when motion information of an adjacent block at a location corresponding to one MVR among the plurality of MVRs is unavailable, a motion vector for the one MVR may not be obtained as a motion vector predictor of the current block, and thus, it is necessary to obtain another motion vector as a motion vector predictor of the current block. In this case, a default motion vector may be obtained by using the motion vector of the left adjacent block A1 2210 or the upper adjacent block B1 2220 of the current block 2200. The obtained default motion vector may be round according to Equations 1 and 2 above based on the one MVR (amvr_idx) and may be obtained as a motion vector predictor of the current block.

In detail, as the first priority, when the motion vector of the left adjacent block A1 2210 is available and reference indexes of the left adjacent block A1 2210 and the current block 2200 are the same, the motion vector of the left adjacent block A1 2210 is obtained as the default motion vector. Otherwise, as the second priority, when the motion vector of the upper adjacent block B1 2220 is available and reference indexes of the upper adjacent block B1 2220 and the current block are the same, the motion vector of the upper adjacent block B1 2220 is obtained as the default motion vector. Otherwise, as the third priority, when the motion vector of the left adjacent block A1 2210 is available and the reference indexes of the left adjacent block A1 2210 and the current block are not the same, the motion vector of the left adjacent block A1 2210 is obtained as the default motion vector. Otherwise, as the fourth priority, when the motion vector of the upper adjacent block B1 2220 is available and the reference indexes of the upper adjacent block B1 2220 and the current block are not the same, the motion vector of the upper adjacent block B1 2220 is obtained as the default motion vector.

Moreover, when the reference indexes of the left adjacent block A1 2210 and the current block are not the same, the motion vector of the left adjacent block A1 2210 may be scaled according to a distance between a reference frame of the current block and a reference frame of the left adjacent block A1 2210, and the scaled motion vector may be obtained as a default motion vector.

Similarly, when the reference indexes of the upper adjacent block B1 2220 and the current block are not the same, the motion vector of the upper adjacent block B1 2220 may be scaled according to a distance between the reference frame of the current block and a reference frame of the upper adjacent block B1 2220, and the scaled motion vector may be obtained as a default motion vector.

Figure 23:
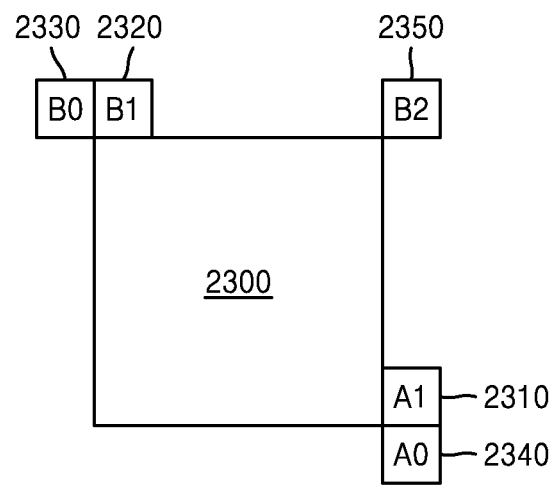
FIG. 23 is a diagram for describing locations of a plurality of adjacent blocks corresponding to a plurality of MVRs and locations of two adjacent blocks used to obtain a default motion vector, when motion information of a right adjacent block of a current block is available, according to an embodiment.

FIG. 23 is a diagram for describing locations of a plurality of adjacent blocks corresponding to a plurality of MVRs and locations of two adjacent blocks used to obtain a default motion vector, when motion information of a right adjacent block of a current block is available, according to an embodiment.

Referring to FIG. 23, when motion information of a right adjacent block of a current block 2300 is available (LR_01), motion vectors of a right adjacent block A1 2310, an upper adjacent block B1 2320, an upper left adjacent block B0 2330, a lower right adjacent block A0 2340, and an upper right adjacent block B2 2350 of the current block 2300 may be used.

When a location of an upper left sample of the current block 2300 is (xCb, yCb), a right direction of xCb is a positive direction of an x-axis, a lower direction of yCb is a positive direction of a y-axis, and a width and a height of the current block 2300 are nCbW and nCbH, respectively, the right adjacent block A1 2310 is an adjacent block including a pixel located at (xCb+nCbW, yCb+nCbH−1), the upper adjacent block B1 2320 is an adjacent block including a pixel located at (xCb, yCb−1), the upper left adjacent block B0 2330 is an adjacent block including a pixel located at (xCb−1, yCb−1), the lower right adjacent block A0 2340 is an adjacent block including a pixel located at (xCb+nCbW, yCb+nCbH), and the upper right adjacent block B2 2350 is an adjacent block including a pixel located at (xCb+nCbW, yCb−1).

When the plurality of MVRs include a ¼-pixel unit resolution, a ½-pixel unit resolution, a 1-pixel unit resolution, a 2-pixel unit resolution, and a 4-pixel unit resolution, in the case of the ¼-pixel unit resolution, the motion vector of the right adjacent block A1 2310 may be obtained as a motion vector predictor of the current block, in the case of the ½-pixel unit resolution, the motion vector of the upper adjacent block B1 2320 may be obtained as a motion vector predictor of the current block, in the case of the 1-pixel unit resolution, the motion vector of the upper left adjacent block B0 2330 may be obtained as a motion vector predictor of the current block, in the case of the 2-pixel unit resolution, the motion vector of the lower right adjacent block A0 2340 may be obtained as a motion vector predictor of the current block, and in the case of the 4-pixel unit resolution, the motion vector of the upper right adjacent block B2 2350 may be obtained as a motion vector predictor of the current block.

Also, as in FIG. 22, when the MVR is ¼, a motion vector of an adjacent block corresponding to the ¼-pixel unit resolution is obtained as a motion vector predictor of the current block as it is, but in the cases of the ½-, 1-, 2-, and 4-pixel unit resolutions, a motion vector of an adjacent block corresponding to each pixel unit resolution, which is determined according to Equations 1 and 2 above, is obtained as a motion vector predictor of the current block.

Moreover, when motion information of an adjacent block at a location corresponding to one MVR among the plurality of MVRs is unavailable, a motion vector for the one MVR may not be obtained as a motion vector predictor of the current block, and thus, it is necessary to obtain another motion vector as a motion vector predictor of the current block. In this case, a default motion vector may be obtained by using the motion vector of the right adjacent block A1 2310 or the upper adjacent block B1 2320 of the current block 2300. The obtained default motion vector may be round according to Equations 1 and 2 above based on the one MVR (amvr_idx) and may be obtained as a motion vector predictor of the current block.

In detail, as the first priority, when the motion vector of the right adjacent block A1 2310 is available and reference indexes of the right adjacent block A1 2310 and the current block 2300 are the same, the motion vector of the right adjacent block A1 2310 is obtained as the default motion vector. Otherwise, as the second priority, when the motion vector of the upper adjacent block B1 2320 is available and reference indexes of the upper adjacent block B1 2320 and the current block are the same, the motion vector of the upper adjacent block B1 2320 is obtained as the default motion vector. Otherwise, as the third priority, when the motion vector of the right adjacent block A1 2310 is available and the reference indexes of the right adjacent block A1 2310 and the current block are not the same, the motion vector of the right adjacent block A1 2310 is obtained as the default motion vector. Otherwise, as the fourth priority, when the motion vector of the upper adjacent block B1 2320 is available and the reference indexes of the upper adjacent block B1 2320 and the current block are not the same, the motion vector of the upper adjacent block B1 2320 is obtained as the default motion vector.

Moreover, when the reference indexes of the right adjacent block A1 2310 and the current block are not the same, the motion vector of the right adjacent block A1 2310 may be scaled according to a distance between a reference frame of the current block and a reference frame of the right adjacent block A1 2310, and the scaled motion vector may be obtained as a default motion vector.

Similarly, when the reference indexes of the upper adjacent block B1 2320 and the current block are not the same, the motion vector of the upper adjacent block B1 2320 may be scaled according to a distance between the reference frame of the current block and a reference frame of the upper adjacent block B1 2320, and the scaled motion vector may be obtained as a default motion vector.

Figure 24A:
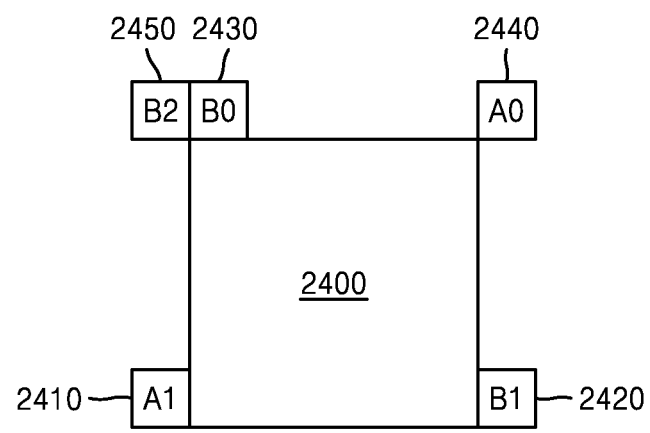
FIG. 24A is a diagram for describing locations of a plurality of adjacent blocks corresponding to a plurality of MVRs and locations of two adjacent blocks used to obtain a default motion vector, when motion information of a left adjacent block and a right adjacent block of a current block is available, according to an embodiment.

FIG. 24A is a diagram for describing locations of a plurality of adjacent blocks corresponding to a plurality of MVRs and locations of two adjacent blocks used to obtain a default motion vector, when motion information of a left adjacent block and a right adjacent block of a current block is available, according to an embodiment.

Referring to FIG. 24A, when motion information of a left adjacent block and a right adjacent block of a current block 2400 is available (LR_l1), motion vectors of a left adjacent block A1 2410, a right adjacent block B1 2420, an upper adjacent block B0 2430, an upper right adjacent block A0 2440, and an upper left adjacent block B2 2450 of the current block 2400 may be used.

When a location of an upper left sample of the current block 2400 is (xCb, yCb), a right direction of xCb is a positive direction of an x-axis, a lower direction of yCb is a positive direction of a y-axis, and a width and a height of the current block 2400 are nCbW and nCbH, respectively, the left adjacent block A1 2410 is an adjacent block including a pixel located at (xCb−1, yCb+nCbH−1), the right adjacent block B1 2420 is an adjacent block including a pixel located at (xCb+nCbW, yCb+nCbH−1), the upper adjacent block B0 2430 is an adjacent block including a pixel located at (xCb, yCb−1), the upper right adjacent block A0 2440 is an adjacent block including a pixel located at (xCb+nCbW, yCb−1), and the upper left adjacent block B2 2450 is an adjacent block including a pixel located at (xCb−1, yCb−1).

When the plurality of MVRs include a ¼-pixel unit resolution, a ½-pixel unit resolution, a 1-pixel unit resolution, a 2-pixel unit resolution, and a 4-pixel unit resolution, in the case of the ¼-pixel unit resolution, the motion vector of the left adjacent block A1 2410 may be obtained as a motion vector predictor of the current block, in the case of the ½-pixel unit resolution, the motion vector of the right adjacent block B1 2420 may be obtained as a motion vector predictor of the current block, in the case of the 1-pixel unit resolution, the motion vector of the upper adjacent block B0 2430 may be obtained as a motion vector predictor of the current block, in the case of the 2-pixel unit resolution, the motion vector of the upper right adjacent block A0 2440 may be obtained as a motion vector predictor of the current block, and in the case of the 4-pixel unit resolution, the motion vector of the upper left adjacent block B2 2450 may be obtained as a motion vector predictor of the current block.

Also, as in FIG. 22, when the MVR is ¼, a motion vector of an adjacent block corresponding to the ¼-pixel unit resolution is obtained as a motion vector predictor of the current block as it is, but in the cases of the ½-, 1-, 2-, and 4-pixel unit resolutions, a motion vector of an adjacent block corresponding to each pixel unit resolution, which is determined according to Equations 1 and 2 above, is obtained as a motion vector predictor of the current block.

Moreover, when motion information of an adjacent block at a location corresponding to one MVR among the plurality of MVRs is unavailable, a motion vector for the one MVR may not be obtained as a motion vector predictor of the current block, and thus, it is necessary to include another motion vector. In this case, a default motion vector may be obtained by using the motion vector of the left adjacent block A1 2410 or the right adjacent block B1 2420 of the current block 2400. The obtained default motion vector may be round according to Equations 1 and 2 above based on the one MVR (amvr_idx) and may be obtained as a motion vector predictor of the current block.

In detail, as the first priority, when the motion vector of the left adjacent block A1 2410 is available and reference indexes of the left adjacent block A1 2410 and the current block 2400 are the same, the motion vector of the left adjacent block A1 2410 is obtained as the default motion vector. Otherwise, as the second priority, when the motion vector of the right adjacent block B1 2420 is available and reference indexes of the right adjacent block B1 2420 and the current block are the same, the motion vector of the right adjacent block B1 2420 is obtained as the default motion vector. Otherwise, as the third priority, when the motion vector of the left adjacent block A1 2410 is available and the reference indexes of the left adjacent block A1 2410 and the current block are not the same, the motion vector of the left adjacent block A1 2410 is obtained as the default motion vector. Otherwise, as the fourth priority, when the motion vector of the right adjacent block B1 2420 is available and the reference indexes of the right adjacent block B1 2420 and the current block are not the same, the motion vector of the right adjacent block B1 2420 is obtained as the default motion vector.

Moreover, when the reference indexes of the left adjacent block A1 2410 and the current block are not the same, the motion vector of the left adjacent block A1 2410 may be scaled according to a distance between a reference frame of the current block and a reference frame of the left adjacent block A1 2410, and the scaled motion vector may be obtained as a default motion vector.

Similarly, when the reference indexes of the right adjacent block B1 2420 and the current block are not the same, the motion vector of the right adjacent block B1 2420 may be scaled according to a distance between the reference frame of the current block and a reference frame of the right adjacent block B1 2420, and the scaled motion vector may be obtained as a default motion vector.

Figure 24B:
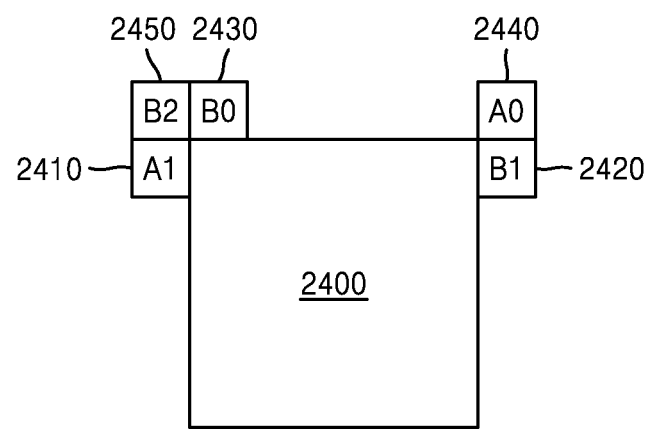
FIG. 24B is a diagram for describing locations of a plurality of adjacent blocks corresponding to a plurality of MVRs and locations of two adjacent blocks used to obtain a default motion vector, when motion information of a left adjacent block and a right adjacent block of a current block is available, according to another embodiment.
Figure 26A:
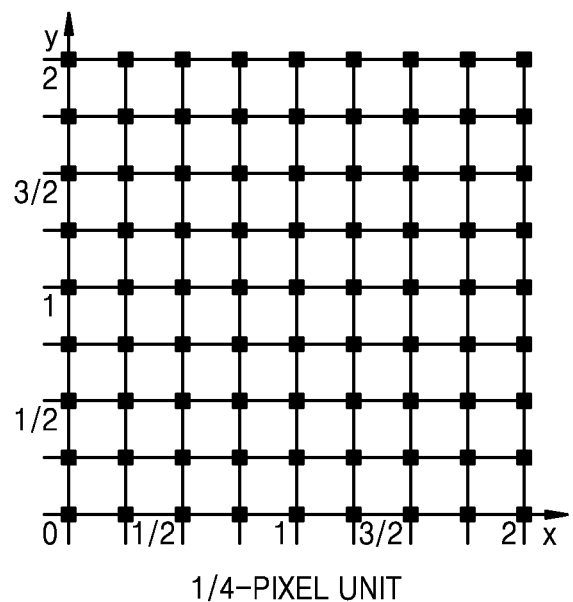
FIGS. 26A to 26D illustrate locations of pixels that motion vectors may indicate in response to a ¼-pixel unit MVR, a ½-pixel unit MVR, a 1-pixel unit MVR, and a 2-pixel unit MVR, when a supportable minimum MVR is a ¼-pixel unit MVR.
Figure 26B:
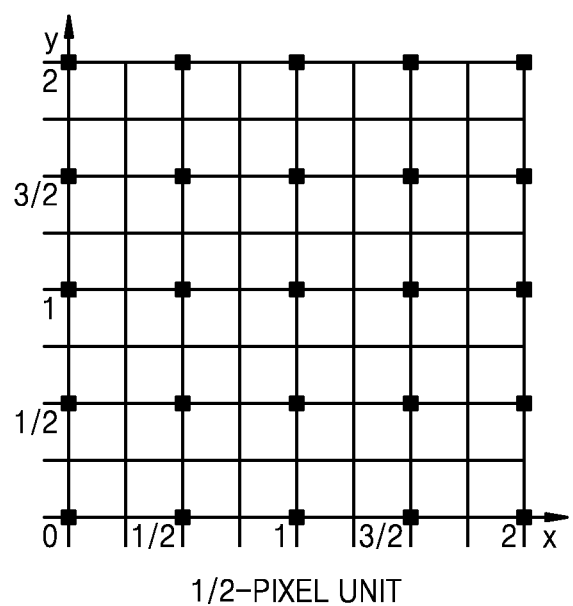
Figure 26C:
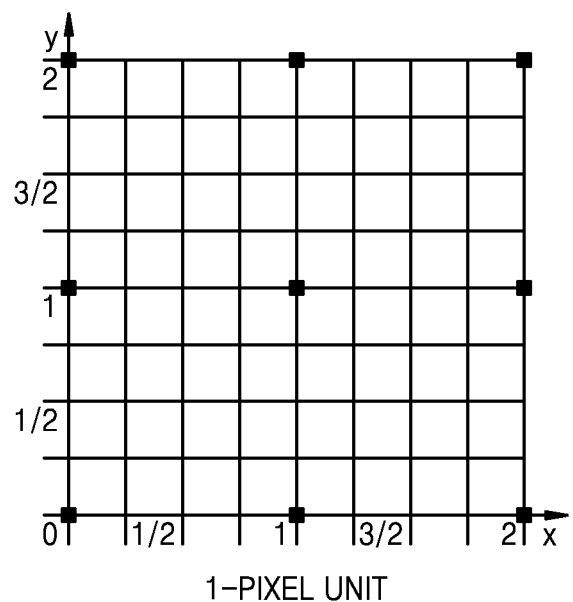
Figure 26D:
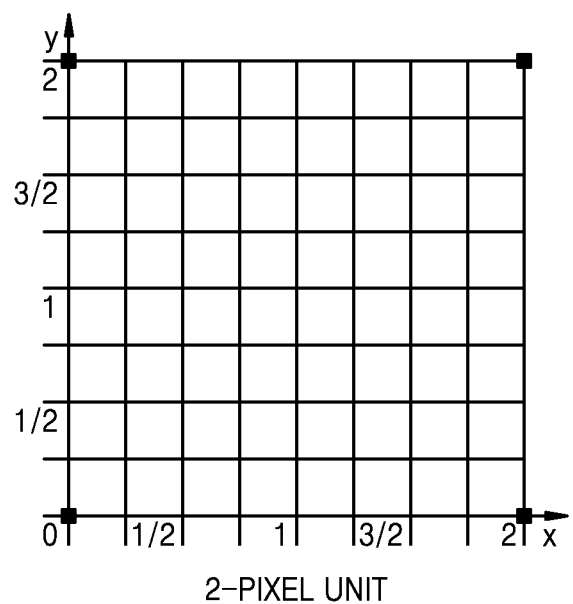

FIG. 24B is a diagram for describing locations of a plurality of adjacent blocks corresponding to a plurality of MVRs and locations of two adjacent blocks used to obtain a default motion vector, when motion information of a left adjacent block and a right adjacent block of a current block is available, according to another embodiment.

Referring to FIG. 24B, when motion information of a left adjacent block and a right adjacent block of a current block 2400 is available (LR_11), motion vectors of a left adjacent block A1 2410, a right adjacent block B1 2420, an upper adjacent block B0 2430, an upper right adjacent block A0 2440, and an upper left adjacent block B2 2450 of the current block 2400 may be used.

The difference between the embodiment of FIG. 24B and the embodiment of FIG. 24A is that the locations of the left adjacent block A1 2410 and the right adjacent block B1 2420 are different. In detail, unlike FIG. 24A, when a location of an upper left sample of the current block 2400 is (xCb, yCb), a right direction of xCb is a positive direction of an x-axis, a lower direction of yCb is a positive direction of a y-axis, and a width and a height of the current block 2400 are nCbW and nCbH, respectively, the left adjacent block A1 2410 of FIG. 24B is an adjacent block including a pixel located at (xCb−1, yCb), and the right adjacent block B1 2420 is an adjacent block including a pixel located at (xCb+nCbW, yCb).

In detail, when the plurality of MVRs include a ¼-pixel unit resolution, a ½-pixel unit resolution, a 1-pixel unit resolution, a 2-pixel unit resolution, and a 4-pixel unit resolution, in the case of the ¼-pixel unit resolution, the motion vector of the left adjacent block A1 2410 may be obtained as a motion vector predictor of the current block, in the case of the ½-pixel unit resolution, the motion vector of the right adjacent block B1 2420 may be obtained as a motion vector predictor of the current block, in the case of the 1-pixel unit resolution, the motion vector of the upper adjacent block B0 2430 may be obtained as a motion vector predictor of the current block, in the case of the 2-pixel unit resolution, the motion vector of the upper right adjacent block A0 2440 may be obtained as a motion vector predictor of the current block, and in the case of the 4-pixel unit resolution, the motion vector of the upper left adjacent block B2 2450 may be obtained as a motion vector predictor of the current block.

Also, as in FIG. 22, when the MVR is ¼, a motion vector of an adjacent block corresponding to the ¼-pixel unit resolution is obtained as a motion vector predictor of the current block as it is, but in the cases of the ½-, 1-, 2-, and 4-pixel unit resolutions, a motion vector of an adjacent block corresponding to each pixel unit resolution, which is determined according to Equations 1 and 2 above, is obtained as a motion vector predictor of the current block.

Moreover, when motion information of an adjacent block at a location corresponding to one MVR among the plurality of MVRs is unavailable, a motion vector for the one MVR may not be obtained as a motion vector predictor of the current block, and thus, it is necessary to obtain another motion vector as a motion vector predictor of the current block. In this case, a default motion vector may be obtained by using the motion vector of the left adjacent block A1 2410 or the right adjacent block B1 2420 of the current block 2400. The obtained default motion vector may be round according to Equations 1 and 2 above based on the one MVR (amvr_idx) and may be obtained as a motion vector predictor of the current block.

In detail, as the first priority, when the motion vector of the left adjacent block A1 2410 is available and reference indexes of the left adjacent block A1 2410 and the current block 2400 are the same, the motion vector of the left adjacent block A1 2410 is obtained as the default motion vector. Otherwise, as the second priority, when the motion vector of the right adjacent block B1 2420 is available and reference indexes of the right adjacent block B1 2420 and the current block are the same, the motion vector of the right adjacent block B1 2420 is obtained as the default motion vector. Otherwise, as the third priority, when the motion vector of the left adjacent block A1 2410 is available and the reference indexes of the left adjacent block A1 2410 and the current block are not the same, the motion vector of the left adjacent block A1 2410 is obtained as the default motion vector. Otherwise, as the fourth priority, when the motion vector of the right adjacent block B1 2420 is available and the reference indexes of the right adjacent block B1 2420 and the current block are not the same, the motion vector of the right adjacent block B1 2420 is obtained as the default motion vector.

Moreover, when the reference indexes of the left adjacent block A1 2410 and the current block are not the same, the motion vector of the left adjacent block A1 2410 may be scaled according to a distance between a reference frame of the current block and a reference frame of the left adjacent block A1 2410, and the scaled motion vector may be obtained as a default motion vector.

Similarly, when the reference indexes of the right adjacent block B1 2420 and the current block are not the same, the motion vector of the right adjacent block B1 2420 may be scaled according to a distance between the reference frame of the current block and a reference frame of the right adjacent block B1 2420, and the scaled motion vector may be obtained as a default motion vector.

FIG. 25 is a diagram for describing interpolation for determining a motion vector according to various MVRs.

The video encoding apparatus 1700 may determine a motion vector of a current block according to at least one candidate MVR in order to perform inter prediction on the current block. A supportable candidate MVR may include an MVR of $2^k$ pixel units (k is an integer). When k is greater than 0, the motion vector may indicate only integer pixels in an interpolated reference image, and when k is smaller than 0, the motion vector may indicate subpixels and integer pixels.

For example, when a minimum MVR has ¼ pixel units, the video encoding apparatus 1700 may interpolate the reference image to generate subpixels of ¼ pixel units, and may determine a motion vector to indicate a pixel corresponding to a candidate MVR, for example, a ¼-pixel unit MVR, a ½-pixel unit MVR, a 1-pixel unit MVR, or a 2-pixel unit MVR.

For example, the video encoding apparatus 1700 may generate subpixels a to l of ½ pixel units by performing interpolation on the reference image using an n-tap finite impulse response (FIR) filter. In regard of ½ subpixels in a vertical direction, a subpixel a may be generated by performing interpolation using A1, A2, A3, A4, A5, and A6 in integer pixel units, and a subpixel b may be generated by performing interpolation using B1, B2, B3, B4, B5, and B6 in integer pixel units. Subpixels c, d, e, and f may also be generated in the same manner.

Pixel values of the ½ subpixels in the vertical direction may be calculated as follows. For example, the pixel values may be calculated as a=(A1−5×A2+20×A3+20×A4−5×A5+A6)/32 and b=(B1−5×B2+20×B3+20×B4−5×B5+B6)/32. Pixel values of the subpixels c, d, e, and f may also be calculated in the same manner.

The video encoding apparatus 1700 may generate subpixels in a horizontal direction by performing interpolation using a 6-tap FIR filter, as in the subpixels in the vertical direction. A subpixel g may be generated by using A1, B1, C1, D1, E1, and F1, and a subpixel h may be generated by using A2, B2, C2, D2, E2, and F2.

Pixel values of the subpixels in the horizontal direction are also calculated in the same manner as the pixel values of the subpixels in the vertical direction. For example, the pixel values may be calculated as g=(A1−5×B1+20×C1+20×D1−5×E1+F1)/32.

A subpixel m of ½ pixel units in a diagonal direction may be interpolated by using another subpixel of ½ pixel units. In other words, a pixel value of the subpixel m may be calculated as m=(a−5×b+20×c+20×d−5×e+f)/32.

After the subpixels of ½ pixel units are generated, the video encoding apparatus 1700 may generate subpixels of ¼ pixel units by using integer pixels and the subpixels of ½ pixel units. The video encoding apparatus 1700 may generate subpixels of ¼ pixel units by performing interpolation using two adjacent pixels. Alternatively, the video encoding apparatus 1700 may generate a subpixel of ¼ pixel units by directly applying an interpolation filter to a pixel value of an integer pixel without using a value of a subpixel of ½ pixel units.

The aforementioned interpolation filter has been described as an example of a 6-tap filter, but the video encoding apparatus 1700 may interpolate a picture by using filters having different numbers of taps. For example, the interpolation filter may include a 4-tap filter, a 7-tap filter, an 8-tap filter, and a 12-tap filter.

FIGS. 26A to 26D illustrate locations of pixels that motion vectors may indicate in response to a ¼-pixel unit MVR, a ½-pixel unit MVR, a 1-pixel unit MVR, and a 2-pixel unit MVR, when a supportable minimum MVR is a ¼-pixel unit MVR.

FIG. 26A, FIG. 26B, FIG. 26C, and FIG. 26D illustrate coordinates (represented as black squares) of pixels that may be indicated by motion vectors of the ¼-pixel unit MVR, the ½-pixel unit MVR, the 1-pixel unit MVR, and the 2-pixel unit MVR based on coordinates (0, 0), respectively.

When a minimum MVR is the ¼-pixel unit MVR, coordinates of a pixel that may be indicated by the motion vector having the ¼-pixel unit MVR are (a/4, b/4) (a and b are integers), coordinates of a pixel that may be indicated by the motion vector having the ½-pixel unit MVR are (2c/4, 2d/4) (c and d are integers), coordinates of a pixel that may be indicated by the motion vector having the 1-pixel unit MVR are (4e/4, 4f/4) (e and f are integers), and coordinates of a pixel that may be indicated by the motion vector having the 2-pixel unit MVR are (8g/4, 8h/4) (g and h are integers). That is, when the minimum MVR has $2^m$ pixel units (m is an integer), coordinates of a pixel that may be indicated by a $2^n$ pixel unit MVR (n is an integer) are ($2^{n-m}$*i/$2^{-m}$, $2^{n-m}$*j/$2^{-m}$) (i and j are integers). Although a motion vector is determined based on a specific MVR, the motion vector is represented as coordinates in an image interpolated according to ¼ pixel units.

In an embodiment, because the video encoding apparatus 1700 determines a motion vector in an image interpolated according to the minimum MVR, the video encoding apparatus 1700 may represent a motion vector in integer units by multiplying the motion vector (and a motion vector predictor) by an inverse number of a pixel unit value of the minimum MVR, for example, $2^{-m}$ when the minimum MVR has $2^m$ pixel units (m is an integer), so that the motion vector (and the motion vector predictor) may be represented as an integer. The motion vector in integer units multiplied by $2^{-m}$ may be used in the video encoding apparatus 1700 and the video encoding apparatus 1900.

When the motion vector having the ½-pixel unit MVR starting from the coordinates (0, 0) indicates coordinates (2/4, 6/4) (a motion vector in ½ pixel units is (1, 3), which is a value obtained by multiplying the coordinates by an integer 2) and the minimum MVR has ¼ pixel units, the video encoding apparatus 1700 may determine, as a motion vector, (2, 6) which is a value obtained by multiplying the coordinates (2/4, 6/4) indicated by the motion vector by an integer 4.

When a magnitude of an MVR is smaller than a 1-pixel unit, the video encoding apparatus 1700 according to an embodiment may search for a block similar to a current block in the reference image based on subpixel units with respect to a motion vector determined in integer pixel units, in order to perform motion prediction in subpixel units.

For example, when an MVR of the current block is the ¼-pixel unit MVR, the video encoding apparatus 1700 may determine a motion vector in integer pixel units, interpolate the reference image to generate subpixels of ½ pixel units, and then search for the most similar prediction block in a range of (−1 to 1, −1 to 1) with respect to the motion vector determined in integer pixel units. Next, the video encoding apparatus 1700 may interpolate the reference image again to generate subpixels in ¼ pixel units, and then search for the most similar prediction block in the range of with respect to a motion vector determined in ½ pixel units, and determine a final motion vector having the ¼-pixel unit MVR.

For example, when the motion vector in integer pixel units is (−4, −3) based on the coordinates (0, 0), the motion vector is (−8, −6)(=(−4*2, −3*2)) in the ½-pixel unit MVR, and when the motion vector moves by (0, −1), the motion vector having the ½-pixel unit MVR is finally determined as (−8, −7)(=(−8, −6−1)). Also, the motion vector having the ¼-pixel unit MVR may change to (−16, −14)(=(−8*2, −7*2)), and when the motion vector moves by (−1, 0) again, the final motion vector having the ¼-pixel unit MVR may be determined as (−17, −14)(=(−16−1, −14)).

When the MVR of the current block is greater than the 1-pixel unit MVR, the video encoding apparatus 1700 according to an embodiment may search for a block similar to the current block in a reference picture based on pixel units greater than a 1 pixel unit with respect to the motion vector determined in integer pixel units, in order to perform motion prediction in greater pixel units. Pixels located in the pixel units (e.g., a 2-pixel unit, a 3-pixel unit, and a 4-pixel unit) greater than a 1-pixel unit may be referenced as super pixels.

Figure 27:
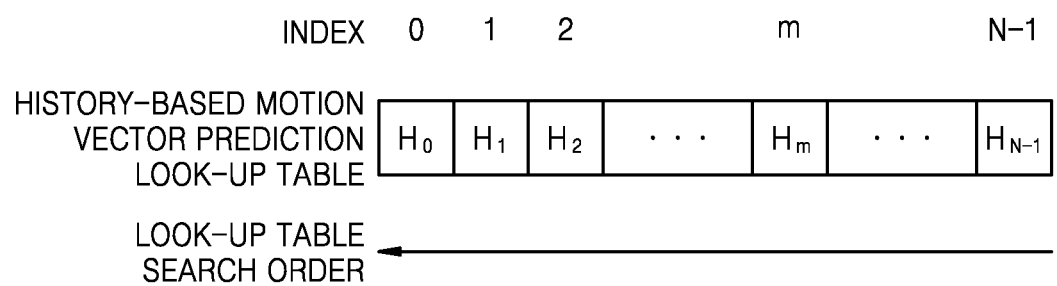
FIG. 27 is a diagram for describing history-based motion vector prediction.

FIG. 27 is a diagram for describing history-based motion vector prediction.

In history-based motion vector prediction (HMVP), pieces of motion information of a block encoded or a block decoded prior to a current block in units of tiles or slices are stored as HMVP candidates. In detail, a look-up table storing the HMVP candidates, that is, an HMVP list is fetched, and a block is encoded or decoded based on the HMVP candidates of the HMVP list.

Referring to FIG. 27, an index of a most-recent stored HMVP candidate is 0 and an index of an earliest-stored HMVP candidate is N−1 from among N HMVP candidates stored in an HMVP look-up table, and according to a look-up table sequence order, from HMVP whose index is N−1 to HMVP whose index is 0 are searched.

Also, when the HMVP list is updated and thus a new HMVP candidate is added thereto, motion information of earliest-stored HMVP0 from among candidates stored in the HMVP list may be removed. That is, the HMVP list is updated according to first-in first-out (FIFO) logic.

Also, a plurality of pieces of most-recent stored motion information may be repetitions of the same motion information as a plurality of pieces of motion information stored in a motion vector candidate list. In this case, the plurality of pieces of most-recent stored motion information may not be used, and only up to Mth-recent stored motion information may be used.

The history-based motion vector candidate list may be accumulated and managed in units of tiles or slices, and may be initialized in units of new tiles or slices.

Figure 28A:
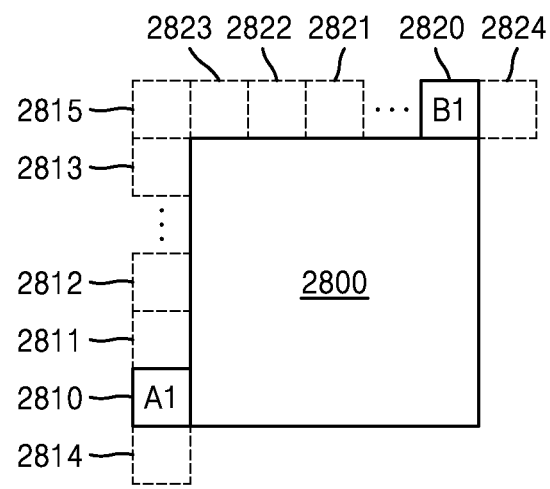
FIG. 28A is a diagram for describing a method of using an adjacent block other than two adjacent blocks used to obtain a default motion vector, when motion information of both a left adjacent block and a right adjacent block of a current block is unavailable or when motion information of the left adjacent block of the current block is available, according to an embodiment.

FIG. 28A is a diagram for describing a method of using an adjacent block other than two adjacent blocks used to obtain a default motion vector, when motion information of both a left adjacent block and a right adjacent block of a current block is unavailable or when motion information of the left adjacent block of the current block is available, according to an embodiment.

Referring to FIG. 28A, when there is no motion information available in a left adjacent block A1 2810 and an upper adjacent block B1 2820 of a current block 2800, a default motion vector may be obtained by using motion information of adjacent blocks 2811, 2812, and 2813 located above the left adjacent block A1 2810 or motion information of adjacent blocks 2821, 2822, and 2823 located on the left side of the upper adjacent block B1 2820. Also, a default motion vector may be obtained by using motion information of other adjacent blocks 2814, 2815, and 2824. For example, when there is no motion information in the left adjacent block A1 2810 and the upper adjacent block B1 2820, a motion vector of the adjacent block 2811 located above the left adjacent block A1 2810 is identified, and when a motion vector exists in the adjacent block 2811 and a reference index of the current block is the same as a reference index of the adjacent block 2811, the motion vector of the adjacent block 2811 is determined as a default motion vector and a process of obtaining the default motion vector is terminated. Also, even though a motion vector exists in the adjacent block 2811 and the reference index of the current block is not the same as the reference index of the adjacent block 2811, the motion vector of the adjacent block 2811 is determined as the default motion vector and the process of obtaining the default motion vector is terminated. However, when there is no motion vector in the adjacent block 2811, a motion vector of the adjacent block 2812 located above the adjacent block 2811 is identified. When a motion vector exists in the adjacent block 2812 and the reference index of the current block is the same as a reference index of the adjacent block 2812, the motion vector of the adjacent block 2812 is determined as the default motion vector and the process of obtaining the default motion vector is terminated. Also, even though a motion vector exists in the adjacent block 2812 and the reference index of the current block is not the same as the reference index of the adjacent block 2812, the motion vector of the adjacent block 2812 is determined as the default motion vector and the process of obtaining the default motion vector is terminated. This process is repeated until the default motion vector is determined. The process may also be applied in FIGS. 28B and 28C which will be described below.

Figure 28B:
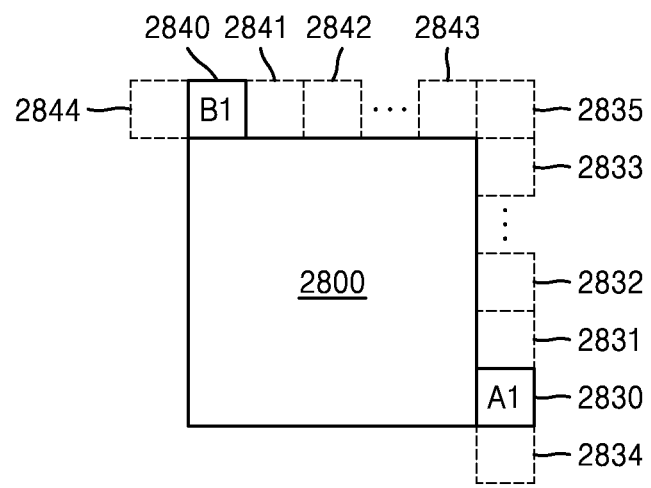
FIG. 28B is a diagram for describing a method of using an adjacent block other than two adjacent blocks used to obtain a default motion vector, when motion information of a right adjacent block of a current block is available, according to an embodiment.

FIG. 28B is a diagram for describing a method of using an adjacent block other than two adjacent blocks used to obtain a default motion vector, when motion information of a right adjacent block of a current block is available, according to an embodiment.

Referring to FIG. 28B, when there is no motion information available in a right adjacent block A1 2830 and an upper adjacent block B1 2840 of the current block 2800, a default motion vector may be obtained by using motion information of adjacent blocks 2831, 2832, and 2833 located above the right adjacent block A1 2830 or motion information of adjacent blocks 2841, 2842, and 2843 located on the right side of the upper adjacent block B1 2840. Also, a default motion vector may be obtained by using motion information of other adjacent blocks 2834, 2835, and 2844.

Figure 28C:
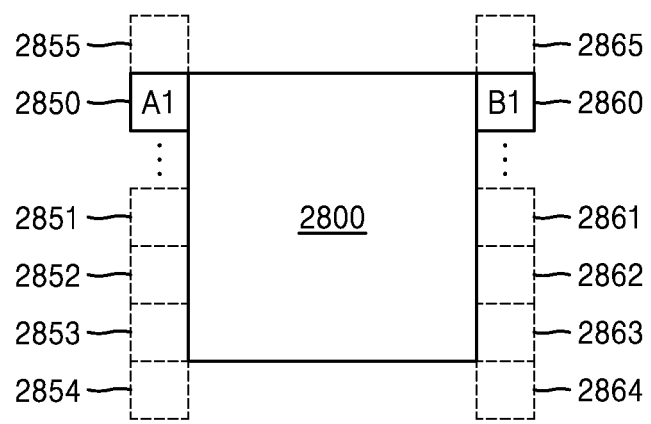
FIG. 28C is a diagram for describing a method of using an adjacent block other than two adjacent blocks used to obtain a default motion vector, when motion information of both a left adjacent block and a right adjacent block of a current block is available, according to an embodiment.

FIG. 28C is a diagram for describing a method of using an adjacent block other than two adjacent blocks used to obtain a default motion vector, when motion information of both a left adjacent block and a right adjacent block of a current block is available, according to an embodiment.

Referring to FIG. 28C, when there is not motion information available in a left adjacent block A1 2850 and a right adjacent block B1 2860 of the current block 2800, a default motion vector may be obtained by using motion information of adjacent blocks 2851, 2852, and 2853 located below the left adjacent block A1 2850 or motion information of adjacent blocks 2861, 2862, and 2863 located on the right side of the right adjacent block B1 2860. Also, a default motion vector may be obtained by using motion information of other adjacent blocks 2854, 2855, 2864, and 2865.

According to another embodiment, when information about a reference index of the current block is not received from a bitstream, a default reference index may be obtained to be determined as a reference index of the current block. For example, when information about a motion vector and an MVR of the current block exists, but the reference index of the current block is unknown, a reference index of an adjacent block at a location corresponding to the MVR may be determined as the reference index of the current block. Moreover, when a value of the reference index of the adjacent block is unknown because motion information of the adjacent block at the location corresponding to the MVR is unavailable, a default reference index may be determined by using reference indexes of two predetermined adjacent blocks, and the default reference index may be determined as the reference index of the current block.

Referring to FIG. 22, when motion information of a left adjacent block and a right adjacent block of the current block 2200 is unavailable (LR_00) or when motion information of the left adjacent block of the current block is available (LR_10), motion information of the left adjacent block A1 2210, the upper adjacent block B1 2220, the upper right adjacent block B0 2230, the lower left adjacent block A0 2240, and the upper left adjacent block B2 2250 of the current block 2200 may be used.

For example, when a motion vector value of the current block exists and an MVR of the current block is ¼, the reference index of the current block may be set as a reference index of the left adjacent block A1 2210 corresponding to a ¼-pixel unit resolution. When the motion vector value of the current block exists and the MVR of the current block is ½, the reference index of the current block may be set as a reference index of the upper adjacent block B1 2220 corresponding to a ½-pixel unit resolution. When the motion vector value of the current block exists and the MVR of the current block is 1, the reference index of the current block may be set as a reference index of the upper right adjacent block B0 2230 corresponding to a 1-pixel unit resolution. When the motion vector value of the current block exists and the MVR of the current block is 2, the reference index of the current block may be set as a reference index of the lower left adjacent block A0 2240 corresponding to a 2-pixel unit resolution. When the motion vector value of the current block exists and the MVR of the current block is 4, the reference index of the current block may be set as a reference index of the upper left adjacent block B2 2250 corresponding to a 4-pixel unit resolution.

Moreover, when the motion information of the adjacent block corresponding to the MVR of the current block is unavailable, a default reference index may be obtained by using reference indexes of the left adjacent block A1 2210 and the upper adjacent block B1 2220 of the current block 2200. In detail, first, the reference index of the current block is set to 0, and as the first priority, when the motion information of the left adjacent block A1 2210 is available and the reference indexes of the left adjacent block A1 2210 and the current block 2200 are the same, the reference index of the left adjacent block A1 2210 is obtained as a default reference index. Otherwise, as the second priority, when the motion information of the upper adjacent block B1 2220 is available and reference indexes of the upper adjacent block B1 2220 and the current block are the same, the reference index of the upper adjacent block B1 2220 is obtained as the default reference index. Otherwise, as the third priority, when the motion information of the left adjacent block A1 2210 is available and the reference indexes of the left adjacent block A1 2210 and the current block are not the same, the reference index of the left adjacent block A1 2210 is obtained as the default reference index. Otherwise, as the fourth priority, when the motion information of the upper adjacent block B1 2220 is available and reference indexes of the upper adjacent block B1 2220 and the current block are not the same, the reference index of the upper adjacent block B1 2220 is obtained as the default reference index.

As another example, when the motion vector value of the current block exists and the MVR is not applied, a default reference index may be obtained by using the reference indexes of the left adjacent block A1 2210 and the upper adjacent block B1 2220 of the current block 2200. In detail, first, the reference index of the current block is set to 0, and as the first priority, when the motion information of the left adjacent block A1 2210 is available and the reference indexes of the left adjacent block A1 2210 and the current block 2200 are the same, the reference index of the left adjacent block A1 2210 is obtained as a default reference index. Otherwise, as the second priority, when the motion information of the upper adjacent block B1 2220 is available and reference indexes of the upper adjacent block B1 2220 and the current block are the same, the reference index of the upper adjacent block B1 2220 is obtained as the default reference index. Otherwise, as the third priority, when the motion information of the left adjacent block A1 2210 is available and the reference indexes of the left adjacent block A1 2210 and the current block are not the same, the reference index of the left adjacent block A1 2210 is obtained as the default reference index. Otherwise, as the fourth priority, when the motion information of the upper adjacent block B1 2220 is available and reference indexes of the upper adjacent block B1 2220 and the current block are not the same, the reference index of the upper adjacent block B1 2220 is obtained as the default reference index.

Referring to FIG. 23, when motion information of a right adjacent block of the current block 2300 is available (LR_01), motion information of the right adjacent block A1 2310, the upper adjacent block B1 2320, the upper left adjacent block B0 2330, the lower right adjacent block A0 2340, and the upper right adjacent block B2 2350 of the current block 2300 may be used.

For example, when a motion vector value of the current block exists and an MVR of the current block is ¼, the reference index of the current block may be set as a reference index of the right adjacent block A1 2310 corresponding to a ¼-pixel unit resolution. When the motion vector value of the current block exists and the MVR of the current block is ½, the reference index of the current block may be set as a reference index of the upper adjacent block B1 2320 corresponding to a ½-pixel unit resolution. When the motion vector value of the current block exists and the MVR of the current block is 1, the reference index of the current block may be set as a reference index of the upper left adjacent block B0 2330 corresponding to a 1-pixel unit resolution. When the motion vector value of the current block exists and the MVR of the current block is 2, the reference index of the current block may be set as a reference index of the lower right adjacent block A0 2340 corresponding to a 2-pixel unit resolution. When the motion vector value of the current block exists and the MVR of the current block is 4, the reference index of the current block may be set as a reference index of the upper right adjacent block B2 2350 corresponding to a 4-pixel unit resolution.

Moreover, when the motion information of the adjacent block corresponding to the MVR of the current block is unavailable, a default reference index may be obtained by using reference indexes of the right adjacent block A1 2310 and the upper adjacent block B1 2320 of the current block 2300. In detail, first, the reference index of the current block is set to 0, and as the first priority, when the motion information of right adjacent block A1 2310 is available and the reference indexes of the right adjacent block A1 2310 and the current block 2300 are the same, the reference index of the right adjacent block A1 2310 is obtained as a default reference index. Otherwise, as the second priority, when the motion information of the upper adjacent block B1 2320 is available and reference indexes of the upper adjacent block B1 2320 and the current block are the same, the reference index of the upper adjacent block B1 2320 is obtained as the default reference index. Otherwise, as the third priority, when the motion information of the right adjacent block A1 2310 is available and the reference indexes of the right adjacent block A1 2310 and the current block are not the same, the reference index of the right adjacent block A1 2310 is obtained as the default reference index. Otherwise, as the fourth priority, when the motion information of the upper adjacent block B1 2320 is available and reference indexes of the upper adjacent block B1 2320 and the current block are not the same, the reference index of the upper adjacent block B1 2320 is obtained as the default reference index.

As another example, when the motion vector value of the current block exists and the MVR is not applied, a default reference index may be obtained by using the reference indexes of the right adjacent block A1 2310 and the upper adjacent block B1 2320 of the current block 2300. In detail, first, the reference index of the current block is set to 0, and as the first priority, when the motion information of right adjacent block A1 2310 is available and the reference indexes of the right adjacent block A1 2310 and the current block 2300 are the same, the reference index of the right adjacent block A1 2310 is obtained as a default reference index. Otherwise, as the second priority, when the motion information of the upper adjacent block B1 2320 is available and reference indexes of the upper adjacent block B1 2320 and the current block are the same, the reference index of the upper adjacent block B1 2320 is obtained as the default reference index. Otherwise, as the third priority, when the motion information of the right adjacent block A1 2310 is available and the reference indexes of the right adjacent block A1 2310 and the current block are not the same, the reference index of the right adjacent block A1 2310 is obtained as the default reference index. Otherwise, as the fourth priority, when the motion information of the upper adjacent block B1 2320 is available and reference indexes of the upper adjacent block B1 2320 and the current block are not the same, the reference index of the upper adjacent block B1 2320 is obtained as the default reference index.

Referring to FIGS. 24A and 24B, when motion information of a left adjacent block and a right adjacent block of the current block 2400 is available (LR_11), motion information of the left adjacent block A1 2410, the right adjacent block B1 2420, the upper adjacent block B0 2430, the upper right adjacent block A0 2440, and the upper left adjacent block B2 2450 of the current block 2400 may be used.

For example, when a motion vector value of the current block exists and an MVR of the current block is ¼, the reference index of the current block may be set as a reference index of the left adjacent block A1 2410 corresponding to a ¼-pixel unit resolution. When the motion vector value of the current block exists and the MVR of the current block is ½, the reference index of the current block may be set as a reference index of the right adjacent block B1 2420 corresponding to a ½-pixel unit resolution. When the motion vector value of the current block exists and the MVR of the current block is 1, the reference index of the current block may be set as a reference index of the upper adjacent block B0 2430 corresponding to a 1-pixel unit resolution. When the motion vector value of the current block exists and the MVR of the current block is 2, the reference index of the current block may be set as a reference index of the upper right adjacent block A0 2440 corresponding to a 2-pixel unit resolution. When the motion vector value of the current block exists and the MVR of the current block is 4, the reference index of the current block may be set as a reference index of the upper left adjacent block B2 2450 corresponding to a 4-pixel unit resolution.

Moreover, when the motion information of the adjacent block corresponding to the MVR of the current block is unavailable, a default reference index may be obtained by using reference indexes of the left adjacent block A1 2410 and the right adjacent block B1 2420 of the current block 2400. In detail, first, the reference index of the current block is set to 0, and as the first priority, when the motion information of the left adjacent block A1 2410 is available and the reference indexes of the left adjacent block A1 2410 and the current block 2400 are the same, the reference index of the left adjacent block A1 2410 is obtained as a default reference index. Otherwise, as the second priority, when the motion information of the right adjacent block B1 2420 is available and reference indexes of the right adjacent block B1 2420 and the current block are the same, the reference index of the right adjacent block B1 2420 is obtained as the default reference index. Otherwise, as the third priority, when the motion information of the left adjacent block A1 2410 is available and the reference indexes of the left adjacent block A1 2410 and the current block are not the same, the reference index of the left adjacent block A1 2410 is obtained as the default reference index. Otherwise, as the fourth priority, when the motion information of the right adjacent block B1 2420 is available and reference indexes of the right adjacent block B1 2420 and the current block are not the same, the reference index of the right adjacent block B1 2420 is obtained as the default reference index.

As another example, when the motion vector value of the current block exists and the MVR is not applied, a default reference index may be obtained by using the reference indexes of the left adjacent block A1 2410 and the right adjacent block B1 2420 of the current block 2400. In detail, first, the reference index of the current block is set to 0, and as the first priority, when the motion information of the left adjacent block A1 2410 is available and the reference indexes of the left adjacent block A1 2410 and the current block 2400 are the same, the reference index of the left adjacent block A1 2410 is obtained as a default reference index. Otherwise, as the second priority, when the motion information of the right adjacent block B1 2420 is available and reference indexes of the right adjacent block B1 2420 and the current block are the same, the reference index of the right adjacent block B1 2420 is obtained as the default reference index. Otherwise, as the third priority, when the motion information of the left adjacent block A1 2410 is available and the reference indexes of the left adjacent block A1 2410 and the current block are not the same, the reference index of the left adjacent block A1 2410 is obtained as the default reference index. Otherwise, as the fourth priority, when the motion information of the right adjacent block B1 2420 is available and reference indexes of the right adjacent block B1 2420 and the current block are not the same, the reference index of the right adjacent block B1 2420 is obtained as the default reference index.

When there is no motion information even in adjacent blocks corresponding to A1 and B1, by using a history-based motion vector candidate list in which motion information of blocks encoded or decoded prior to a current block are stored, motion information of the history-based motion vector candidate list may be identified, and a reference index of the identified motion information may be determined as a default reference index. When there is no motion information in the history-based motion vector candidate list, the default reference index may be determined to be zero (0).

Moreover, whether to use the history-based motion vector candidate list may be determined according to information about whether to use a history-based motion vector candidate list obtained from a bitstream.

In a case where the history-based motion vector candidate list is not used, when there is no motion information even in the adjacent blocks corresponding to A1 and B1, the default reference index may be determined to be zero (0).

The availability of motion information of an adjacent block of the current block may be determined according to following conditions. In detail, when the adjacent block of the current block is not encoded or decoded, it may be determined that the adjacent block is unavailable. When the adjacent block of the current block is located outside a boundary of a tile including the current block, that is, when the adjacent block is included in the tile including the current block and another tile, it may be determined that the adjacent block included in the other tile is unavailable. Also, even when the adjacent block is located outside a boundary of a picture including the current block, it may be determined that the adjacent block is unavailable. Even when the adjacent block is encoded or decoded in an intra mode or an intra block copy mode, it may be determined that the adjacent block is unavailable. When all conditions in which the adjacent block is unavailable are not met, it may be determined that the adjacent blocks are available.

While not restricted thereto, an example embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an example embodiment may be written as a computer program transmitted over a computer-readable transmission medium, such as a carrier wave, and received and implemented in general-use or special-purpose digital computers that execute the programs. Moreover, it is understood that in example embodiments, one or more units of the above-described apparatuses and devices can include circuitry, a processor, a microprocessor, etc., and may execute a computer program stored in a computer-readable medium.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A video decoding method comprising:
   determining an available information about adjacent blocks comprising a right adjacent block according to a coding order;
   when a first adjacent block corresponding to motion vector resolution is the right adjacent block, the right adjacent block is available according to the available information, and a motion vector of the right adjacent block exists, obtaining a motion vector predictor of a current block using the motion vector of the right adjacent block;
   when a motion vector of the right adjacent block does not exist, obtaining a default motion vector using at least one motion vector of the adjacent blocks comprising an upper adjacent block and a left adjacent block;
   obtaining a motion vector predictor of the current block using the default motion vector;
   obtaining a motion vector of the current block using the motion vector predictor of the current block.

* * * * *